(12) United States Patent
Kutsumi et al.

(10) Patent No.: US 7,010,533 B1
(45) Date of Patent: Mar. 7, 2006

(54) E-MAIL PREPARATION DEVICE, TERMINAL DEVICE, INFORMATION FORWARDING SYSTEM, AND PROGRAM RECORDING MEDIUM

(75) Inventors: Hiroshi Kutsumi, Moriguchi (JP); Kouji Miura, Matsubara (JP); Takeshi Imanaka, Nara (JP); Shouichi Araki, Osaka (JP); Tadashi Ano, Takarazuka (JP); Chikako Tada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/913,614

(22) PCT Filed: Feb. 14, 2000

(86) PCT No.: PCT/JP00/00782

§ 371 (c)(1),
(2), (4) Date: Dec. 5, 2001

(87) PCT Pub. No.: WO00/48095

PCT Pub. Date: Aug. 17, 2000

(30) Foreign Application Priority Data

Feb. 15, 1999 (JP) ................. 11-036089
May 7, 1999 (JP) ................. 11-127643

(51) Int. Cl.
*G06F 17/30* (2006.01)

(52) U.S. Cl. ............... 707/10; 707/1; 709/200; 709/201; 709/206; 709/207

(58) Field of Classification Search ............ 707/2, 707/3, 4, 5, 10, 102, 1; 709/200, 201, 206, 709/207
See application file for complete search history.

(56) References Cited

U.S. PATENT DOCUMENTS

| | | | | |
|---|---|---|---|---|
| 5,550,966 A | * | 8/1996 | Drake et al. | 707/104.1 |
| 5,758,332 A | | 5/1998 | Hirotani | |
| 6,009,403 A | | 12/1999 | Sato | |
| 6,026,394 A | * | 2/2000 | Tsuchida et al. | 707/3 |
| 6,105,043 A | * | 8/2000 | Francisco et al. | 715/513 |
| 6,108,674 A | | 8/2000 | Murakami et al. | |
| 6,130,962 A | * | 10/2000 | Sakurai | 382/190 |
| 6,240,420 B1 | * | 5/2001 | Lee | 707/102 |
| 6,246,441 B1 | | 6/2001 | Terakado et al. | |
| 6,442,479 B1 | * | 8/2002 | Barton | 701/213 |

(Continued)

FOREIGN PATENT DOCUMENTS

CN 1121217 A 4/1996

(Continued)

OTHER PUBLICATIONS

Japanese search report for PCT/JP00/00782 dated May 23, 2000.

(Continued)

Primary Examiner—Frantz Coby
(74) Attorney, Agent, or Firm—RatnerPrestia

(57) ABSTRACT

An information forwarding system and method including an information input device for inputting search conditions to a remote data base. The remote data base includes a search device for searching the data base based on the search conditions so as to gain search results. The information forwarding system includes an information display for displaying the search results; a selector for selecting one, or more, search results from among the search results; and an output device for sending the designated contents selected by the selector to a separate supply device so as to designate the operation of the separate supply device.

16 Claims, 59 Drawing Sheets

U.S. PATENT DOCUMENTS

| | | | |
|---|---|---|---|
| 6,488,627 B1 * | 12/2002 | Kim | 600/437 |
| 6,516,323 B1 * | 2/2003 | Kamba | 707/104.1 |
| 6,529,911 B1 * | 3/2003 | Mielenhausen | 707/100 |
| 6,577,911 B1 * | 6/2003 | Lu | 700/96 |
| 6,587,857 B1 * | 7/2003 | Carothers et al. | 707/102 |
| 6,604,098 B1 * | 8/2003 | Kung | 707/3 |

FOREIGN PATENT DOCUMENTS

| | | |
|---|---|---|
| CN | 1161098 A | 10/1997 |
| JP | 4-98380 | 3/1992 |
| JP | 6-60100 | 3/1994 |
| JP | 07-200098 | 8/1995 |
| JP | 08-16585 | 1/1996 |
| JP | 8-19063 | 1/1996 |
| JP | 8-130778 | 5/1996 |
| JP | 08-185403 | 7/1996 |
| JP | 8-191483 | 7/1996 |
| JP | 09-27000 | 1/1997 |
| JP | 9-97005 | 4/1997 |
| JP | 9-102827 | 4/1997 |
| JP | 9-204581 | 8/1997 |
| JP | 09-331496 | 12/1997 |
| JP | 10-40262 | 2/1998 |
| JP | 10-105184 | 4/1998 |
| JP | 10-289173 | 10/1998 |
| JP | 11-41566 | 2/1999 |

OTHER PUBLICATIONS

English translation of Form PCT/ISA/210.
T. Ikeda et al., "Hallow-Kity Happy Mail" and "Enamail" Apr. 23, 1999, vol. 52 pp. 79-81.
Official Action from JPO, dated Mar. 5, 2001.
Nikkei Multimedia, No. 44 (Feb. 15, 1999) pp. 59-65 (with partial English translation).
Toshiba Review, vol. 51 (Jan. 1, 1996) pp. 18-21 (with partial English translation).
Japanese Office Action for Japanese Application No. JP 2001-311974 mailed Apr. 22, 2003 (with partial English translation).
Mastering Electronic Mail Transmitting and Receiving • Electronic Conferencing Tools, Lesson 5 for Learning of Basic usage for a personal computer~ for electronicd mail~ Nikkei BP Mooks, Japan, Nikkei Business Publications, Inc. dated Aug. 1, 1998, pp. 94-106 (with partial English translation).
Office Action issued by the Japanese Patent Office Mailed Mar. 4, 2003.

* cited by examiner

Fig. 4

```
                    song title search song
    title   [        ]         lyrics  [        ]

era    [        ]         genre   [        ]

singer  [        ]
```

Fig. 5

```
              song title search following songs have been found singer              song title Namie Amura         Can you do it?
    Sumasuma            Beyond the red sky
    Kansai Kids         Hold everything
    Pocket Cookies      Bad timing
```

Fig. 9

|  | program search | |
|---|---|---|
| program title [  ] | time period [  ] |
| channel [  ] | genre [  ] |
| actors [  ] | |

Fig. 10

```
                    program search following programs have been found program title      channel            time The sun howls        122      January 20, 19:00-19:55

Kin of Higashiyama   65       January 21, 15:00-17:00

Heiji Zenigame       79       January 18, 10:00-10:55
```

Fig. 13

|  | hotel search | |
|---|---|---|
| location | | distance from train station |
| type | | parking lot |
| price range | | date of usage |

Fig. 14

| hotel search | | |
|---|---|---|
| following hotels are available | | |
| hotel name | price for one night | distance from train station |
| Hotel Special | S7800 | 5 minute walk from Osaka Station |
| World Hotel | S8900 | 3 minute walk from Yodoyabashi Station |
| Hotel Yamashita | S8500 | 4 minute walk from Fukushima Station |

Fig. 17

```
                        train search date of    ┌──────────┐    train to    ┌──────────┐
        usage      └──────────┘    be used     └──────────┘ segment    ┌──────────┐    seat class  ┌──────────┐
                   └──────────┘                └──────────┘ departure  ┌──────────┐
        time       └──────────┘
```

Fig. 18

| train search | | |
|---|---|---|
| following trains are available | | |
| train name | charge | departure time |
| Raicho #1 | 8700 | 8:00 |
| Thunder Board #1 | 8900 | 8:15 |
| Hakucho #3 | 8700 | 8:25 |

Fig. 20
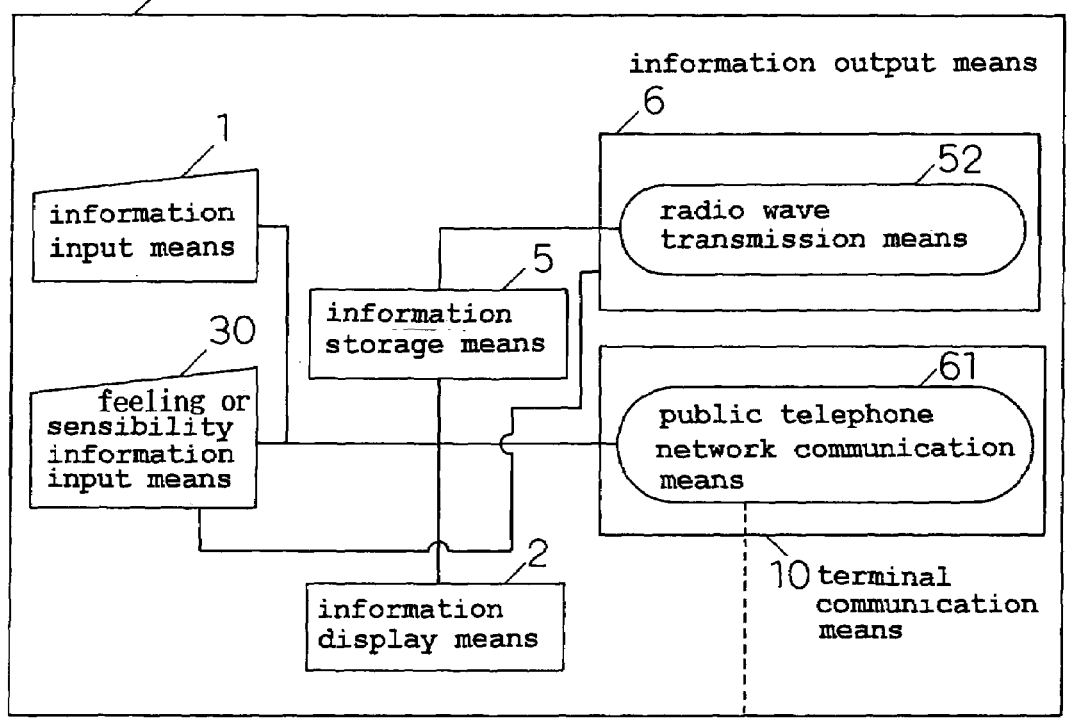
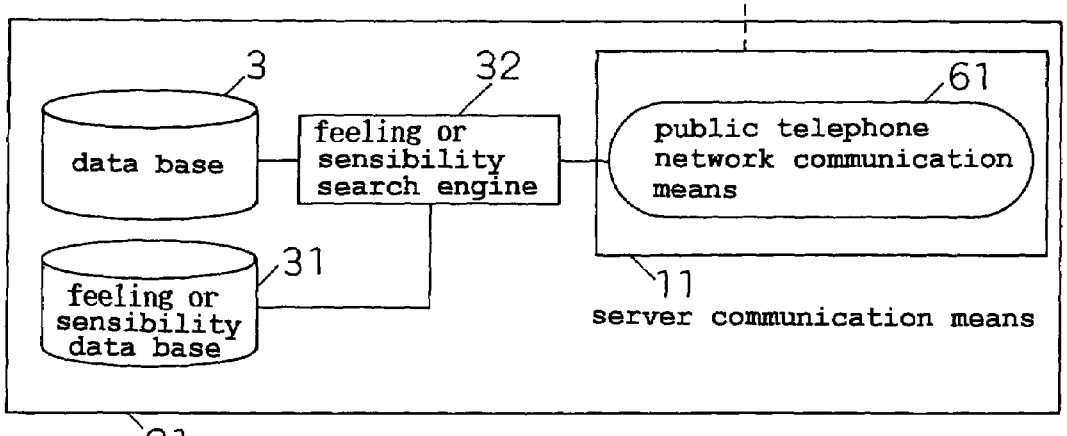

Fig. 24

```
                    movie search what kind of movie are you looking for?

(little) (so-so)  (very)

exciting      1    2    3    4    5 joyful        1    2    3    4    5
```

Fig. 25

| title | starring actor | theatre | next showing |
|---|---|---|---|
| | movie search | | |
| | the following movies are playing | | |
| Titanic | DeCaprio | Kitano Theatre | 15:00 |
| Armageddon | Bruce Willis | Scala Theatre | 15:15 |
| Rocky | Stallone | Hep 1 Theatre | 14:50 |

325 e-mail preparation screen insertion letters designating letter column 391

325 e-mail preparation screen

Fig. 34(a)

```
Hello, this is Yamada.
The weather is going to be
good tomorrow so let's go
for a drive.
I'll make lunch $$$ to bring
with me.
Where should we meet?
I'm waiting for your reply.
```

Fig. 34(b)

```
Hello, this is Yamada.
The weather is going to be
good tomorrow so let's go
for a drive.
I'll make lunch
```

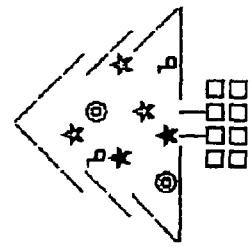

```
to bring with me.
Where should we meet?
I'm waiting for your reply.
``` background portion

E-MAIL PREPARATION DEVICE, TERMINAL DEVICE, INFORMATION FORWARDING SYSTEM, AND PROGRAM RECORDING MEDIUM

This Application is a U.S. National Phase Application of PCT International Application PCT/JP00/00782.

TECHNICAL FIELD

The present invention relates to an information forwarding device, an information forwarding system and method, a management device and a program recording medium which search for information such as reservation information for karaoke or TV programs, reservation information for train tickets and reservation information for lodging in a hotel with a terminal device so as to carry out the reservations.

In addition, the present invention relates to an e-mail preparation device and a program recording medium for preparing documents with illustrations so as to be transmitted and received through e-mail.

BACKGROUND TECHNOLOGY

Recently, information communication apparatuses, such as personal computers, PDAs and cellular telephones have spread rapidly so as to be widely utilized for uses other than for business use. In addition, together with this spread, information communication is utilized as a means of gaining new information. For example, when an information communication apparatus in which a browser for displaying information on the Internet is used it is possible to browse a variety of information from all over the world. In addition, many searching services on the Internet so that it becomes possible to search and to display a variety of information on this information communication apparatus by utilizing these searching services. With respect to cellular telephones, services are provided where a variety of information can be gained by calling specific telephone numbers.

In the above described searching services, however, information is essentially gained, confirmed and stored, while nothing more can be carried out and, therefore, it is impossible to make reservations by accessing an external apparatus, or to control an external apparatus, even though the information desired by the user can be gained through the information communication apparatus. For example, even if, by searching for a TV program, an interesting program is found, a VCR must be operated by the user himself/herself for carrying out the recording reservation of the program and, therefore, the operation for the recording becomes overly complicated and a system is required where one sequence of procedures, from searching to the controlling of the apparatus, can be carried out with one apparatus.

On the other hand, in recent years demand for personal computer (PCs) as information communication apparatuses has increased dramatically because of the spread of the Internet and because of communications via personal computers and communications by means of e-mails have proliferated for uses other than for business use. In addition, recently, the easy transmission and reception of e-mails has become possible not only through PCs but also through portable terminals.

Though in conventional e-mails, documents formed of letters only are transmitted and received, in the case that usages other than for business use are considered documents formed of letters only are dull and lacking in interest and it can be said that they are not attractive enough to attract the attention of other people.

Then, for example, a user adds illustrations, or the like, to the documents so as to give an added value to the communication and so as to carry out a device for increasing the amount of pleasure.

In the case that such an addition of illustrations to the documents is carried out an image file, which is prepared separately by the user or which is prepared in advance, is attached in the form of an attached file so as to be transmitted and received by conventional e-mail software or by other e-mail preparation devices.

In the system as described above where an attached file prepared separately is attached to the documents by using a conventional e-mail preparation device, however, there is a problem that the user must carry out all of the operations of selecting or of attaching image files, such as illustrations to be attached, and, therefore, the operations become overly complicated and everybody cannot easily prepare such documents.

In addition, on the document receiving end, through e-mail, the attached file, which is seen by starting up a separate dedicated display device, is, practically, displayed on a screen different from the one for the documents and, therefore, there is the problem that it cannot be strictly said that the illustrations are attached within the body of the documents.

DISCLOSURE OF THE INVENTION

The present invention of the first group has the purpose of providing a terminal device, an information forwarding system and method, a management device and a program recording medium which can carry out a one sequence procedure from the information search to the apparatus control with one apparatus taking into consideration the above described problem wherein the user cannot make a reservation for something or cannot control an apparatus by using the desired information gained by the user through the use of a information communication apparatus.

To achieve the above object, one aspect of the present invention is an information forwarding system characterized by comprising:
  an information input means of inputting search conditions;
  a data base;
  a search means of searching said data base based on said search conditions so as to gain search results;
  an information display means of displaying said search results;
  a selection means of selecting one, or more, search results from among said search results; and
  an output means of sending the designated contents selected by said selection means to a supply device so as to designate the operation of the supply device.

Another aspect of the present invention is an information forwarding system according to said 1st invention, characterized in that:
  said information input means, said information display means, said selection means and said output means are integrally provided in a terminal device; and
  said data base and said search means are integrally provided in a management device.

Still another aspect of the present invention is an information forwarding system characterized in that:

said terminal device has a loading means of loading a freely attachable and detachable recording medium;

said terminal device stores said designated contents in said recording medium; and said designated contents recorded in said recording medium are read out by said supply device, when said recording medium is loaded into said supply device, so that said designated contents to be supplied are supplied from said supply device.

Yet still another aspect of the present invention is an information forwarding system, characterized in that said output means transmits said designated contents to said supply device and said supply device supplies said designated contents to be supplied when said terminal device closely approaches said supply device.

Still yet another aspect of the present invention is an information forwarding system, characterized in that:

said terminal device is freely attachable to and detachable from said supply device; and said designated contents recorded in said terminal device are read out by said supply device, when said terminal device is mounted in said supply device, so that said designated contents to be supplied are supplied from said supply device.

A further aspect of the present invention is an information forwarding system, characterized in that said terminal means is a portable body.

A still further aspect of the present invention is an information forwarding system, characterized in that said search means carries out a search based on a feeling or sensibility word, which is an adjective, as well as feeling or sensibility information, which shows the degree of the feeling or sensibility while attribution values for carrying out a search based on the feeling or sensibility information are stored in said data base.

A yet further aspect of the present invention is a terminal device characterized by comprising:

an information input means of inputting search conditions;

an information display means of displaying search results from a search means of gaining search results by searching a data base based on said search conditions;

a selection means of selecting one, or more, search results from among said search results; and an output means of sending designated contents selected by said selection means to a supply device so as to designate the operation of said supply device.

A still yet further aspect of the present invention is a terminal device, characterized in that said search is a search based on a feeling or sensibility word, which is an adjective, and feeling or sensibility information, which shows the degree of the feeling or sensibility, while attribution values for carrying out a search based on the feeling or sensibility information are stored in said data base.

An additional aspect of the present invention is a terminal device, characterized in that said supply device carries out an operation of supplying a tangible entity.

A still additional aspect of the present invention is a program recording medium characterized by storing a program for allowing a computer to implement all of, or a part of, the functions of each component of a terminal device or an information forwarding system.

On the other hand, the present invention which belongs to the second group is provided taking into consideration the problem that the preparation of a document with an illustration attached thereto is problematic and has the purpose of providing an e-mail preparation device and a program recording medium wherein a user can prepare, by means of a simple operation, a document to which an illustration is attached to the body thereof.

A yet additional aspect of the present invention is an e-mail preparation device characterized by comprising:

a document data preparation and editing means of carrying out preparation and editing of document data;

an added data storage means of storing added data;

an added data selection means of selecting specific added data from said added data storage means; and a synthesizing means of synthesizing said document data and said specific added data so as to generate synthesized data, wherein said synthesized data are transmitted and received as an e-mail.

A still yet additional aspect of the present invention is an e-mail preparation device, characterized in that said added data comprise predetermined attributions.

A supplementary aspect of the present invention is an e-mail preparation, characterized by further comprising an added data display means of displaying added data which become candidates from said storage means in accordance with said predetermined attributions which are indicated, wherein said selection means selects specific added data, from among said added data, which become candidates.

A still supplementary aspect of the present invention is an e-mail preparation device, characterized in that said synthesizing means synthesizes said document data and said specific added data based on editing symbols used by said document data preparation and editing means for editing document data.

A yet supplementary aspect of the present invention is an e-mail preparation device, characterized in that said synthesizing means synthesizes said document data and said added data based on a synthesizing symbol used by said document data preparation and editing means for a synthesis.

A still yet supplementary aspect of the present invention is an e-mail preparation device, characterized in that an indication of said predetermined attributions on a screen is carried out at a position designated by said synthesizing symbol.

Another aspect of the present invention is a program recording medium characterized by recording a program for allowing a computer to implement all of, or a part of, the functions of each means of an e-mail preparation device.

BRIEF DESCRIPTION OF THE DRAWINGS

FIG. 4 is a diagram showing an input screen with search conditions of the first embodiment of the invention, which belongs to the first group of the present invention;

FIG. 5 is a diagram showing an output screen with search results of the first embodiment of the invention, which belongs to the first group of the present invention;

FIG. 9 is a diagram showing an input screen with search conditions of the second embodiment of the invention, which belongs to the first group of the present invention;

FIG. 10 is a diagram showing an output screen with search results of the second embodiment of the invention, which belongs to the first group of the present invention;

FIG. 13 is a diagram showing an input screen with search conditions of the third embodiment of the invention, which belongs to the first group of the present invention;

FIG. 14 is a diagram showing an output screen with search results of the third embodiment of the invention, which belongs to the first group of the present invention;

FIG. 17 is a diagram showing an input screen with search conditions of the fourth embodiment of the invention, which belongs to the first group of the present invention;

FIG. 18 is a diagram showing an output screen with search results of the fourth embodiment of the invention, which belongs to the first group of the present invention;

FIG. 20 is a system configuration diagram according to the fifth embodiment of the invention, which belongs to the first group of the present invention;

FIG. 24 is a diagram showing an input screen with search conditions of the fifth embodiment of the invention, which belongs to the first group of the present invention;

FIG. 25 is a diagram showing an output screen with search results of the fifth embodiment of the invention, which belongs to the first group of the present invention;

FIG. 34 is a diagram for describing the operation of illustration insertion by the e-mail preparation device according to Embodiment 3 of the invention, which belongs to the second group of the present invention;

Figure 1:
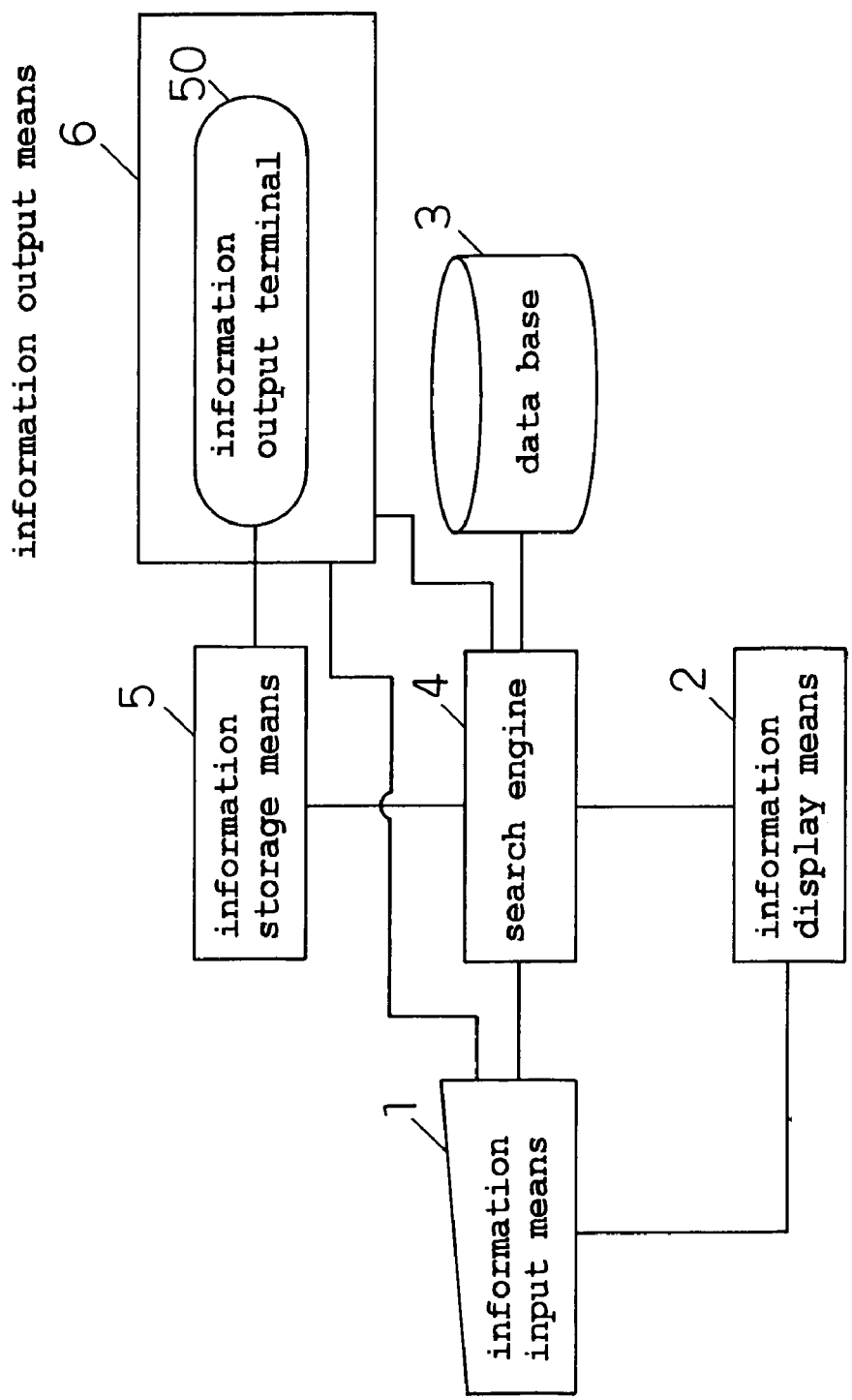
FIG. 1 is a system diagram according to the first embodiment of the invention, which belongs to the first group of the present invention.

DESCRIPTION OF THE NUMERALS 1 information input means
2 information display means
3 data base
4 search engine
5 information storage means
6 information output means
10 terminal communication means
11 server communication means
20 search terminal device
21 information server device
30 feeling or sensibility information input means
31 feeling or sensibility data base
32 feeling or sensibility search engine
50 information output terminal
51 infrared ray transmission means
52 radio wave transmission means
53 removable medium write in means
60 network communication means
61 public telephone network communication means
62 wireless communication means
63 infrared ray communication means
101 VRAM
102 main memory device
103 auxiliary memory device
104 CPU
200 external apparatus
300 connection cable
401 public telephone network
402 removable medium
403 radio wave
404 infrared ray
301 information input means
302 document preparation and editing means
303 illustration storage means
304 illustration presentation means
305 illustration selection means
306 illustration insertion means
307 e-mail transmission and reception means
308 cursor position detection means
309 insertion position designating information detecting means
310 illustration attribution value designating means
311 illustration search means
312 illustration feeling or sensibility attribution value designating means
313 illustration feeling or sensibility search means
314 illustration attribution value detecting means
315 illustration insertion command start up means
316 image capture means
317 illustration synthesizing means
320, 2410 transmission destination designating column
321, 2420 e-mail title designating column
322, 2440 transmission indication button
323 illustration insertion indication button
324 illustration display switching button
325 e-mail preparation screen
326 illustration candidate presentation screen
331 VRAM
332 main memory device
333 auxiliary memory device
334 CPU
335 information communication device
336 information display device
371 cursor
391, 1810 insertion letters designating letter column
1000, 6000, 8000, 10000, 13000, 16000, 20000, 22000, 23000, 26000, 28000, 30000 e-mail preparation device
1110 illustration attribute value input screen 1410 illustration feeling or sensibility attribution value input screen 2000, 24000, 11000, 14000, 27000, 29000, 32000, main window
2430 documents preparation and editing column
3010 public telephone network
2400, 4000 e-mail editing transmission and reception device
40000 download means

BEST EMBODIMENT FOR CARRYING OUT THE INVENTION (A) In the following each embodiment of the invention which belongs to the first group of the present invention is described in reference to the drawings.

Embodiment 1

FIG. 1 is a system configuration diagram of an information forwarding device and method which is the first embodiment. In FIG. 1, an information input means, which allows at least one, or more, inputs from among input of letters, selection of information or input of commands, such as an implementation, is denoted as 1, an information display means, which displays information inputted by means of the information input means 1 and which displays the research result by means of a search engine 4, is denoted as 2, a data base, which stores data that are the objective of a search, is denoted as 3, a search engine, which searches for information that agrees with the search conditions inputted by said information input means 1 from said data base 3, is denoted as 4, an information storage means, of storing search results by said search engine 4 or information that specifies the search result information in a unique manner, is denoted as 5 and an information output means, of outputting information stored in said information storage means 5, is denoted as 6.

Figure 2:
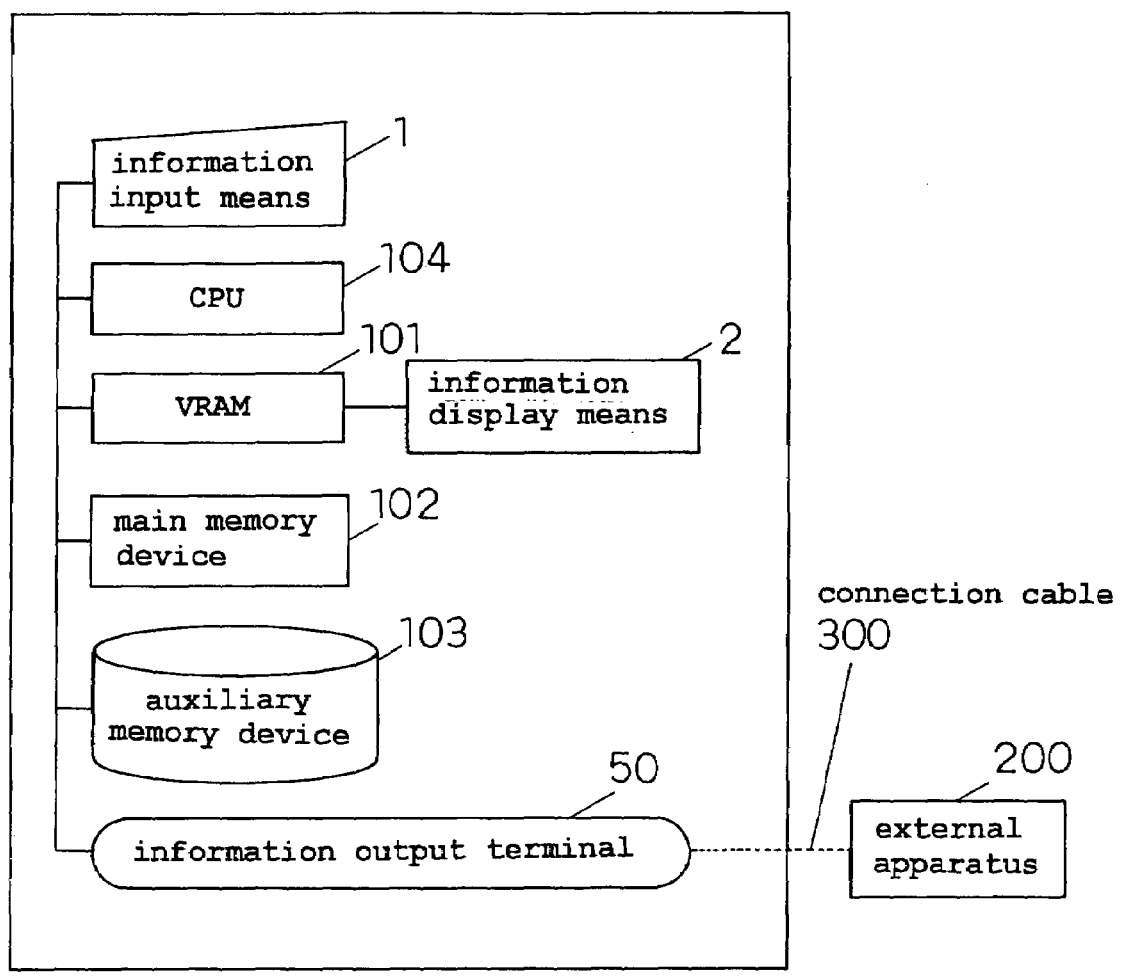
FIG. 2 is a circuit diagram according to the first embodiment of the invention, which belongs to the first group of the present invention.

In addition, an information output terminal, which forms said information output means 6, is denoted as 50. A hardware configuration, wherein the system which is formed as above is implemented, is shown in FIG. 2. FIG. 2 shows, essentially, the same configuration as a versatile computer system and since it includes the same components as the components of the system as shown in FIG. 1, the same components are referred to by the same numerals, of which the descriptions are omitted.

In FIG. 2, an information input means is denoted as 1, an information display means is denoted as 2, a VRAM which stores data to be displayed and outputted is denoted as 101, a main memory device which is a volatile memory for storing a program is denoted as 102, an auxiliary memory device which is a nonvolatile memory for storing a program or data is denoted as 103, a CPU which carries out the program stored in the main memory device 102 is denoted as 104 and information output terminal is denoted as 50.

As described above, the present hardware configuration is, essentially, the same as that of a versatile computer system and the program stored in the auxiliary memory device 103 is run by the CPU 104 after being loaded in the main memory device 102.

In addition, this information forwarding device is connected from the information output terminal 50 to the external apparatus 200 via the connection cable 300.

Figure 3:
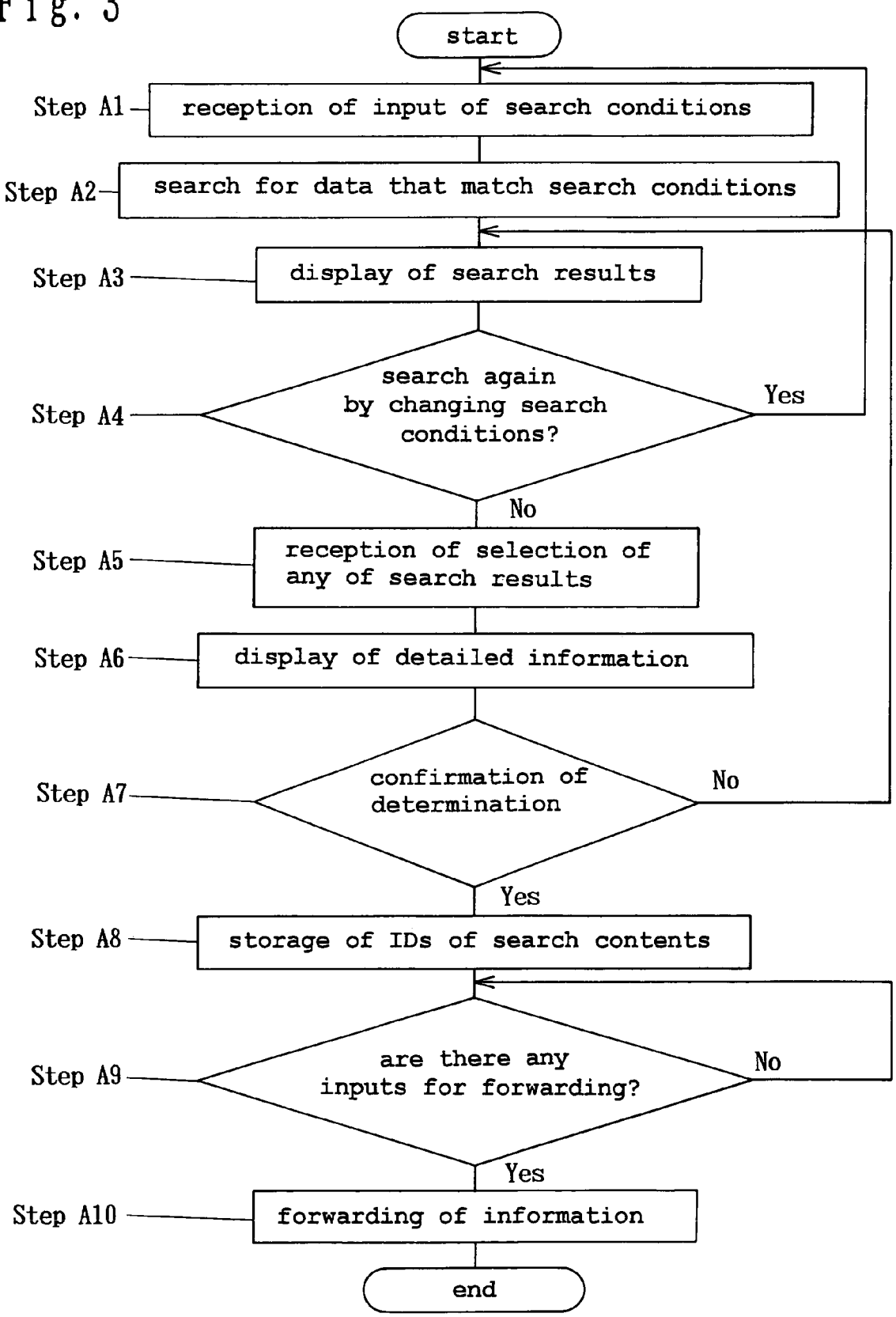
FIG. 3 is a flow chart of the operation of the first embodiment of the invention, which belongs to the first group of the present invention.

The operation of the information forwarding device, formed as above, is described in reference to the flow chart of FIG. 3. In the present embodiment, an example of the search for music titles is described.

(Step A1)
First, conditions of research are received from the information input means 1. For example, the user indicates search conditions such as singer name, song title, era and genres including rock," pops," Japanese popular ballads." As a concrete example, era."=1 990s," genre"=pops," and the like, are inputted. At the time of inputting of information a screen, shown in FIG. 4, may be displayed by the information display means 2.

(Step A2)
Next, the search engine 4 searches for data, from the data base 3, which agrees with the search conditions inputted in Step A1. Data of song titles are stored in advance in the data base 3 so as to have the configuration where a search for singer name, song title, era, genre, lyrics, or the like, is possible.

(Step A3)
Next, the data searched for and found by the search engine 4 are displayed by the information display means 2. FIG. 5 is an example of search result display which displays a list a data which agree with the search conditions inputted in Step A1. In addition, in the case that an amount of data too large to be displayed on a screen of the information display means 2 is searched for and found, it is possible to display the other data by switching the screens or by scrolling the screen.

(Steps A4, A5)
In the case that the data displayed in Step A3 does not include the data desired by the user, the user searches again by changing the search conditions. This is inputted by selecting, with the information input means 1, buttons of search again request" provided in the information input means 1, or the selection menu or the selection buttons of search again request" displayed on the information display means 2. When a search again request is made the process returns to Step A2.

In addition, in the case that the data displayed in Step A3 contain the data desired by the user, the desired song is selected in Step A5. The selection method is the same as in the case of a search again request.

(Step A6)
In the case that the song title is selected in Step A5, detailed data such as the singer, the playing time of the song, the lyrics, and the like, of the corresponding song are called up from the data base 3 so as to be displayed by the information display means 2.

(Step A7)
The user inputs whether or not the data of the song to be stored in the information storage means 5 matches the song displayed in Step A6. In the case that this song matches, the procedure is shifted to the next step and in the case that that this song does not match the procedure returns to Step A3.

(Step A8)
The ID data of the selected song are read out from the data base 3 and are stored in the information storage means 5. The ID data of the song specifies the selected song according to one condition. For example, the ID data are the number, or the like, for designating the song title for karaoke.

(Steps A9, A10)
The input by the user of the indication is in a standby condition for forwarding the ID data of the song title stored in the information storage means 5 to the external apparatus 200 connected through the connection cable 300. As for the external apparatus 200 a karaoke song request device, for example, is cited. As soon as the input is received, a sequence of the procedure is completed by forwarding the song title ID data to the external apparatus 200. In the case that the external apparatus 200 is a karaoke song request device, it becomes possible to request the song through this forwarding operation.

As described above, according to the present embodiment, the data desired by the user which are found through the search can be forwarded to the external apparatus as they are and, therefore, it is possible to carry out operations, such as reservations, registration, and the like, in a simple manner.

Here, the data once stored in the information storage means 5, after being found in the search, can still be stored in the information storage means 5 even after the completion of the forwarding to the external apparatus 200 in Step A10 so as to have a configuration where it is possible to repeat only the operations after Step A9.

In addition, though in the present embodiment the search for a song is carried out according to the singer name, song title, era, genre, lyrics, and the like, this is not limitative and any search method may be used as long as the song can be searched for easily, such as searching a singer name in the order of the Japanese syllabary (searching a singer name alphabetically) or searching a song title in the order of the Japanese syllabary (searching a song title alphabetically).

In addition, though the search for a song title is cited as an example in the present embodiment, the present invention does not limit the data to be searched and can, of course, be applicable to any type of data search.

Here, the search engine of the present embodiment is an example of the search means of the present invention while the information output means of the present embodiment is an example of the output means of the present invention.

Embodiment 2

Figure 6:
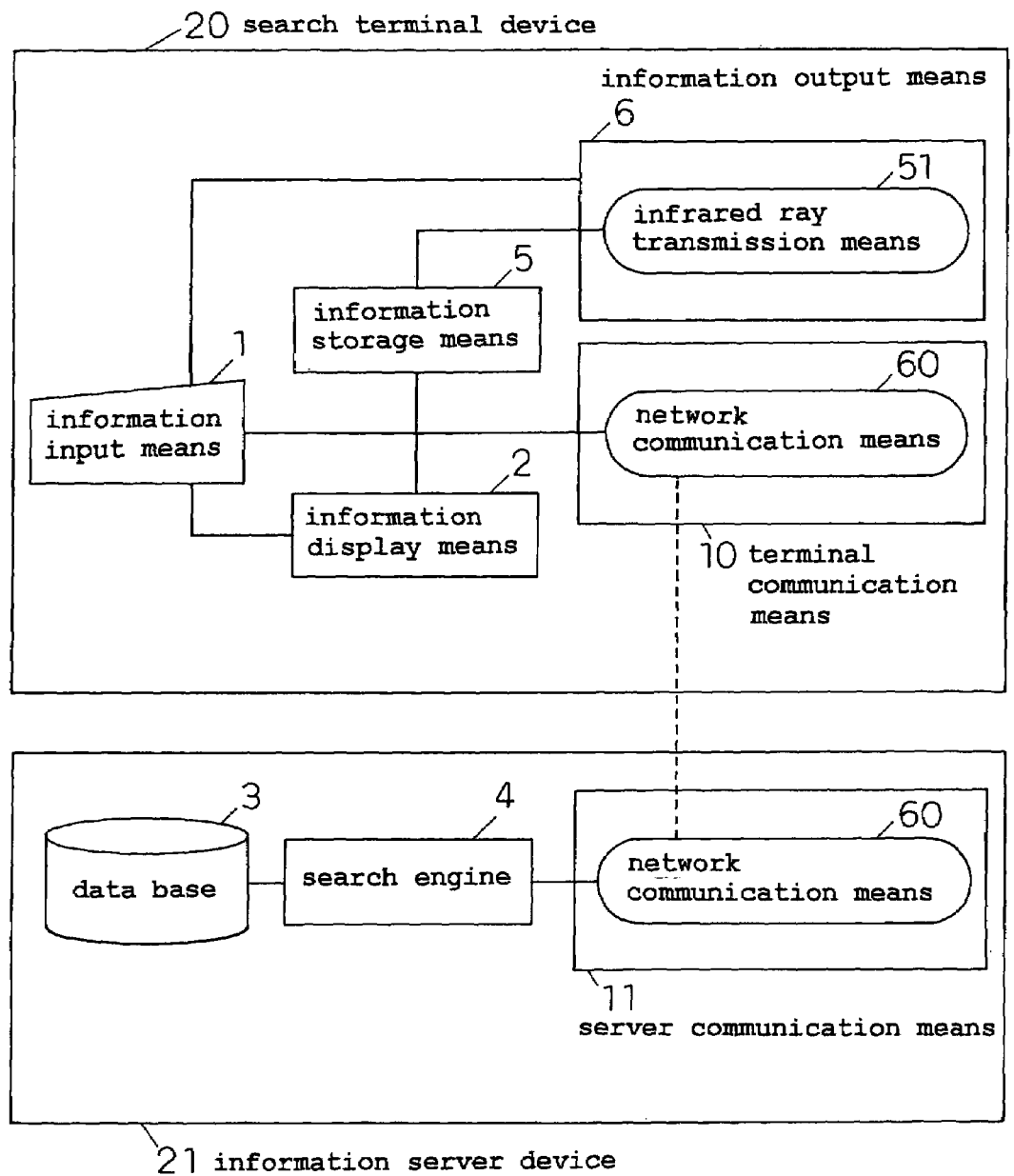
FIG. 6 is a system configuration diagram according to the second embodiment of the invention, which belongs to the first group of the present invention.

FIG. 6 is a system configuration diagram of an information forwarding system which is a embodiment of the second invention.

This includes the same components as in the system configuration diagram of the embodiment of the first invention, which has already been described in FIG. 1 and, therefore, the same components are referred to by the same numerals as in FIG. 1, of which the description is simplified hereinafter.

In FIG. 6 an information input means is denoted as 1, an information display means is denoted as 2, an information storage means is denoted as 5, an information output means is denoted as 6, a terminal communication means, which outputs the search conditions inputted by the information input means 1 and which receives the information of the search result, is denoted as 10 and a search terminal device, comprising all of these, is denoted as 20 and, on the other hand, a data base is denoted as 3, a search engine is denoted as 4, a server communication means, which receives the search conditions from the terminal device and which transmits the search results, is denoted as 11 and an information server device, comprising all of these, is denoted as 21.

In addition, an infrared ray transmission means, which forms said information output means 6, is denoted as 51 and a network communication means, which forms said terminal communication means 10 and said server communication means 11, is denoted as 60.

A hardware configuration wherein the system configured as described above is implemented is shown in FIG. 7.

Figure 7:
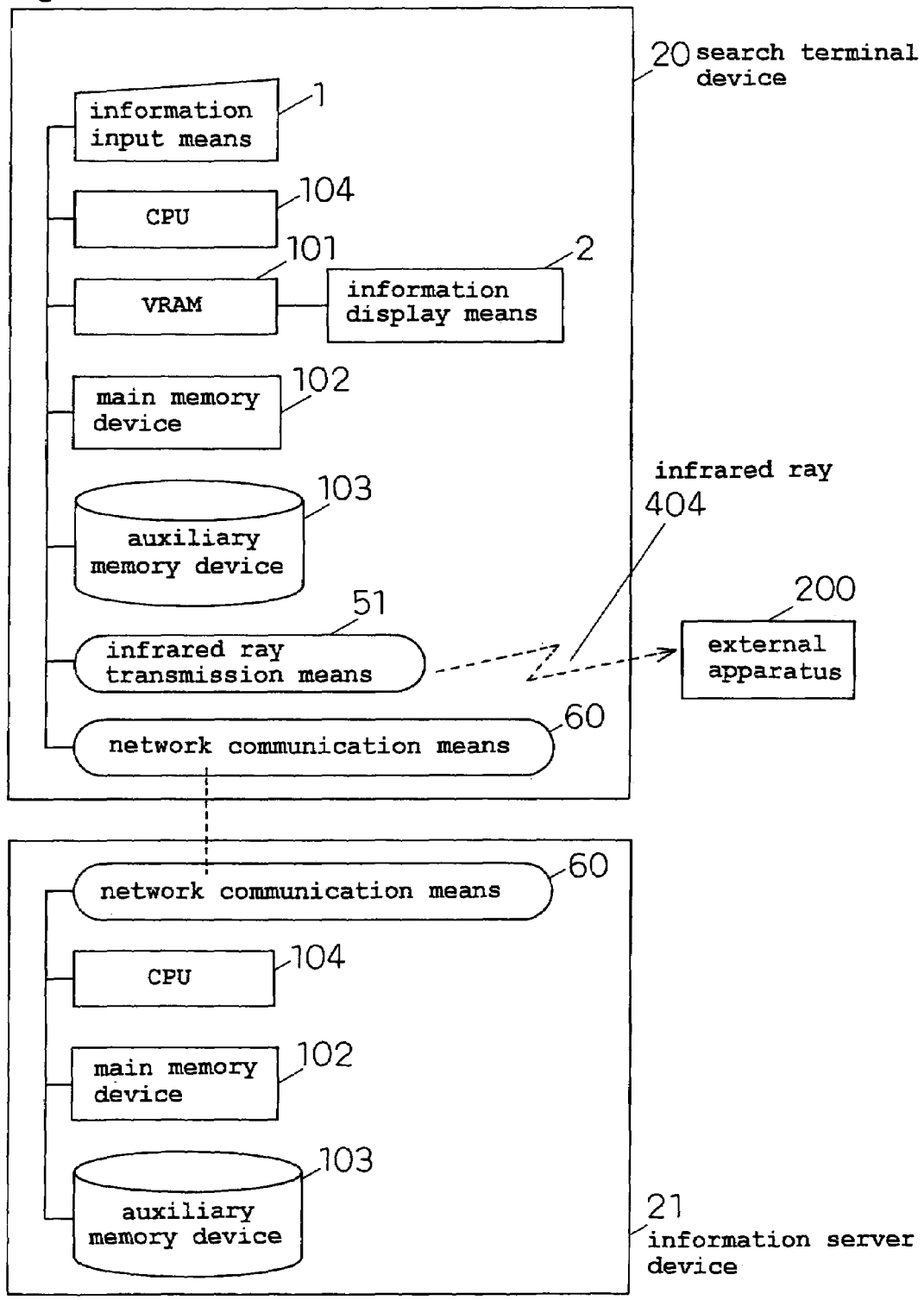
FIG. 7 is a hardware configuration diagram according to the second embodiment of the invention, which belongs to the first group of the present invention.

In FIG. 7, the search terminal device 20 and the information server device 21 are, both, essentially the same as in the configuration of a versatile computer system. In addition, since the same components as the components of the system shown in FIG. 6 are included, the same components are referred to by the same numerals, of which the descriptions are omitted.

In FIG. 7, on the search terminal device 20 end, an information input means is denoted as 1, an information display means is denoted as 2, a VRAM for storing the data outputted and displayed is denoted as 101, the main memory device, which is a volatile memory for storing a program, is denoted as 102, an auxiliary memory device, which is a nonvolatile memory for storing a program or data, is denoted as 103, a CPU, for running the program stored in the main memory device 102, is denoted as 104, an infrared transmission means is denoted as 51 and a network communication means is denoted as 60. In addition, on the information server device 21 end, the main memory device, which is a volatile memory for storing a program, is denoted as 102, an auxiliary memory device, which is a nonvolatile memory for storing a program or data, is denoted as 103, a CPU, for running the program stored in the main memory device 102, is denoted as 104 and a network communication means is denoted as 60.

The search terminal device 20 and the information server device 21 mutually communicate by means of the network communication means 60. Cables, such as for the Internet, an intranet, and the like, are directly connected to the network communication means 60.

As described above, the present hardware configuration is essentially the same as that of the versatile computer system and the program stored in the auxiliary memory device 103 is run by the CPU 104 after being loaded into the main memory device 102.

In addition, this information forwarding system sends out information from the infrared transmission means 51 to the external apparatus 200 by means of the infrared rays.

Figure 8:
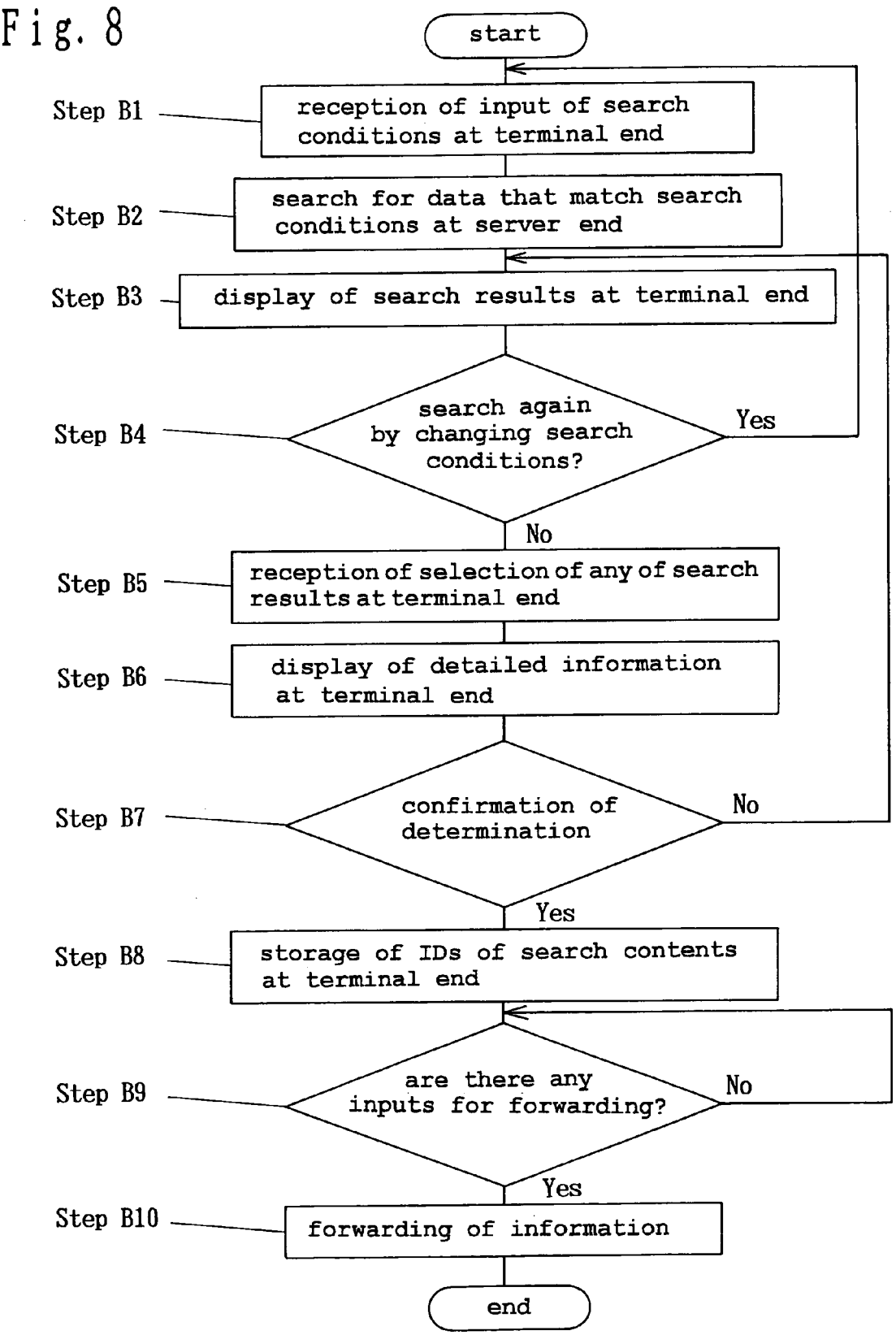
FIG. 8 is a flow chart of the operation of the second embodiment of the invention, which belongs to the first group of the present invention.

The operation of the information forwarding system, which is formed as described above, is described in reference to the flow chart of FIG. 8. In this embodiment, the search for a TV program is described as an example.

(Step B1)

First of all, search conditions are received from the information input means 1 of the search terminal device 20. For example, the user indicates the search conditions, such as channel, program title, actors or genre. As a concrete example actor"=Yujiro Ishihara" while genre"=drama," or the like, are inputted. At the time of the input of the information, a screen, as shown in FIG. 9, may be displayed on the information display means 2. The inputted search conditions are sent to the information server device 21 by means of the network communication means 60.

(Step B2)

Next, in the information server device 21, the search engine 4 searches for the data which agree with the search conditions inputted from the data base 3 in Step B1. The data of program titles are stored in advance in the data base 3 so as to have the configuration where searching is possible according to channel, program title, actor, genre, and the like. The search results are sent to the search terminal device 20 via, again, the network communication means 60.

(Step B3)

Next, the data searched by the search engine 4 at the search terminal device 20 end are displayed on the information display means 2.

FIG. 10 shows an example of the search result display which displays a list of data that agree with the search conditions inputted in Step B1. In addition, in the case that an amount of data that is too large to be displayed on the screen of the information display means 2 are found, it is possible to display all of the data by switching the screen or by scrolling the screen.

(Steps B4, B5)

In the case that no data desired by the user are in the data displayed in Step B3, the user searches again by changing the search conditions. This is inputted by selecting the search again request" button provided in the information input means 1 or by selecting, with the information input means 1, search again request," selection menus or selection buttons displayed on the information display means 2. When a search is again requested, the procedure returns to Step B2.

In addition, in the case that the data desired by the user exist in the data displayed in Step B3, the desired data are selected in Step B5. The selection method is the same as in the case of a search again request.

(Step B6)

When the program title is selected in Step B5, detailed data such as the channel, the broadcast time, or the like, of the corresponding program are again retrieved from the data base 3 of the information server device 21 so as to be displayed on the information display means 2. As for the detailed information of programs, information can be gained from an EPG (electronic program guide) sent in advance from a broadcasting station so as to be stored in the data base.

(Step B7)

The user inputs whether or not the data of a program to be stored in the information storage means 5 match the program displayed in Step B6. In the case that this program matches, the procedure proceeds to the next step while in the case that this program does not match, the procedure returns to Step B3.

(Step B8)

The ID data of the selected program are read out from the data base 3 of the information server device 21 so as to be stored in the information storage means 5 of the search terminal device 20. Some ID data of programs specify the selected program in a unique manner. Such data are, for example, the data formed of the broadcast date and time, the channels, or the like, or a numerical sequence called G code. Furthermore, program identity labels (PIL) used for VPS (video program system) or PDC (program delivery control) can be used to identify the program in a unique manner.

(Steps B9, B10)

The input of the indication of the forwarding program titles stored in the information storage means 5 by the user to the external apparatus 200 is in a standby condition. The external apparatus 200 is, for example, a VCR. In the case that there is an input, the program ID data are forwarded to the external apparatus 200 so as to complete a sequence of processes. In the case that the external apparatus 200 is a VCR, the recording reservation is hereby complete.

Here, the data that have been once stored in the information storage means 5 due to the search remain stored in the information storage mean-s 5 even after the forwarding to the external apparatus 200 is completed in Step B10 so that the configuration makes possible the repetition of the operations of, and subsequent to, Step B9.

In addition, though the search for a program title is cited as an example in the present embodiment, the present invention does not limit the searched for data but, rather, is, of course, applicable to all types of data searches.

Here, the search engine of the present embodiment is an example of the search means of the present invention, information output means such as an infrared ray communication, a supersonic wave communication, a wireless communication, and the like, according to the present embodiment are examples of the output means that are in accordance with the present invention and the supply device of the present invention is not limited to the VCR of the present embodiment but, rather, may be a television receiver or a set top box (broadcast receiver, broadcast receiving tuner).

Embodiment 3

Figure 11:
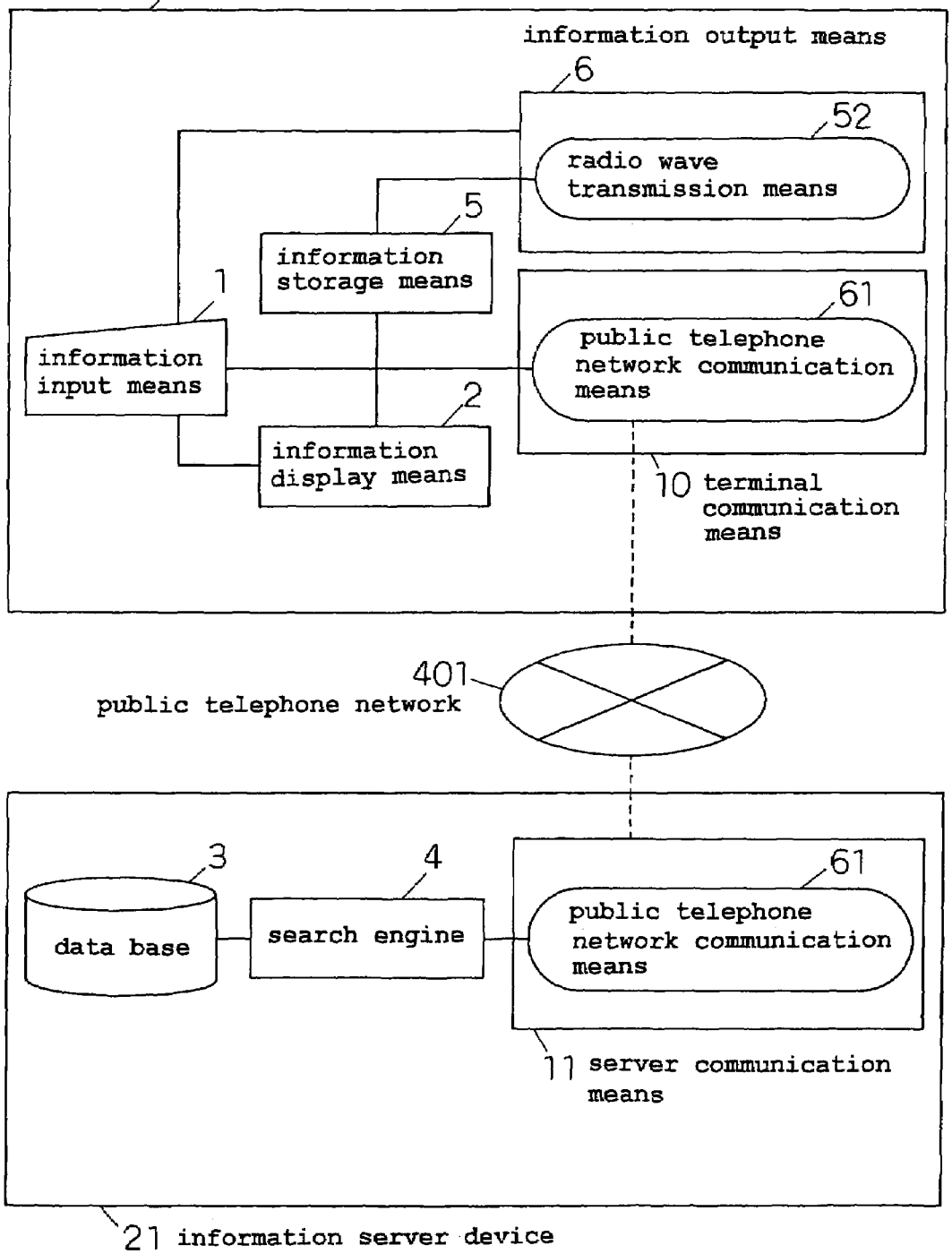
FIG. 11 is a system configuration diagram according to the third embodiment of the invention, which belongs to the first group of the present invention.

FIG. 11 is a system configuration diagram of an information forwarding system which is a embodiment of the third invention.

This includes the same components as the system configuration diagrams of the embodiments of the first and the second inventions already described in FIGS. 1 and 6 and, therefore, the same numerals refer to the same components as in FIGS. 1 and 6, of which the descriptions are hereinafter simplified.

In FIG. 11 an information input means is denoted as 1, an information display means is denoted as 2, an information storage means is denoted as 5, an information output means is denoted as 6, a terminal communication means is denoted as 10 and a search terminal device, which comprises all of these, is denoted as 20 and, on the other hand, a data base is denoted as 3, a search engine is denoted as 4, a server communication means is denoted as 11 and an information server device, which comprises all of these, is denoted as 21.

In addition, a radio wave transmission means forming said information output means 6 is denoted as 52 and a public telephone network communication means, which forms said terminal communication means 10 and said server communication means 11, is denoted as 61.

Figure 12:
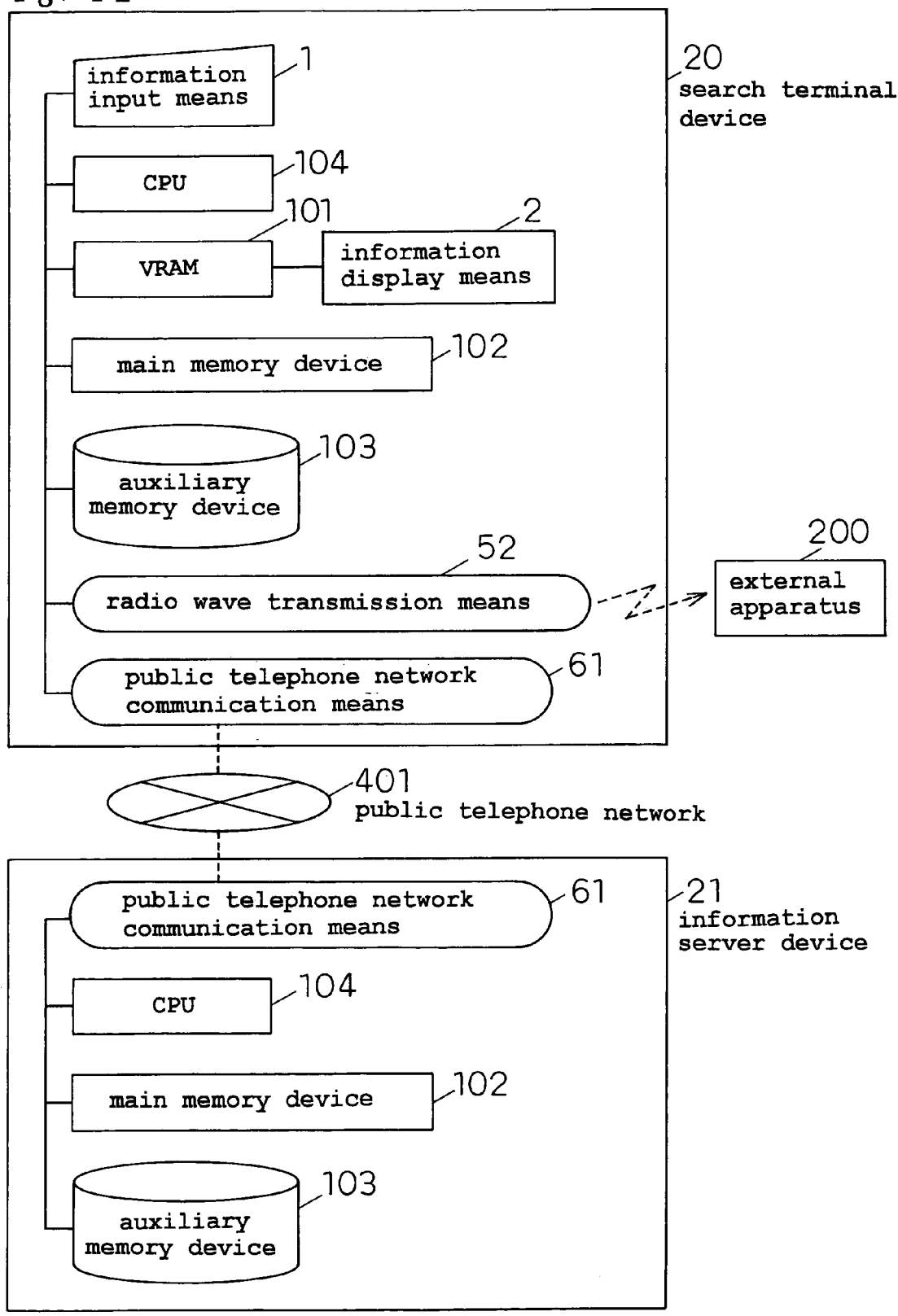
FIG. 12 is a hardware configuration diagram according to the third embodiment of the invention, which belongs to the first group of the present invention.

A hardware configuration wherein the system, formed as above, is implemented is shown in FIG. 12. FIG. 12 shows the search terminal device 20 and information server device 21, of which the configurations are both essentially the same as of a versatile computer system. In addition, the same components as the components of the system shown in FIG. 11 are included and, therefore, the same components are referred to by the same numerals, of which the descriptions are omitted.

In FIG. 12, at the search terminal device 20 end, an information input means is denoted as 1, an information display means is denoted as 2, a VRAM, for storing data to be displayed and outputted, is denoted as 101, a main memory device, which is a volatile memory for storing a program, is denoted as 102, an auxiliary memory device, which is a nonvolatile memory for storing a program or data, is denoted as 103, a CPU, for running a program stored in the main memory device 102, is denoted as 104, a radio wave transmission means is denoted as 52 and a public telephone network communication means is denoted as 61.

In addition, at the information server device 21 end, a main memory device, which is a volatile memory for storing a program, is denoted as 102, an auxiliary memory device, which is a nonvolatile memory for storing a program or data, is denoted as 103, a CPU, for running a program stored in the main memory device 102, is denoted as 104 and a public telephone network communication means is denoted as 61. The search terminal device 20 and the information server device 21 communicate with each other through the public telephone network communication means 61. The public telephone network communication means 61 is connected to any public telephone network, such as an analog telephone network, an ISDN network, a digital cellular telephone network, or a PHS network or communicates through a connection via a plurality of types of public telephone networks.

As described above, the present hardware configuration is essentially the same as that of a versatile computer system and the program stored in the auxiliary memory device 103 is loaded into the main memory device 102 before being run by the CPU 104.

In addition, this information forwarding device transmits information from the radio wave transmission means 52 to the external apparatus 200 by means of radio waves.

The operation of the information forwarding system formed as above is described by using the flow chart. In the present embodiment an operation similar to that in the second embodiment is carried out and, therefore, the description refers to FIG. 8 in the same manner as in the second embodiment.

In the present embodiment, the search for a hotel by means of a digital cellular telephone is cited as an example in the description.

(Step B1)

Firstly, search conditions are received from the search terminal device 20, that is to say, from the information input means 1 of a digital cellular telephone. For example, search conditions such as location, type, price range, distance from the train station and date of usage are given by the user. As a concrete example, location"=Osaka" and price range"= approximately 10,000 yen" are inputted. At the time of information input, a screen, as shown in FIG. 13, may be displayed on the information display means 2.

The inputted search conditions are sent to the information server device 21 by means of the public telephone network communication means 61. In the case of the present embodiment, a digital cellular telephone public telephone network is utilized as a public telephone network.

(Step B2)

Next, in the information server device 21, the search engine 4 searches for the data which agree with the search conditions inputted in Step B1 from the data base 3. Hotel data are stored in advance in the data base together with the vacancy conditions so that the configuration allows the search from location, type, price range, distance from the train station, date of usage, or the like. In addition, the vacancy conditions are updated for every constant period of time. The search results are sent to the search terminal device 20, again passing through the public telephone network communication means 61.

(Step B3)

Next, the search terminal device 20 displays the data searched by the search engine 4 on the information display means 2.

As an example of the search result display, FIG. 14 shows a list of data of hotels which have vacant rooms that agrees with the search conditions inputted in Step B1. In addition, in the case that an amount of data too large to be displayed on the screen of the information display means 2 is searched and found, it is possible to display the data not first shown by switching the screens, by scrolling the screen, or the like.

(Steps B4, B5)

In the case that the data displayed in Step B3 do not contain the data desired by the user, the user searches again by changing the search conditions. This is inputted by means of the search again request" button provided in the information input means 1, or by selecting search again request" on the information display means 2, or by selecting, with the information input means 1, a selection button, or a selection menu, displayed on the information display means 2. When the search is again requested, the procedure returns to Step B2 again.

In addition, in the case that the data displayed in Step B3 contains the data desired by the user, the desired data are selected in Step B5. The selection method is the same as in the case of the search again request.

(Step B6)

When hotel is selected in Step B5, detailed data, such as the locations, price ranges of the corresponding hotels, are again called up from the data base 3 of the information server device 21 so as to be displayed on the information display means 2.

(Step B7)

The user inputs whether or not the data of the hotels stored in the information storage means 5 match the hotels displayed in Step B6. In the case that these hotels match, the procedure shifts to the next step while in the case that that these hotels do not match the procedure returns to Step B3.

(Step B8)

The ID data of the selected hotels are read out from the data base 3 of the information server device 21 so as to be stored in the information storage means 5 of the search terminal device 20. In some cases, the hotel ID data specify which type of room from which hotel has been reserved on which day in a unique manner. For example, the ID data are a letter sequence, or the like, formed of a hotel ID code and a reservation ID code.

(Steps B9, B10)

The input of the indication, by the user, to forward the hotel ID data, stored in the information storage means 5 to the external apparatus 200, is in the standby condition. The external apparatus 200 is, for example, a terminal for confirming a reservation placed at the front desk of the hotel. In the case that the input for forwarding is received from the user, the hotel ID data are forwarded by the external apparatus 200 through radio waves so as to complete the sequence of the processing. In the case that, in accordance with the external apparatus 200, which is a reservation confirmation terminal at the front desk of a hotel, the forwarded information has a correct reservation code, the user can check in.

In addition, by directly mounting a cellular telephone on the reservation confirmation terminal of the hotel, the output means can output the hotel ID data at the reservation confirmation terminal of the hotel. Or a telephone call may be made to the reservation confirmation terminal from a cellular telephone.

Here, though the search for a hotel is cited as an example in the present embodiment, the present invention does not restrict the types of data to be searched and is, of course, applicable to the search for any type of data.

In addition, though a digital cellular telephone network is cited as an example for a public telephone network for carrying out a telecommunication, the present invention does not restrict the type of public telephone network and, rather, is applicable to any type of public telephone network, such as an analog network, an ISDN network, or a PHS network.

Here, the search engine of the present embodiment is an example of the search means of the present invention and an information output means of carrying out information transmission by means of communication through radio waves, infrared ray communication, transmission of information through removable media, mounting of a terminal device, or the like, according to the present embodiment are examples of the output means of the present invention. That is to say, the output means of the present invention may be anything which can convey information to the supply device. The external apparatus of the present embodiment, that is to say, the reservation confirmation terminal at the front desk of a hotel is an example of a supply device according to the present invention.

Embodiment 4

Figure 15:
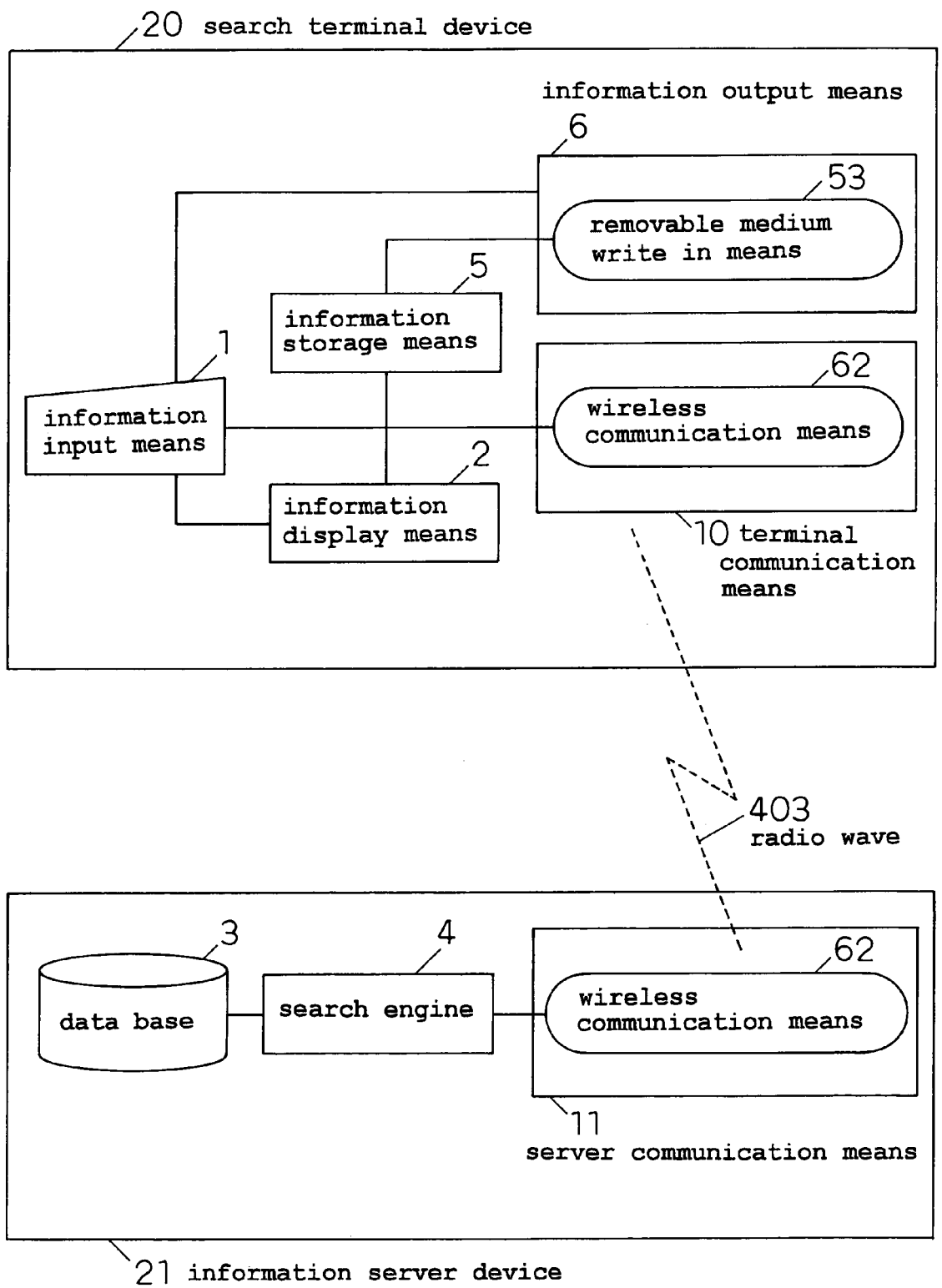
FIG. 15 is a system configuration diagram according to the fourth embodiment of the invention, which belongs to the first group of the present invention.

FIG. 15 is a system configuration diagram of an information forwarding system which is a embodiment of the fourth invention.

Since this includes the same components as of the system configuration diagram of the embodiments of the first and the second inventions, which have already been described in reference to FIGS. 1 and 6. The same components are referred to by the same numerals in FIGS. 1 and 6, of which the descriptions are simplified hereinafter.

In FIG. 15, an information input means is denoted as 1, an information display means is denoted as 2, an information storage means is denoted as 5, an information output means is denoted as 6, a terminal communication means is denoted as 10 and a search terminal device, which comprises all of these, is denoted as 20, and, on the other hand a data base is denoted as 3, a search engine is denoted as 4, a server communication means is denoted as 11 and an information server device, which comprises all of these, is denoted as 21.

In addition, a removable medium write in means, which forms said information output means 6 and serves as a means of writing information into the removable medium, is denoted as 53 and a wireless communication means, which forms said terminal communication means 10 and said server communication means 11 and wherein the terminal and the server directly carry out a communication through radio waves without passing via a public telephone network, or the like, is denoted as 62.

The hardware configuration wherein a system configured as described above is implemented is shown in FIG. 16.

Figure 16:
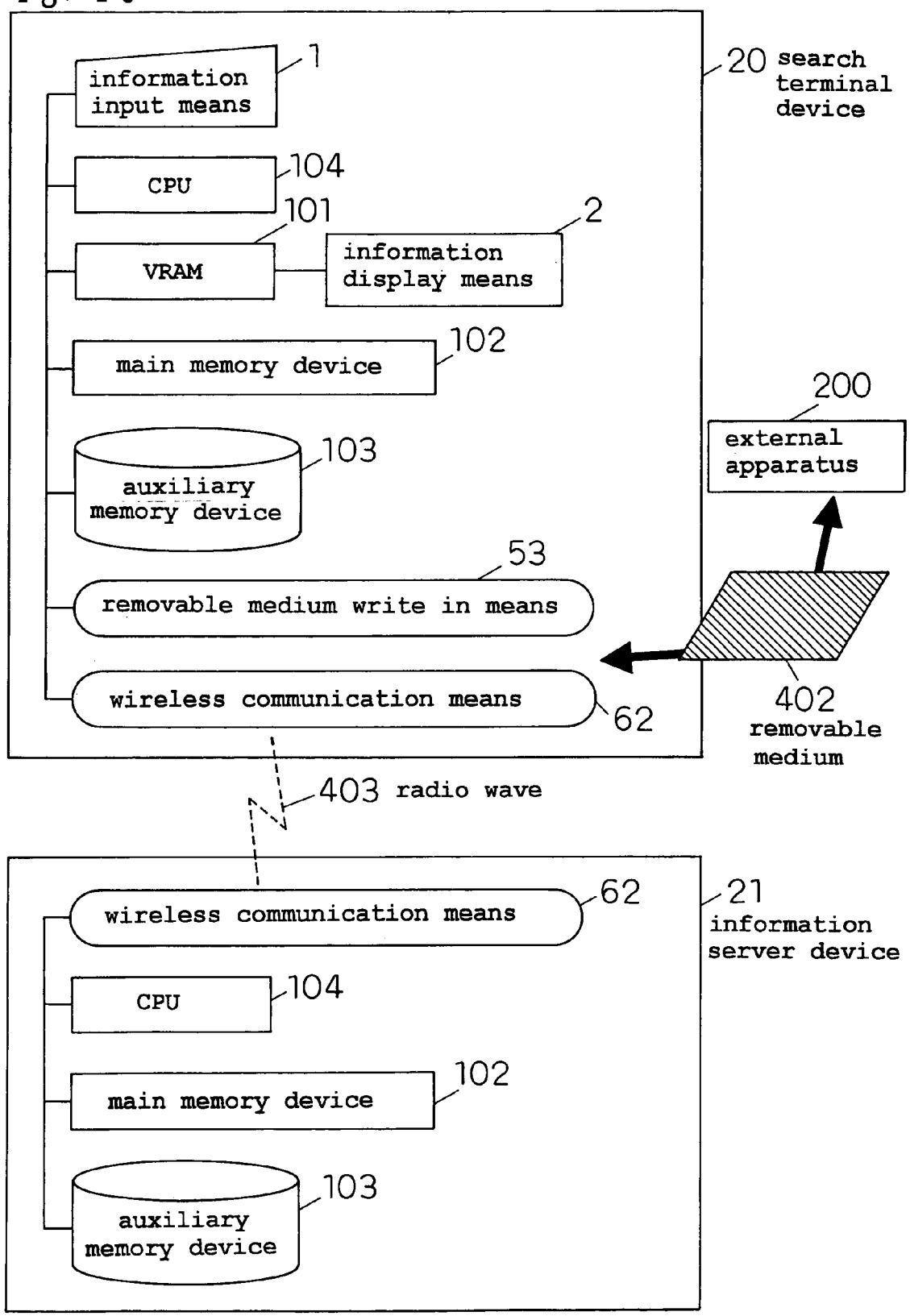
FIG. 16 is a hardware configuration diagram according to the fourth embodiment of the invention, which belongs to the first group of the present invention.

In FIG. 16, the search terminal device 20 and the information server device 21, both, have essentially the same configuration as the versatile computer system. In addition, since the same components as the components of the system shown in FIG. 15 are included, the same components are referred to by the same numerals, of which the descriptions are omitted.

In FIG. 16, on the search terminal device 20 end, an information input means is denoted as 1, an information display means is denoted as 2, a VRAM for storing the data to be displayed and outputted is denoted as 101, a main memory device, which is a volatile memory for storing a program, is denoted as 102, an auxiliary memory device, which is a nonvolatile memory for storing a program or data, is denoted as 103, a CPU, which runs the program stored in the main memory device 102, is denoted as 104, a removable medium write in means is denoted as 53 and a wireless communication means is denoted as 62.

In addition, on the information server device 21 end, a main memory device, which is a volatile memory for storing a program, is denoted as 102, an auxiliary memory device, which is a nonvolatile memory for storing a program or data, is denoted as 103, a CPU, which runs the program stored in the main memory device 102, is denoted as 104 and a wireless communication means is denoted as 62. The search terminal device 20 and the information server device 21 mutually communicate by means of the wireless communication means 62.

As described above, the present hardware configuration is essentially the same as that of a versatile computer system and the program stored in the auxiliary memory device 103 is run by the CPU 104 after being loaded into the main memory device 102.

In addition, the removable medium write in means 53 writes information into the removable medium 402 while the external apparatus 200 reads out information from the removable medium read out means, which is not shown, and, thereby, the above information forwarding device transmits information from the search terminal device 20 to the external apparatus 200.

The operation of the above described information forwarding system formed is described by using a flow chart. Since the embodiment of the present invention has a similar operation as the second embodiment the description is given in reference to FIG. 8 in the same manner as of the second embodiment.

In the present embodiment search for a railroad ticket through a wireless terminal is described as an example.

(Step B1)

First of all, the search conditions are received from the information input means 1 of the search terminal device 20. For example, the user indicates the search conditions, such as usage date, segment, train used, seat class, and the like. As a concrete example, usage date"=March 3" while segment"=Osaka to Toyama," and the like, are inputted. At the time of the inputting of the information, a screen, as shown in FIG. 17, may be displayed on the information display means 2.

The inputted search conditions are sent to the information server device 21 by means of the wireless communication means 62.

(Step B2)

Next, the search engine 4 searches for the data, in the information server device 21, which agree with the search conditions inputted from the data base 3 in Step B1. The train data are stored in the data base 3, in advance, together with the status of seat vacancies so as to gain the configuration where the search is possible according to usage date, segment, departure time, seat class, and the like. Here, the status of seat vacancies is updated at constant time intervals. The search results are sent to the search terminal device 20 via, again, the wireless communication means 61.

(Step B3)

Next, on the search terminal device 20 end, the data searched for and found by the search engine 4 are displayed on the information display means 2. As an example of a search result display, FIG. 18 shows a list of the data of trains having vacant seats which agree with the search conditions inputted in Step B1. In addition, in the case that an amount of data too large to be displayed on a screen of the information display means 2 is searched for and found, it is possible to display the other data by switching the screens or by scrolling the screen.

(Steps B4, B5)

In the case that the data displayed in Step B3 do not contain the data desired by the user, the user searches again by changing the search conditions. This is inputted by means of the search again request" button provided in the information input means 1, or by selecting search again request" on the information display means 2, or by selecting, with the information input means 1, a selection button, or a selection menu, displayed on the information display means 2 after selecting search again request" or selecting the selection button. When the search is again requested, the procedure returns to Step B2 again.

In addition, in the case that the data displayed in Step B3 include the data desired by the user, the desired data are selected in Step B5. The selection method is the same as in the case of the search again request.

(Step B6)

When a train is selected in Step B5, detailed data such as train name, fee, departure time, or the like, of the corresponding train are again called up from the data base 3 of the information server device 21 so as to be displayed on the information display means 2.

(Step B7)

The user inputs whether or not the train data stored in the information storage means 5 match the train displayed in Step B6. In the case that this train matches, the procedure shifts to the next step while in the case that this train does not match, the procedure returns to Step B3.

(Step B8)

The ID data of the selected train are read out from the data base 3 of the information server device 21 and are stored in the information storage means 5 of the search terminal device 20. In some cases, the train ID data specify which seat of which train is reserved for which segment in a unique manner.

(Steps B9, B10)

The input of the indication by the user to forward the train ID data stored in the information storage means 5 to the removable medium 402 is in the standby condition. The removable medium 402 may be a magnetic card, an IC card, a flash memory, a floppy disc, or the like.

When the train ID data is forwarded to the removable medium 402, the user carries this removable medium 402 on their person and, in the case that the train ID data stored in the removable medium 402, of the removable medium read out means of the ticket vending machine of a station which is an external apparatus 200, are the correct data, the ticket for the train, that the user has reserved, is issued.

Here, though a search for a train is cited as an example in the present embodiment, the present invention does not limit the data to be searched and is, of course, applicable to a search of any type of data.

Here, in the information forwarding device of the embodiment of the first invention, though the case of the usage of the information output terminal 50 as the information output means 6 is described, any of: the infrared transmission means 51, the radio wave transmission means 52 or the removable medium write in means 53, which are used in the second, third or fourth embodiments, may be used as the information output means 6.

In addition, in the information forwarding system of the second, third or fourth embodiment, any of: the information output terminal 50, the infrared ray transmission means 51 or the radio wave transmission means 52, or the removable medium write in means 53 may be used as the information output means 6 in the same manner.

In addition, in the information forwarding system of the second, third or fourth embodiment, any of: the network communication means 60, the wireless communication means 61 or the wireless communication means 62 may be used as the terminal communication means 10.

Figure 19:
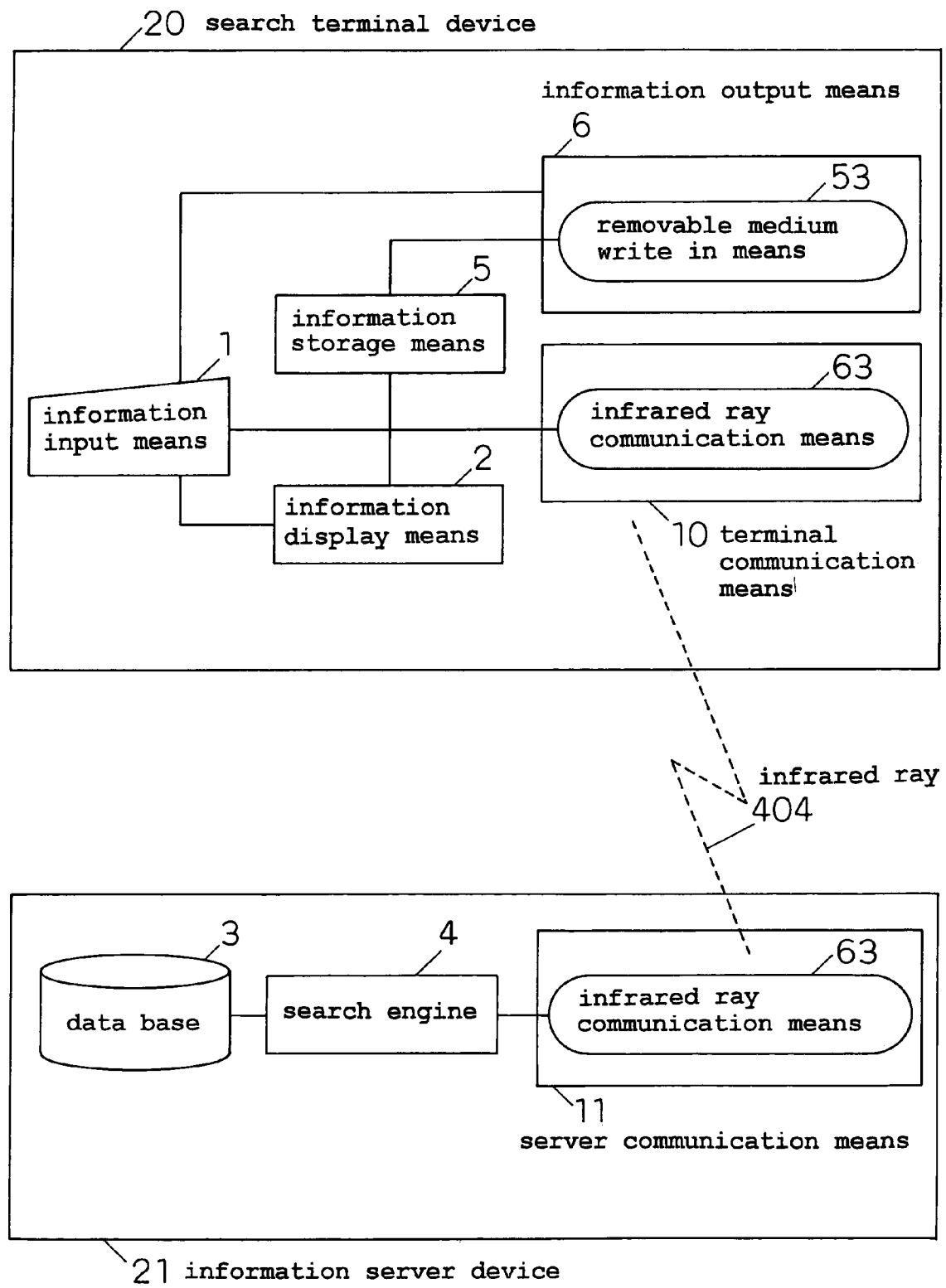
FIG. 19 is another system configuration diagram according to the fourth embodiment of the invention, which belongs to the first group of the present invention.

In addition, in the information forwarding system of the embodiments of the second, the third or the fourth invention, the infrared ray communication means 63 may be used as the terminal communication means 10, as shown in FIG. 19.

Here, the search engine of the present embodiment is an example of the search means of the present invention, the information output means of the present embodiment is an example of the output means of the present invention, the transmission of data by means of communication through a connection cable, infrared ray communication, wireless communication and removable media according to the present embodiment is a communication method used in the information output means of the present embodiment and are external apparatus, which is a ticket vending machine of a station according to the present embodiment, is an example of the supply device of the present embodiment.

Embodiment 5

FIG. 20 is system configuration diagram of an information forwarding system which is a embodiment of the fifth invention. Since this configuration includes the same components as in the system configuration diagram of the embodiments of the first and second inventions, which have already been described in reference to FIGS. 1 and 6, the same components are referred to by the same numerals as in FIGS. 1 and 6, of descriptions are simplified hereinafter.

In FIG. 20, an information input means is denoted as 1, an information display means is denoted as 2, an information storage means is denoted as 5, an information output means is denoted as 6, a terminal communication means is denoted as 10, a feeling or sensibility information input means, which inputs feeling or sensibility information used for the search, is denoted as 30 and a search terminal device, which comprises all of these, is denoted as 20 and, on the other hand, a data base is denoted as 3, a server communication means is denoted as 11, a feeling or sensibility data base, which stores feeling or sensibility data with respect to the data stored in said data base 3, is denoted as 31, a feeling or sensibility search engine, which searches for data according to the search conditions of the feeling or sensibility search, is denoted as 32 and an information server device, which comprises all of these, is denoted as 21. In addition, a radio wave transmission means, which forms said information output means 6, is denoted as 52 and a public telephone network communication means, which forms said terminal communication means 10 and said server communication means 11, is denoted as 61.

Figure 21:
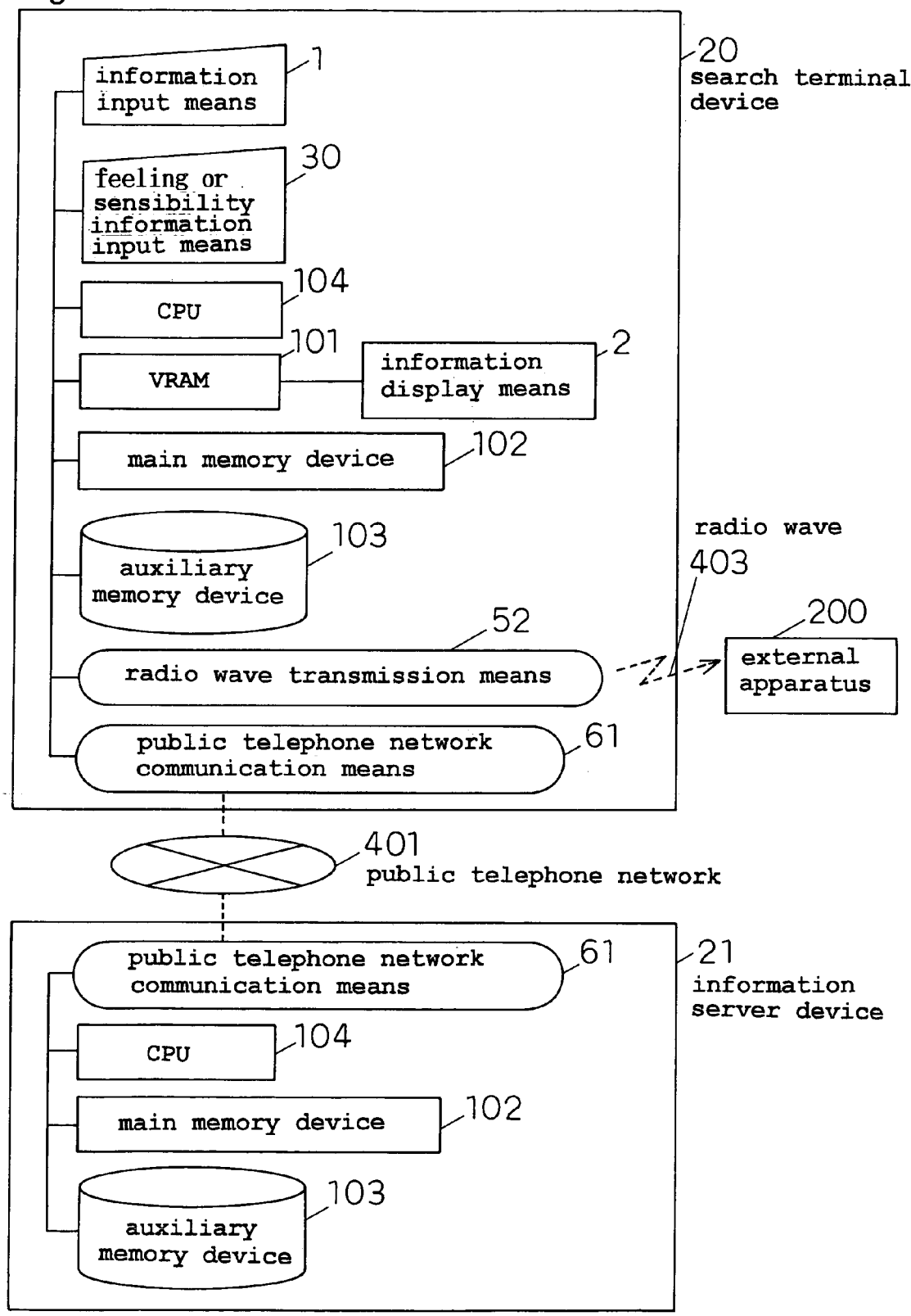
FIG. 21 is a hardware configuration diagram according to the fifth embodiment of the invention, which belongs to the first group of the present invention.

A hardware configuration where the system configured as described above is implemented is shown in FIG. 21. In FIG. 21, the search terminal device 20 and the information server device 21 both have essentially the same configuration as a versatile computer system. In addition, since the same components as the components of the system shown in FIG. 20 are included, the same components are referred to by the same numerals, of which the descriptions are omitted.

In FIG. 21, on the search terminal device 20, an information input means is denoted as 1, a feeling or sensibility information input means is denoted as 30, an information display means is denoted as 2, a VRAM, which stores the data to be displayed and outputted, is denoted as 101, a main memory device, which is a volatile memory for storing a program, is denoted as 102, an auxiliary memory device, which is a nonvolatile memory for storing a program or data, is denoted as 103, a CPU, for running the program stored in the main memory device 102, is denoted as 104, a radio wave transmission means is denoted as 52 and a public telephone network communication means is denoted as 61. The search terminal device 20 and the information server device 21 mutually communicate by means of the public telephone network communication means 61. The public telephone network communication means 61 processes the communication by being connected to any public telephone network of: analog telephone network, ISDN network, digital cellular telephone network or PHS telephone network or processes the communication by using a plurality of these line networks.

As described above, the present hardware configuration is essentially the same as a versatile computer system and the program stored in the auxiliary memory device 103 is run by the CPU 104 after being loaded into the main memory device 102.

In addition, this information forwarding device sends out information from the radio wave transmission means 52 to the external apparatus 200 by means of radio waves.

Figure 22:
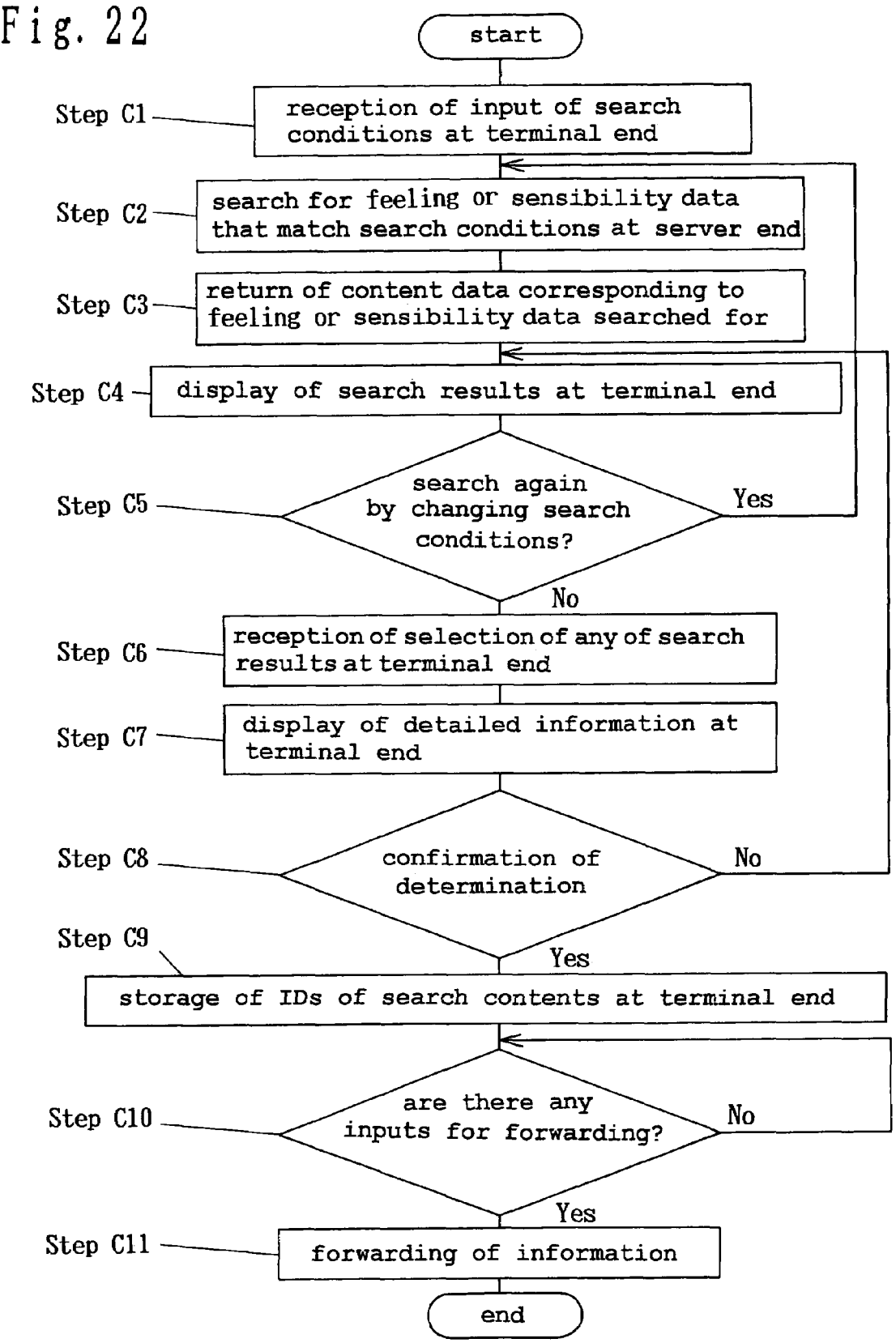
FIG. 22 is a flow chart of the operation of the fifth embodiment of the invention, which belongs to the first group of the present invention.

The operation of the information forwarding system, which is configured as described above, is described by using the flow chart of FIG. 22.

In this embodiment, the search for a movie by means of a digital cellular telephone is described as an example.

(Step C1)

Figure 23:
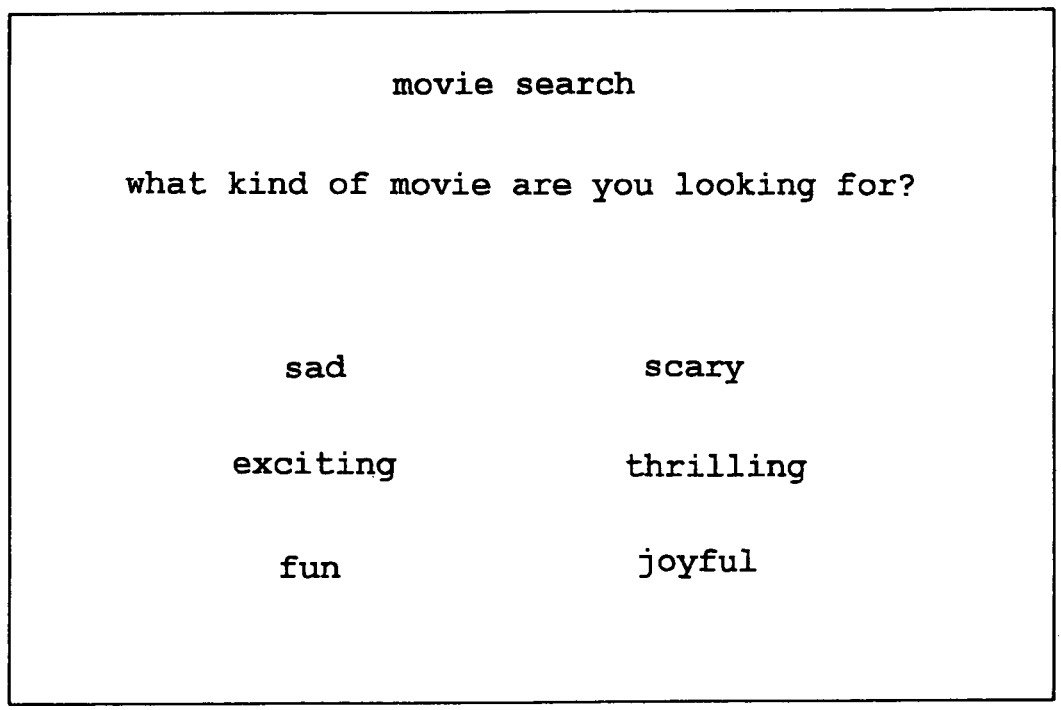
FIG. 23 is a diagram showing an input screen with search conditions of the fifth embodiment of the invention, which belongs to the first group of the present invention.

Firstly, the search conditions are received from the feeling or sensibility information input means 30 of the search terminal device 20, that is to say, a digital cellular telephone. For example, adjectives for evaluating a movie, such as fun" or thrilling" become the search conditions. FIG. 23 shows an example of a screen to which the search conditions are inputted and the user selects one, or more, of these, from among an adjective group prepared in advance, which are desired to be designated as the search conditions. For example, exciting" and joyful" are selected by means of the feeling or sensibility information input means 30.

Here, though an example of a selection from a word group which has been proposed in advance is described, the adjectives themselves may be inputted by means of the feeling or sensibility information input means 30.

In addition, after the selection of the adjectives, as shown in FIG. 24, the degree to which the selected word group matches in meaning may be inputted. FIG. 24 shows the case where exciting" and joyful" have already been selected in FIG. 23 and the degree to which the respective words match in meaning is inputted. For example, for the degree of mildly exciting" 1 is inputted and for the degree of extremely exciting" 5 is inputted and for the intermediate degrees a proper number from 2 to 4 is inputted. The same procedure is carried out for joyful."

Through the above described operation, the search conditions are inputted in accordance with words and the degrees thereof. In the following description, the search conditions are assumed to be exiting=3" and joyful=5" are assumed to be the search conditions for following description.

(Step C2)

Next, in the information server device 21, the feeling or sensibility search engine 32 searches for the feeling or sensibility data which agree with the search conditions inputted from the feeling or sensibility data base 31 in Step C1. Feeling or sensibility evaluation values concerning all of the data of the movies stored in the data base 3 are stored in the feeling or sensibility data base 31. For example, movie A" is specified by exiting=4," joyful=1," interesting=3," and the like. Several movies are extracted from among the movies which best agree with the search conditions by the feeling or sensibility search engine 32.

(Step C3)

Next, actors, locations where the movie is being shown, running time, status of seat vacancies, or the like, are inquired of the data base 3 concerning the movies extracted in Step C2. Data, such as actors appearing in the movie, locations where the movie is being shown, or the like, are stored together with the status of seat vacancies in advance in the data base 3, and the status of seat vacancies is updated at constant time intervals. The data inquired of the data base 3 are sent as the search results to the search terminal device 20 via, again, the public telephone network communication means 61.

(Step C4)

Next, on the search terminal device 20 end, the data searched and found by the feeling or sensibility search engine 32 are displayed on the information display means 2.

As an example of a display of search results, FIG. 25 shows a list of the data of the movies for which vacant seats are available and which agree with the search conditions inputted in Step C1. In addition, in the case that an amount of data too large to be displayed on a screen of the information display means 2 is searched for and found, it is possible to display the other data by switching the screens, by scrolling the screen, or the like.

(Steps C5, C6)

In the case that the data displayed in Step C4 do not contain the data desired by the user, the user searches again by changing the search conditions. This is inputted by means of the search again request" button provided in the information input means 1 or by means of a displayed selection menu by selecting the search again request" in the information display means 2 or by selecting the selection menu so as to be selected by the information input means 1. When, again, a search is requested the procedure returns to Step C2 again.

In addition, in the case that the data displayed in Step C4 contain the data desired by the user, the desired data are selected in Step C6. The selection method is the same as in the case of a search again request.

(Step C7)

When the movie is selected in Step C6, detailed data, such as locations where the movie is being shown, running time, or the like, of the corresponding movie are again called up from the data base 3 of the information server device 21 so as to be displayed on the information display means 2.

(Step C8)

The user inputs whether or not the data of the film to be stored in the information storage means 5 matches the hotel displayed in Step C7. In the case that that this hotel matches, the procedure shifts to the next step, while in the case that this hotel does not match, the procedure returns to Step C4.

(Step C9)

The ID data of the selected movie are read out from the data base 3 of the information server device 21 so as to be stored in the information storage means 5 of the search terminal device 20. The movie ID data specify, in a unique manner, which seat, of which showing, of which theatre, is reserved.

(Steps C10, C11)

The input of the indication by the user to forward the movie ID data stored in the information storage means 5 to the external apparatus 200 is in the standby condition. In the external apparatus 200, a terminal for confirming the reservation, or the like, for example, is provided at the ticket counter of a theater. In the case that the input for forwarding is received from the user, the movie ID data are forwarded to the external apparatus 200 by means of radio waves so as to complete the sequence of the procedure. In the case that the information forwarded to the external apparatus 200, which is a reservation confirmation terminal at the ticket counter of a theatre, has a correct reservation code, the user can utilize the reserved seat.

Here, though the search for a movie is cited as an example of the present embodiment, the present invention does not limit the type of searched data and is, of course, applicable to the search for any type of data.

That is to say, Table 1 shows a variety of combinations of search purposes and supply devices.

TABLE 1

| purpose | supply device |
|---|---|
| reservation of a TV program | VCR, TV, PC |
| selection of a karaoke song | karaoke device |
| reservation of a ticket | ticket vending machine |
| reservation of a seat | ticket gate |

In Table 1, in the case that the purpose is to make a reservation to record a TV program, the supply device is a VCR, of which the operation is a reservation operation. In addition, in the case that the purpose is simply to watch a TV program, the common device is a TV, PC or a set top box, of which the operation is to turn on the switch. In addition, in the case that the purpose is to select a karaoke song as described above, the supply device is a karaoke device, of which the operation is a reservation operation or the operation to start the music playing.

In addition, in the case that the purpose is to reserve a ticket for a movie, a train, a plane, or the like, the supply device is a ticket vending machine which issues the desired ticket and the operation thereof is the ticket issuance. In addition, in the case that a ticket is not issued, such as in the case making a reservation for a movie, the supply device is the ticket gate of a theatre and the operation thereof is a gate opening operation.

In addition, though a digital cellular telephone network is cited as an example of a public telephone network for communication, the present invention does not restrict the type of public telephone network and is applicable to any type of public telephone network, such as an analog network, an ISDN network and a PHS network.

Here, in any of the first to fourth embodiments, it becomes possible to search for information according to adjectives and to form an information forwarding device and an information forwarding system for forwarding by adding the feeling or sensibility information input means 30, the feeling or sensibility data base 31 and the feeling or sensibility search engine 32.

Here, the feeling or sensibility search engine of the present embodiment is an example of the search means of the present invention, the information output means of the present embodiment is an example of the output means of the present invention and a communication using the connection cable, infrared ray communication, wireless communication, a removable medium, or the like, can be utilized in the information output means of the present embodiment without being limited to the public telephone network of the present embodiment. In addition, the reservation confirmation terminal of the ticket counter of a theatre, which is the external apparatus of the present embodiment, is an example of the supply device of the present invention.

Here, the functions of each component of a terminal device, an information forwarding system or a supply device of the present invention, which belong to the first group, may be implemented by using dedicated hardware or may be implemented in a software manner by means of a computer program.

In addition, a program recording medium which records a program for allowing a computer to perform the entirety of, or part of, the functions of each component of an information forwarding device or of a terminal device of the present invention, which belong to the first group, also belongs to the present invention.

(B) In the following, each embodiment of the present invention which belongs to the second group will be described in reference to the drawings.

Embodiment 1

Figure 26:
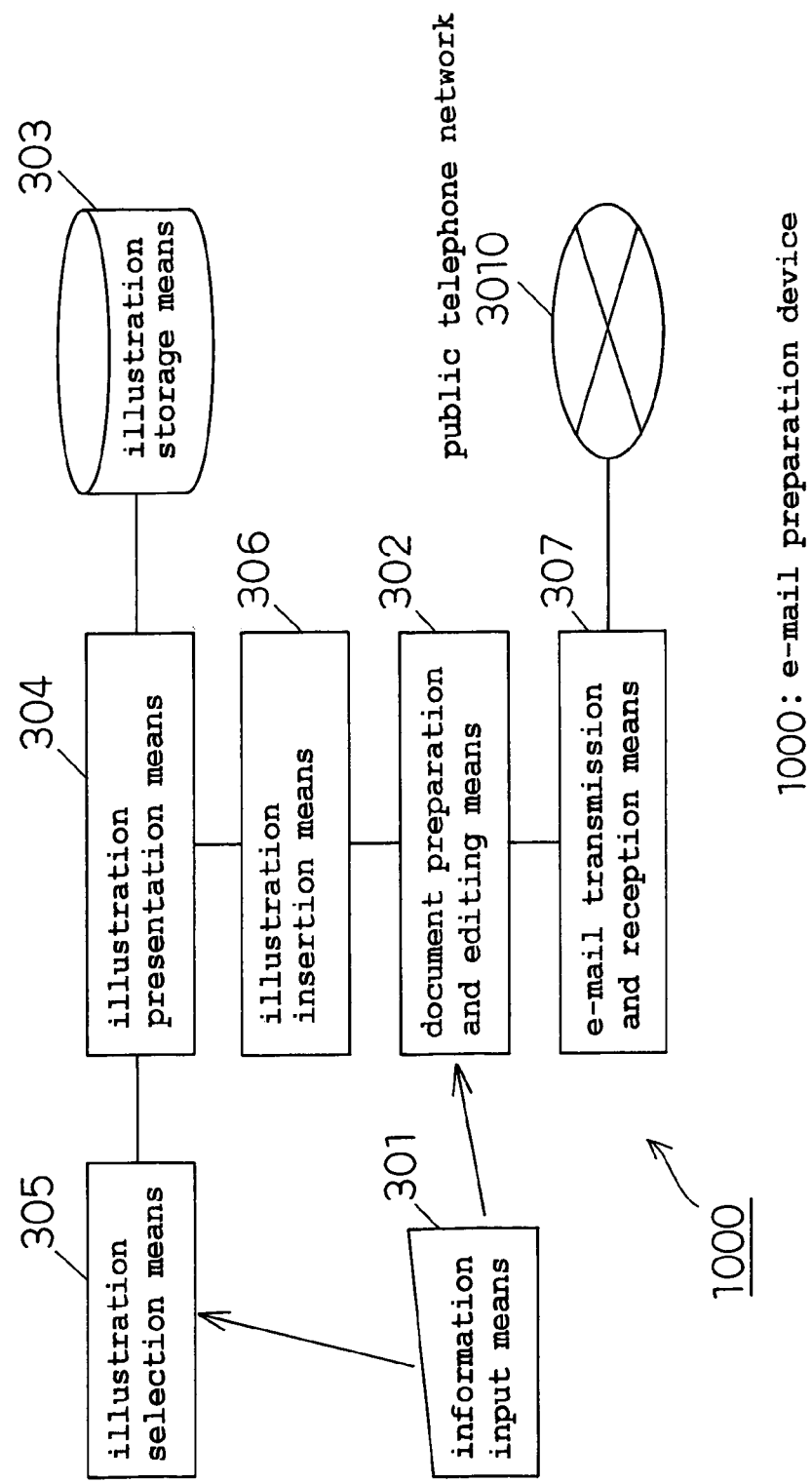
FIG. 26 is a diagram showing a configuration of an e-mail preparation device according to Embodiment 1 of the invention, which belongs to the second group of the present invention.

FIG. 26 is a diagram showing the configuration of an e-mail preparation device according to Embodiment 1 of the present invention. In the figure, an e-mail preparation device is denoted as 1000, an information input means, wherein at least one, or more, inputs of: letter input, selection of information or commands for implementation, is possible, is denoted as 301, a document preparation and editing means, of carrying out a preparation of documents or the editing of documents, is denoted as 302, an illustration storage means, of storing illustrations to be used for insertion in a document, is denoted as 303, an illustration presentation means, of presenting illustrations stored in the illustration storage means 303, is denoted as 304, an illustration selection means, of selecting at least one, or more, illustrations from among the illustrations presented by the illustration presentation means 304, is denoted as 305, an illustration insertion means, of inserting illustrations selected by the illustration selection means 305 into the document prepared or edited by the document preparation and editing means 302, is denoted as 306, an e-mail reception and transmission means, of transmitting the document prepared or edited by the document preparation and editing means 302, is denoted as 307 and a public telephone network is denoted as 3010. Here, an index is attached to enable the illustration presentation means to access the illustrations stored in the illustration storage means 303. In addition, the illustrations presented by the illustration presentation means may be displayed on the liquid crystal screen of a cellular telephone.

Figure 27:
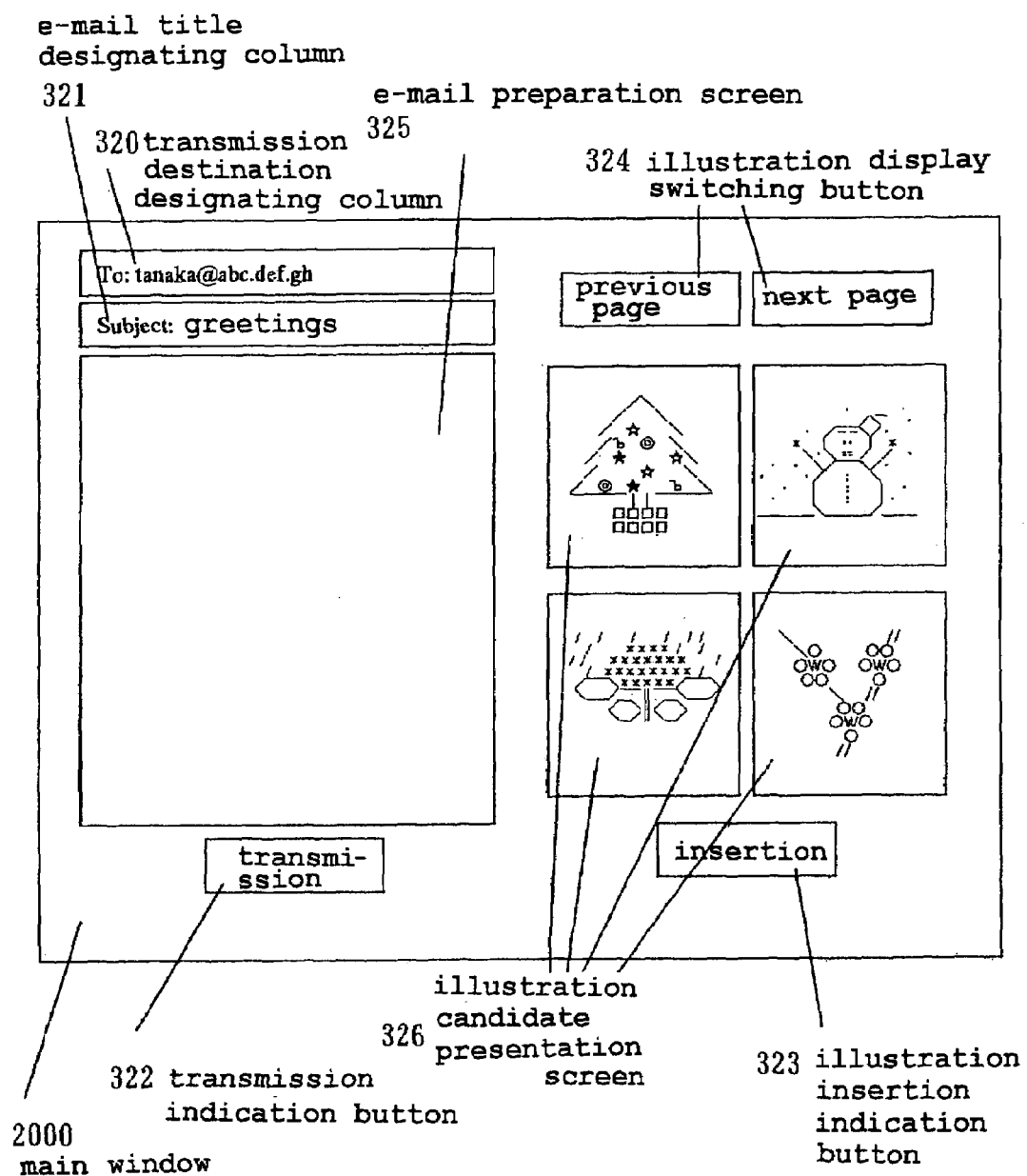
FIG. 27 is a diagram showing a GUI of the e-mail preparation device according to Embodiment 1 of the invention, which belongs to the second group of the present invention.

Next, FIG. 27 is a diagram showing a GUI (graphical user interface) of an e-mail preparation device 1000.

In the figure, a main window wherein respective buttons and screens are arranged is denoted as 2000, a transmission destination designating column, which designates the destination of an e-mail, is denoted as 320, an e-mail title designation column, which designates the title of an e-mail, is denoted as 321, the transmission indication button, for indicting the transmission of an e-mail, is denoted as 322, an illustration insertion indication button, for indicating the insertion of an illustration, is denoted as 323, an illustration display switching button, which switches the illustration display, is denoted as 324, an e-mail preparation screen, wherein the preparation of a document or editing of sentences are carried out and an illustration is inserted, is denoted as 325 and a illustration candidate presentation screen, which displays an illustration presented by the illustration presentation means 304, is denoted as 326. Here, the pressing of each button and the input for selecting an illustration candidate are carried out by using a pointing device.

Figure 28:
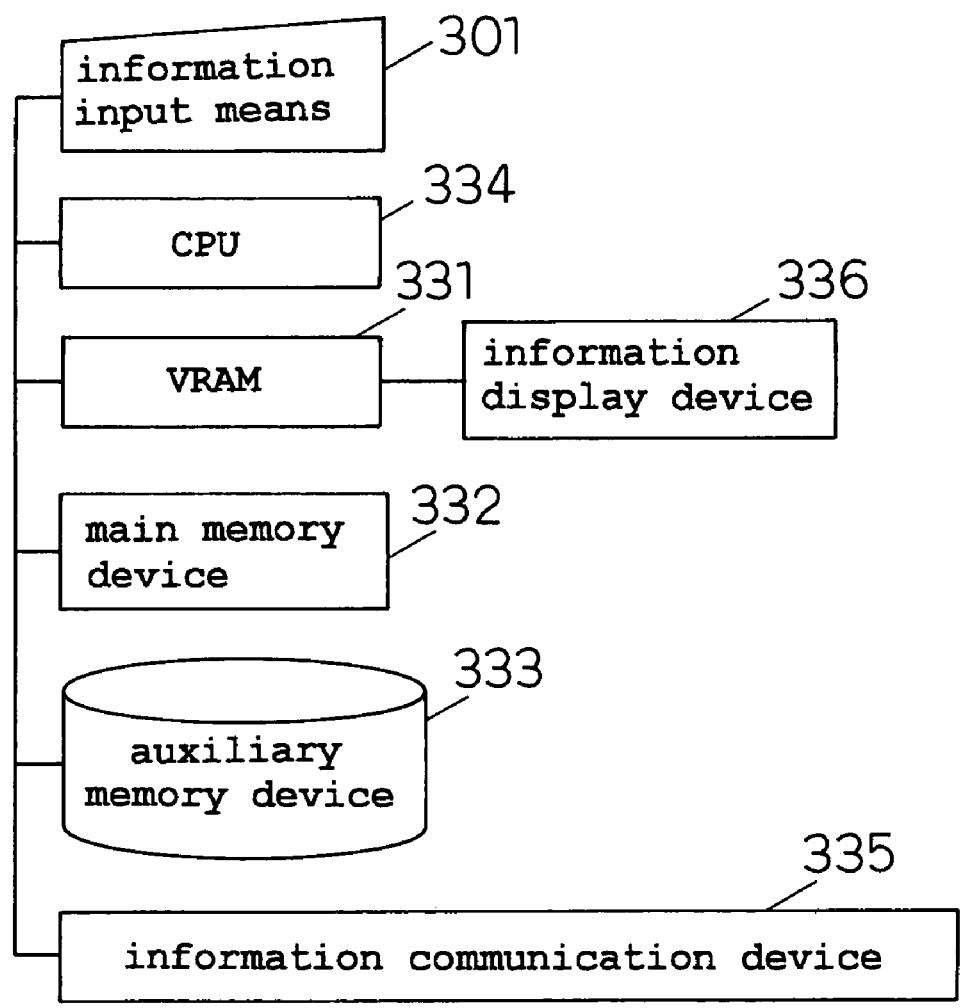
FIG. 28 is a diagram showing a configuration of the hardware which implements the e-mail preparation device according to Embodiment 1 of the invention, which belongs to the second group of the present invention.

Next, FIG. 28 is a diagram showing a hardware configuration which implements the e-mail preparation device 1000. The configuration shown in FIG. 28 is essentially the same as the configuration of a versatile computer system. In addition, since the same components as the components of the system shown in FIG. 26 are included, the same components are referred to by the same numerals, of which the descriptions are omitted. In FIG. 28, an information input means is denoted as 301, a VRAM, for storing the data to be displayed and outputted, is denoted as 331, a main memory device, which is a volatile memory for storing a program, is denoted as 332, an auxiliary memory device, which is a nonvolatile memory for storing a program or data, is denoted as 333, a CPU, for running the program stored in the main memory device 1020, is denoted as 334, an information communication device, for communicating with a public telephone line or with a network, such as the Internet or an intranet, is denoted as 335 and an information display device, such as a CRT or a liquid crystal display, which displays the data on the VRAM 331, is denoted as 336.

Figure 29:
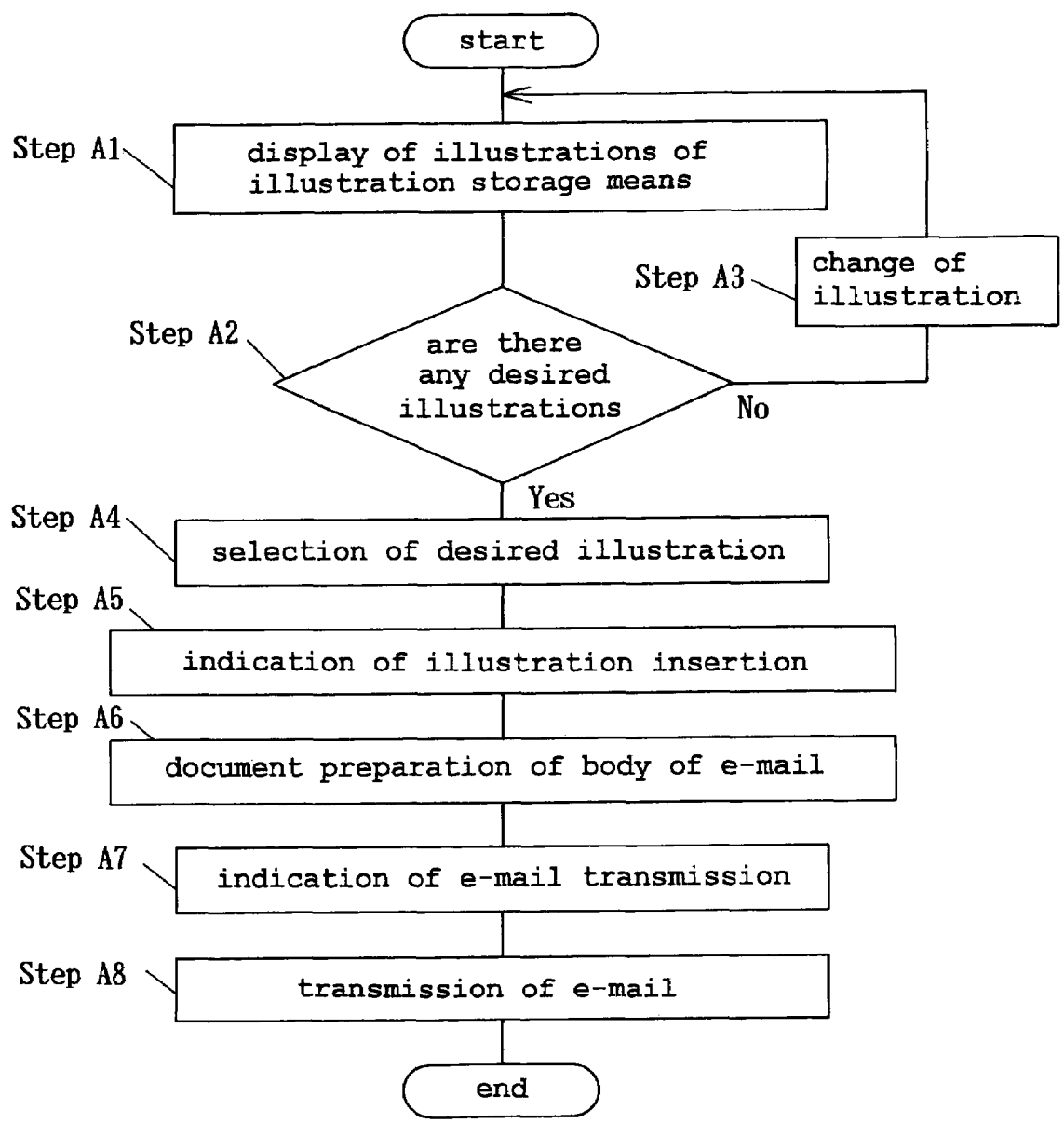
FIG. 29 is a flow chart showing the operation of the e-mail preparation device according to Embodiment 1 of the invention, which belongs to the second group of the present invention.

The operation of the e-mail preparation device according to the present Embodiment 1, which has the above described configuration, is described in reference to the flow chart of FIG. 29. Here, in the present embodiment, text data which express a pattern by using a combination of, or arrangement of, letter fonts, are used as an illustration.

Firstly, in Step A1, the illustration presentation means 4 outputs illustrations stored in the illustration storage means 303 to the illustration candidate presentation screen 326 in the order of the attached indices. The illustration candidate presentation screen 326 displays the illustration candidates at one time (four illustrations in the figure).

Next, in Step A2, the user confirms whether or not the illustration candidates displayed on the illustration candidate presentation screen 326 includes the desired illustration. In the case that the illustration candidates displayed at that time do not include the illustration desired by the user, the procedure proceeds to Step A3. On the other hand, in the case that a desired illustration is displayed, the procedure proceeds to Step A4.

In Step A3, the next page" button, which is an illustration display switching button 324, is clicked. The illustration presentation means 304 reads out new illustrations from the illustration storage means 303 in the order of the indices so as to output them to the illustration candidate presentation screen 326. The illustration candidate presentation screen 326 presents new illustration candidates at one time. At this time, the user can display the illustration candidates which had been displayed previous to the display of the illustration candidates, which are displayed at that present time, on the illustration candidate presentation screen 326, by clicking the previous page" button, which is an illustration display switching button 324. In addition, in the same manner as in the above described operation, when next page" of an illustration switching button 324 is clicked, illustration candidates which are newer than the illustration candidates displayed at that present time can be displayed. The operations of these steps A1, A2 and A3 are repeated until an illustration desired by the user is displayed on the illustration candidate presentation screen 326.

In Step A4, a desired illustration is determined from among the illustration candidates displayed on the illustration candidate presentation screen 326. Based on the operation by the user the information input means 301 selects a desired illustration from among the illustration candidates displayed on the illustration candidate presentation screen 326. This operation is implemented by directly clicking the illustration on the illustration candidate presentation screen 326 on the main window 2000, by means of the pointing device.

Figure 30:
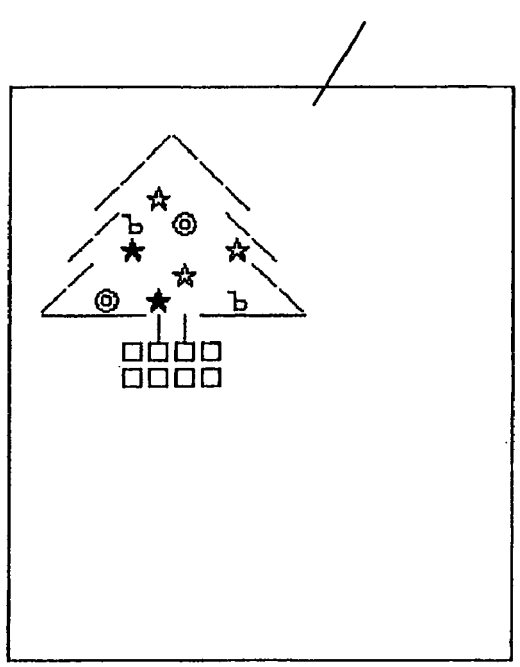
FIG. 30 is a diagram for describing the operation of illustration insertion by the e-mail preparation device according to Embodiment 1 of the invention, which belongs to the second group of the present invention.
Figure 30:
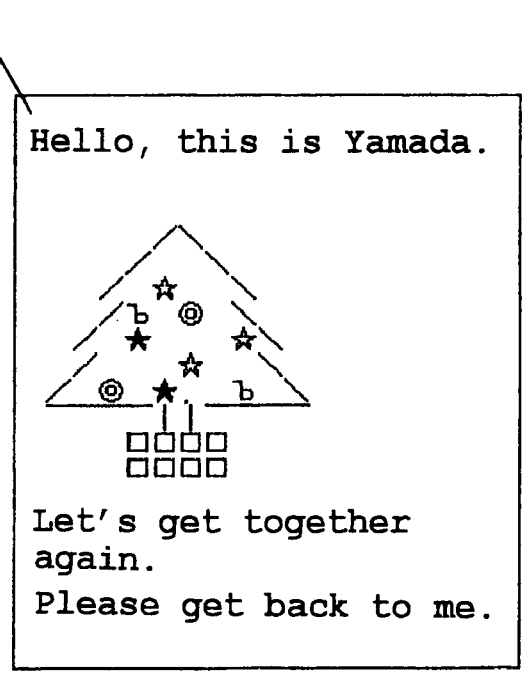

In Step A5, the illustration determined in Step A4 is inserted in the document, which is the objective of the editing, by the document preparation and editing means 302. Based on the operation by the user, the illustration insertion means 306 copies the determined illustration so as to appear at a predetermined position on the e-mail preparation screen 325. This operation is implemented on the main window 2000 by clicking the illustration insertion indication button 323 by means of the pointing device. Here, FIG. 30(*a*) shows the appearance of the determined illustration being copied onto the e-mail preparation screen 325.

In Step A6, based on the operation by the user, the document preparation and editing means 302 prepares and edits the body of a document on the e-mail preparation screen 325, into which an illustration is inserted in Step A5, in the form of surrounding the illustration so as to arrange it into an e-mail form. At this time, the document preparation and editing means 302 carries out the preparation of the body of the e-mail through the same operations as in a conventional e-mail preparation device, word processor or editor.

In the present embodiment, since the text data are used in the illustration, it is possible to edit the body of the e-mail and the illustration on the same editing screen and in a plain text format. Here, FIG. 30(*b*) shows the condition where the editing is completed in a form where the illustration and the body of the document are mixed on the e-mail preparation screen 325.

In Step A7, the e-mail, of which the preparation has been completed in Step A6, is put in the condition where transmission is possible. When the indication for the transmission of the e-mail is given by clicking the transmission indication button 322, the destination designated by the transmission designation designating column 320, the e-mail title designated by the e-mail title designation column 321 and header information required for an e-mail are added to the e-mail, of which the preparation has been completed in Step A6, by means of a dedicated addition means which is not shown. Here, prior to the above described operation, entries of a transmission destination to the transmission destination designating column 320 and of an e-mail title to the e-mail title designation column 321 may be carried out in any of the steps of the above described operations Step A1 to Step A6.

Finally, in Step A8, the e-mail transmission and reception means 307 completes the transmission of the e-mail via the public telephone network 3010.

Embodiment 2

Figure 31:
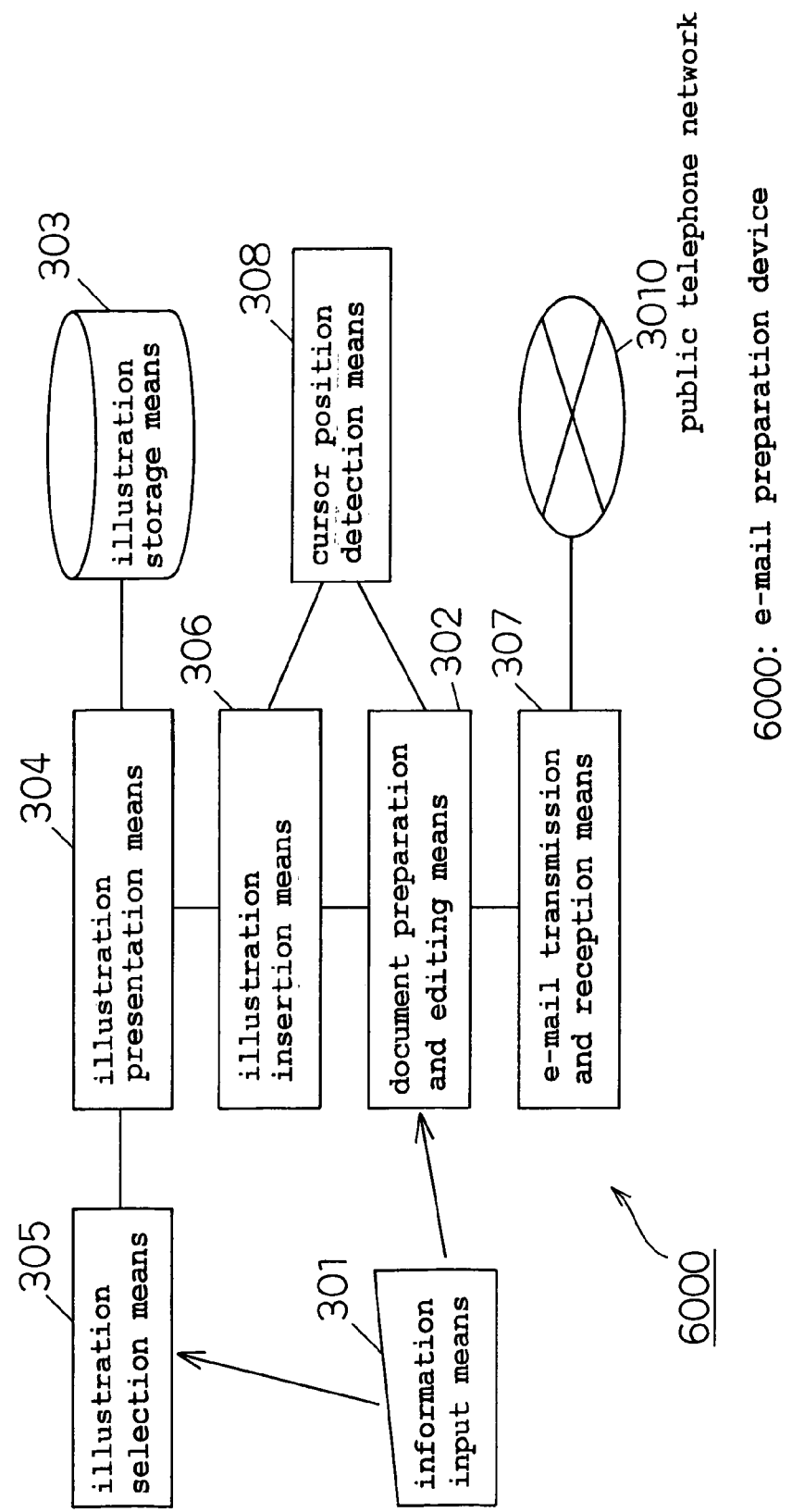
FIG. 31 is a diagram showing a configuration of an e-mail preparation device according to Embodiment 2 of the invention, which belongs to the second group of the present invention.

FIG. 31 shows a diagram of a configuration of an e-mail preparation device according to Embodiment 2 of the present invention. In the figure, the same numerals as in FIG. 26 refer to same parts or the same means. In addition, a cursor position detection means of detecting the editing position of a document during preparation by the document preparation and editing means 302, that is to say, the position of the cursor is denoted as 308.

Figure 59:
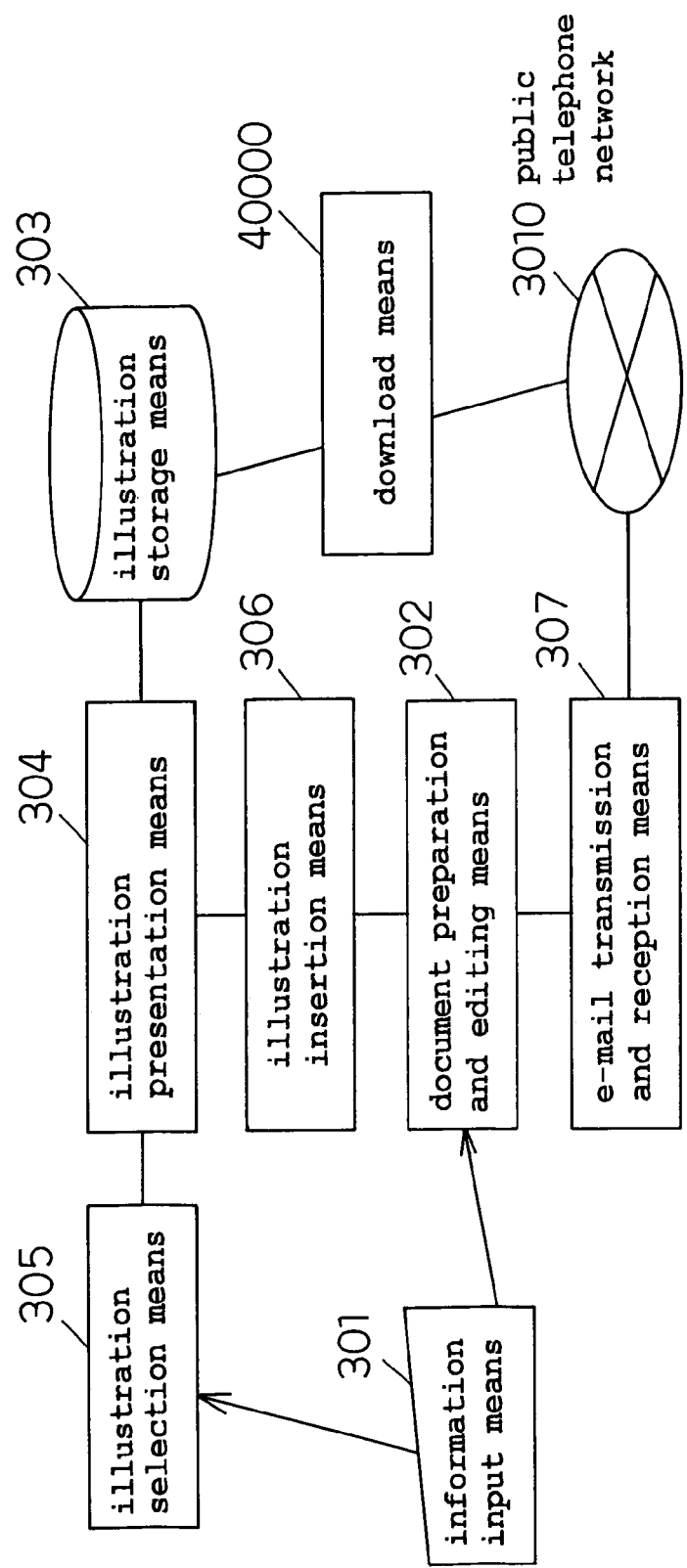
FIG. 59 is a diagram showing a configuration of an e-mail preparation device according to another embodiment of the invention, which belongs to the second group of the present invention.

Here, as shown in FIG. 59, in the case that a data downloading means 40000 is added, it becomes possible to add, or to update, the contents of an illustration by downloading the illustration data stored in the illustration storage means 303 from an external server, or the like, via the public telephone line 3010.

Next, the GUI of an e-mail preparation device 6000 according to the present Embodiment 2 is the same as in the present Embodiment 1, shown in FIG. 27. In addition, the hardware configuration is also the same as in the present Embodiment 1, shown in FIG. 28.

The operation of the e-mail preparation device according to the present Embodiment 2, which has the above described configuration, is described in reference to the flow chart of FIG. 29, in the same manner as in the present Embodiment 1. Here, in the present embodiment, the text data wherein a pattern is expressed by a combination of, or through the arrangement of, letter fonts are used as an illustration in the same manner as in Embodiment 1.

Firstly, the operations of Steps A1, A2, A3 and A4 are the same operations as in Steps A1, A2, A3 and A4 of Embodiment 1, of which the descriptions are omitted.

Figures 32A, 32B:
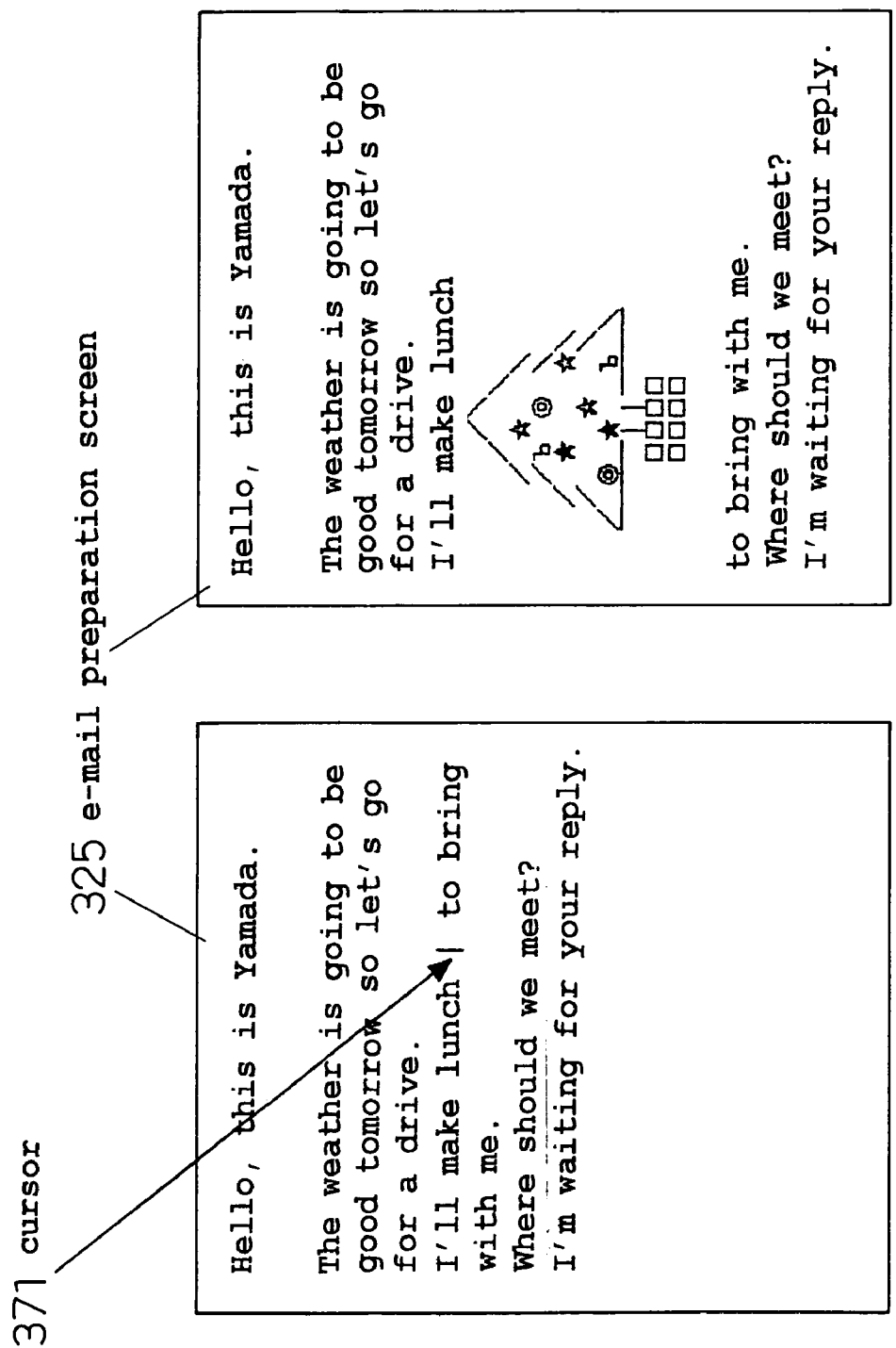
FIG. 32 is a diagram for describing the operation of illustration insertion by the e-mail preparation device according to Embodiment 2 of the invention, which belongs to the second group of the present invention.

Next, in Step A5, an illustration determined in Step A4 is inserted into a document which becomes the objective of editing on the e-mail preparation screen 325. Based on the operation by the user, the illustration insertion means 306 maintains the determined illustration. Then, in the case that the document preparation and editing means 302 has not yet carried out the editing or preparation of the document on the e-mail preparation screen 325, the illustration insertion means 306 copies the maintained illustration onto the e-mail preparation screen 325 in the same manner as in the present Embodiment 1. On the other hand, in the case that the document preparation and editing means 302 has already carried out the editing and preparation of the document on the e-mail preparation screen 325, the cursor position detection means 308 detects the cursor position of the document which is being editing, at that present time, on the e-mail preparation screen 325. This cursor position is represented in a manner such as third row, fifth column" by using, for example, the row number and the column number. When the cursor position is detected the illustration insertion means 306 inserts the maintained illustration into this cursor position. At the time of insertion, in the case that the cursor is not at the beginning of a line, the text is moved to the line beginning position so that the illustration is inserted in the previous cursor position. In FIG. 32, the above described condition is shown and the document being edited is depicted by FIG. 32(a) wherein the cursor is located between the words lunch" and to" in the sentence, I'll make lunch to bring with me." Therefore, the text is moved, from the previous position, to the line beginning position below, wherein an illustration is inserted between the lines I'll make lunch" and to bring with me," as shown in FIG. 32(b).

In Step A6, documents are added and edited before and after the illustration inserted in Step A5 based on the operation by the user so as to prepare the body of the e-mail in the same manner as in Embodiment 1. Then in Steps A7 and A8, the same operations as in Steps A7 and A8 of the present Embodiment 1 are carried out, respectively, so as to transmit e-mails.

Here, though in the present embodiment, the illustration inserted in the body of the e-mail is described as being formed of text data, the invention is not limited to this but, rather, still image data such as JPEG, dynamic image data such as MPEG or AVI, pseudo still image data such as motion-JPEG or GIF animation or data prepared in a vector format may be inserted as an illustration. In this case, the illustration insertion means 306 encodes the illustration in a file encode system, such as BASE64 or uuencode, used for an attached file of e-mail and, at the same time, the document preparation and editing means 302 prepares the document in an HTML format. The illustration becomes an attached file of the e-mail and the display position of the attached image is designated in the body of the document by HTML so that the receiver of the e-mail can see the document in the condition where the illustration is inserted at the position designated on the e-mail preparation screen 325.

Embodiment 3

Figure 33:
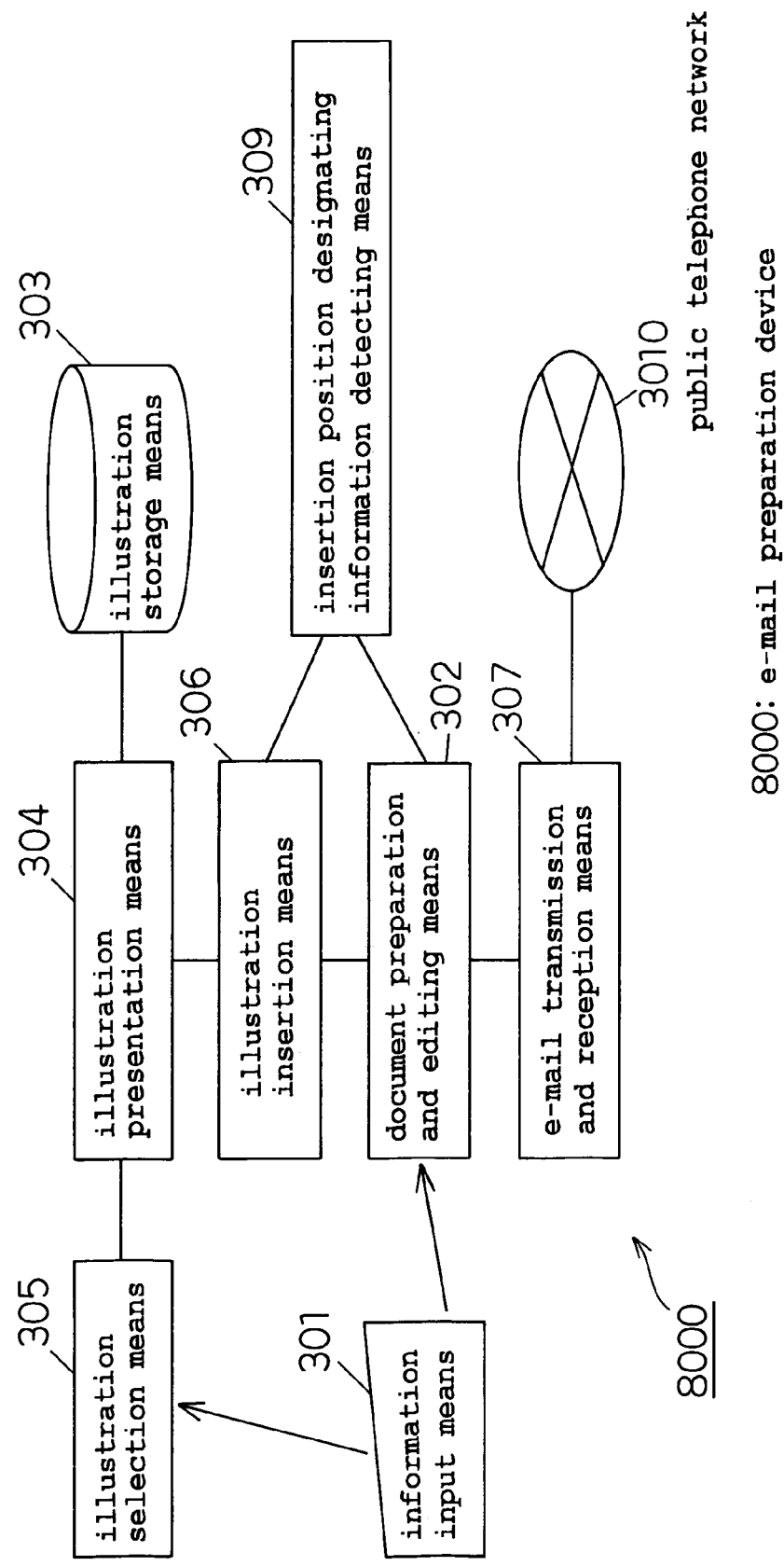
FIG. 33 is a diagram showing a configuration of an e-mail preparation device according to Embodiment 3 of the invention, which belongs to the second group of the present invention.

FIG. 33 is a diagram showing the configuration of an e-mail preparation device according to Embodiment 3 of the present invention. In the figure, the same parts and the same means are denoted by the same signs as those of FIG. 26. In addition, an e-mail preparation device is denoted as 8000 and an insertion position designating information detection means of detecting a particular letter sequence, which designates the insertion position of an illustration in the document being prepared or being edited at that present time in the document preparation and editing means 302, is denoted as 309.

Next, the GUI of the e-mail preparation device 8000 according to the present Embodiment 3 is the same as that in the present Embodiment 1 shown in FIG. 27. In addition, the configuration of the hardware is also the same as that in the present Embodiment 1 shown in FIG. 28.

The operation of the e-mail preparation device according to the present Embodiment 3, which has a configuration as described above, is described in reference to the flow chart of FIG. 29 in the same manner as in the present Embodiment 1. Here, in the present embodiment, text data where a pattern is expressed by a combination of or through the arrangement of letter fonts as an illustration are used in the same manner as in Embodiment 1.

In addition, in the present embodiment, the document preparation and editing means 302 is assumed to have been used to prepare or edit a document on the e-mail preparation screen 325 in advance.

Firstly, the operations in Steps A1, A2, A3 and A4 are the same operations as in Steps A1, A2, A3 and A4 of Embodiments 1 and 2, of which the descriptions are omitted.

Next, in Step A5, the illustration determined in Step A4 is inserted into the document that has become the objective of editing on the e-mail preparation screen 325. Based on the operation by the user, the illustration insertion means 306 holds the determined illustration. Then, the insertion position designating information detection means 309 detects the insertion position designating letter sequence in the document being edited by document preparation and editing means 302 on the e-mail preparation screen 325. As for this insertion position designating letter sequence, a letter sequence of which the frequency of use in a typical document is low, such as <ILLUST>" or $$$," is preset. When the insertion position is detected, the illustration insertion means 306 inserts the held illustration into this insertion position. At the time of this illustration insertion, the insertion position designating letter sequence is eliminated after the illustration insertion and the document is arranged so that the text is moved to the beginning of the row below at that position. In FIG. 34 that image is shown and FIG. 34(a) shows a document being edited wherein the insertion position designating letter sequence is located between lunch"and to" of I'll make lunch $$$ to bring with me." Then, $$$" itself is eliminated and the text from that position is moved to the beginning of the row below so that an illustration is inserted between the line I'll make lunch" and the line to bring with me" so as to form the image as shown in FIG. 34(b).

Hereinafter, the operations of Steps A6, A7 and A8 are carried out in the same manner as in Embodiments 1 and 2.

Here, though in the present embodiment the illustration inserted into the body of the e-mail is described as being formed of text data, the invention is not limited to this but, rather, still image data such as JPEG, dynamic image data such as MPEG or AVI, pseudo still image data such as motion-JPEG or GIF animation or data prepared in a vector format may be inserted as an illustration. In this case, the illustration insertion means 6 encodes the illustration in a file encode system, such as BASE64 or uuencode, used for an attached file of e-mail and, at the same time, the document preparation and editing means 302 prepares the document in an HTML format. The illustration becomes an attached file of the e-mail and the display position of the attached image is designated in the body of the document by HTML so that the receiver of the e-mail can see the document in the condition where the illustration is inserted at the position designated on the e-mail preparation screen 325. In the same manner as in the case where the above described text data are used as an illustration, the document and the illustration on the e-mail preparation screen 325 are displayed on the same screen at both the sender and receiver ends.

Embodiment 4

Figure 35:
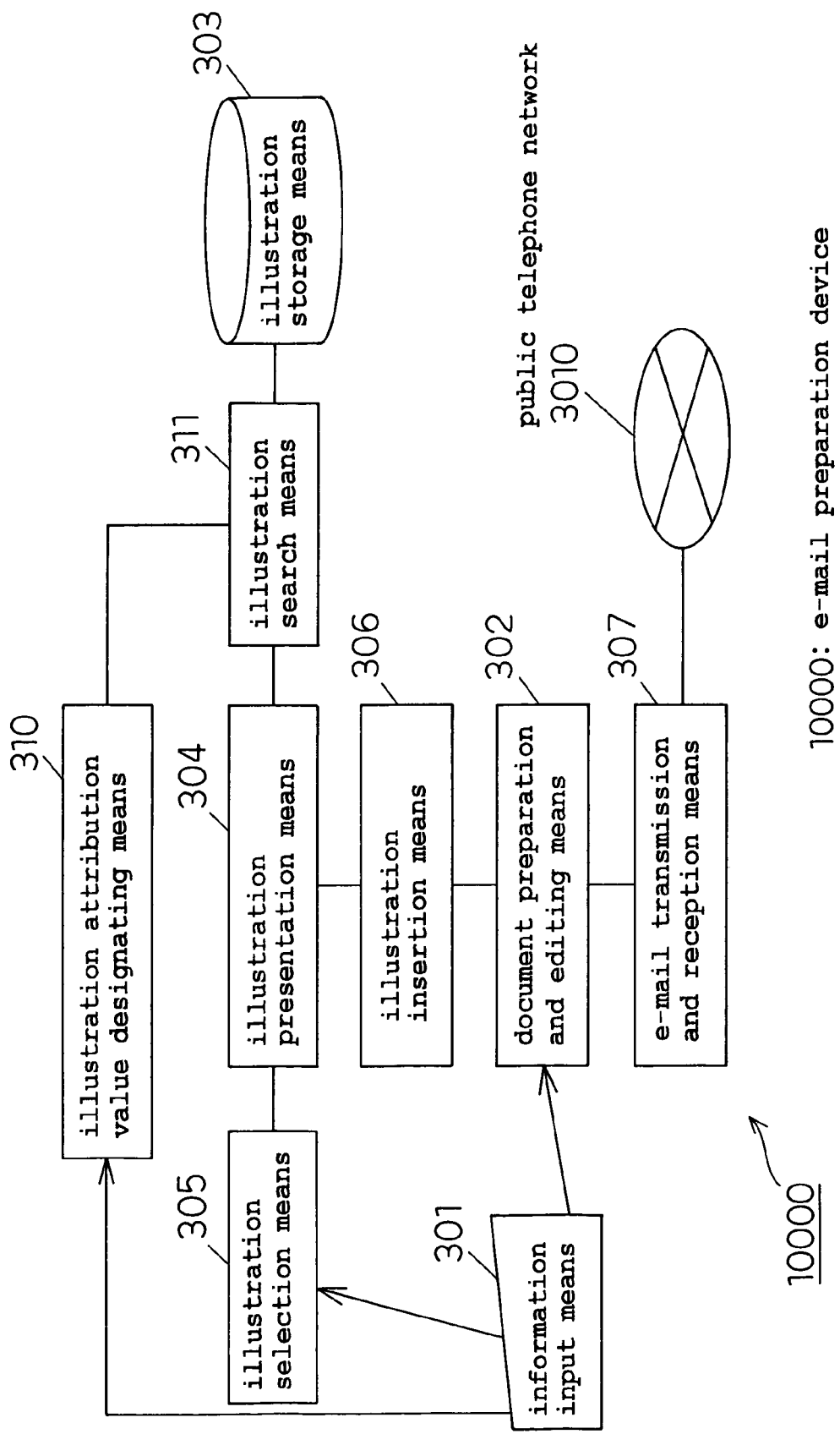
FIG. 35 is a diagram showing a configuration of an e-mail preparation device according to Embodiment 4 of the invention, which belongs to the second group of the present invention.

FIG. 35 is a diagram showing the configuration of an e-mail preparation device according to Embodiment 4 of the present invention.

In the figure, the same parts and the same means are denoted by the same signs as in FIG. 26. In addition, an e-mail preparation device is denoted as 10000, an illustration attribution value designation means, of designating an attribution value which is desired by the user to be presented with respect to the attribution of the illustration from among illustrations stored in the illustration storage means 303, is denoted as 310 and an illustration search means, of searching for the illustration which agrees with the illustration attribution value designated by the illustration attribution value designation means 310 from the illustration storage means 303, is denoted as 311. Here, in the present embodiment the illustration storage means 303 stores, in addition to illustrations, the attribution values with respect to the stored illustrations, such as titles, classes, illustrators, time and date of preparation of illustrations.

Figure 36:
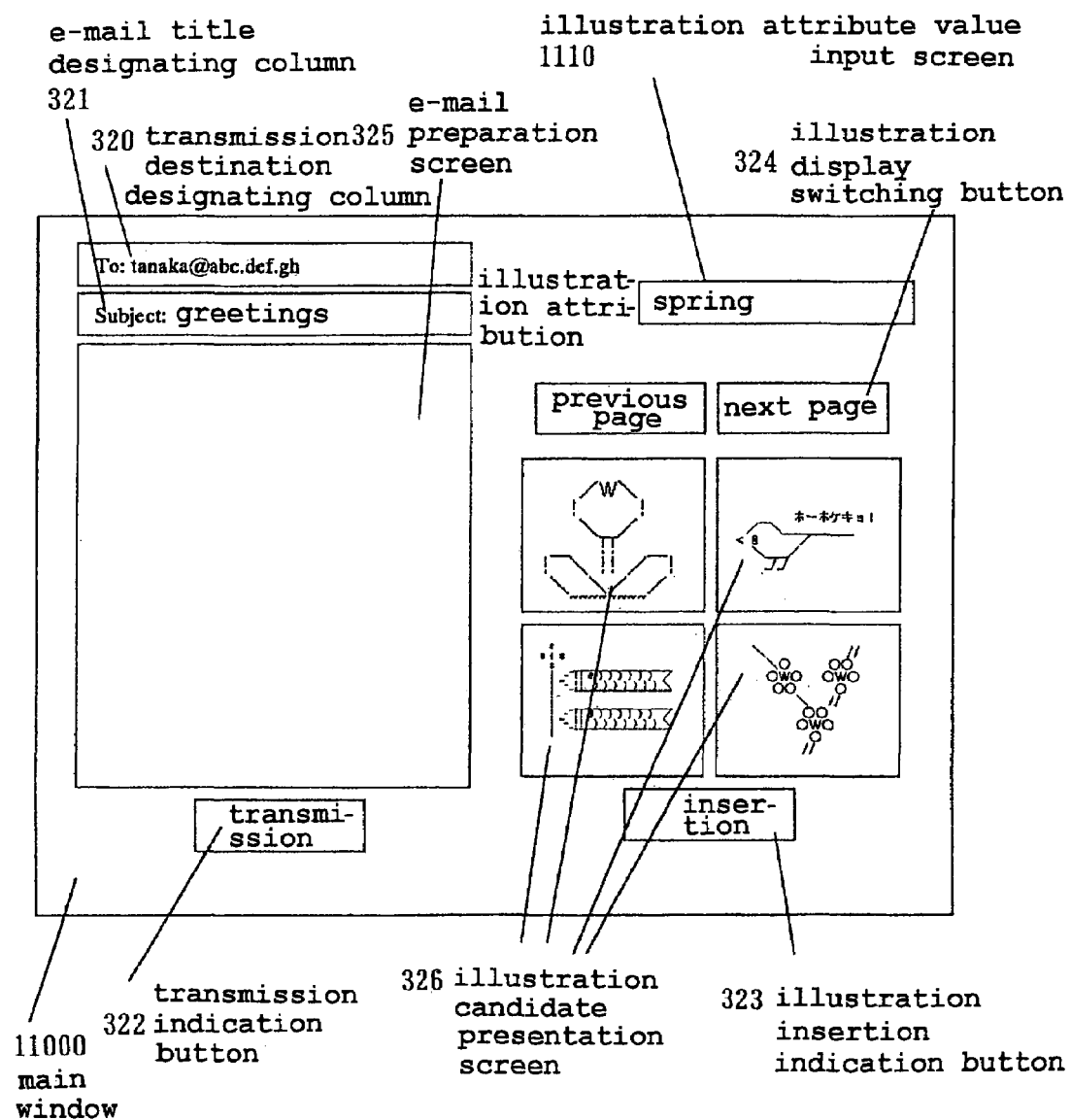
FIG. 36 is a diagram showing a GUI of the e-mail preparation device according to Embodiment 1 of the invention, which belongs to the second group of the present invention.

Next, FIG. 36 is a diagram showing the GUI of the e-mail preparation device 10000 according to the present Embodiment 4.

In the figure, the same parts and the same means are denoted by the same signs as in FIG. 27 and an illustration attribution value input screen is denoted as 311. Here, the pressing down of each button and the inputting for the selection of the illustration are carried out by using a pointing device or a keyboard.

Next, the configuration of the hardware which implements the e-mail preparation device 10000 of the present Embodiment 4 is the same as in the present Embodiment 1 shown in FIG. 28.

Figure 37:
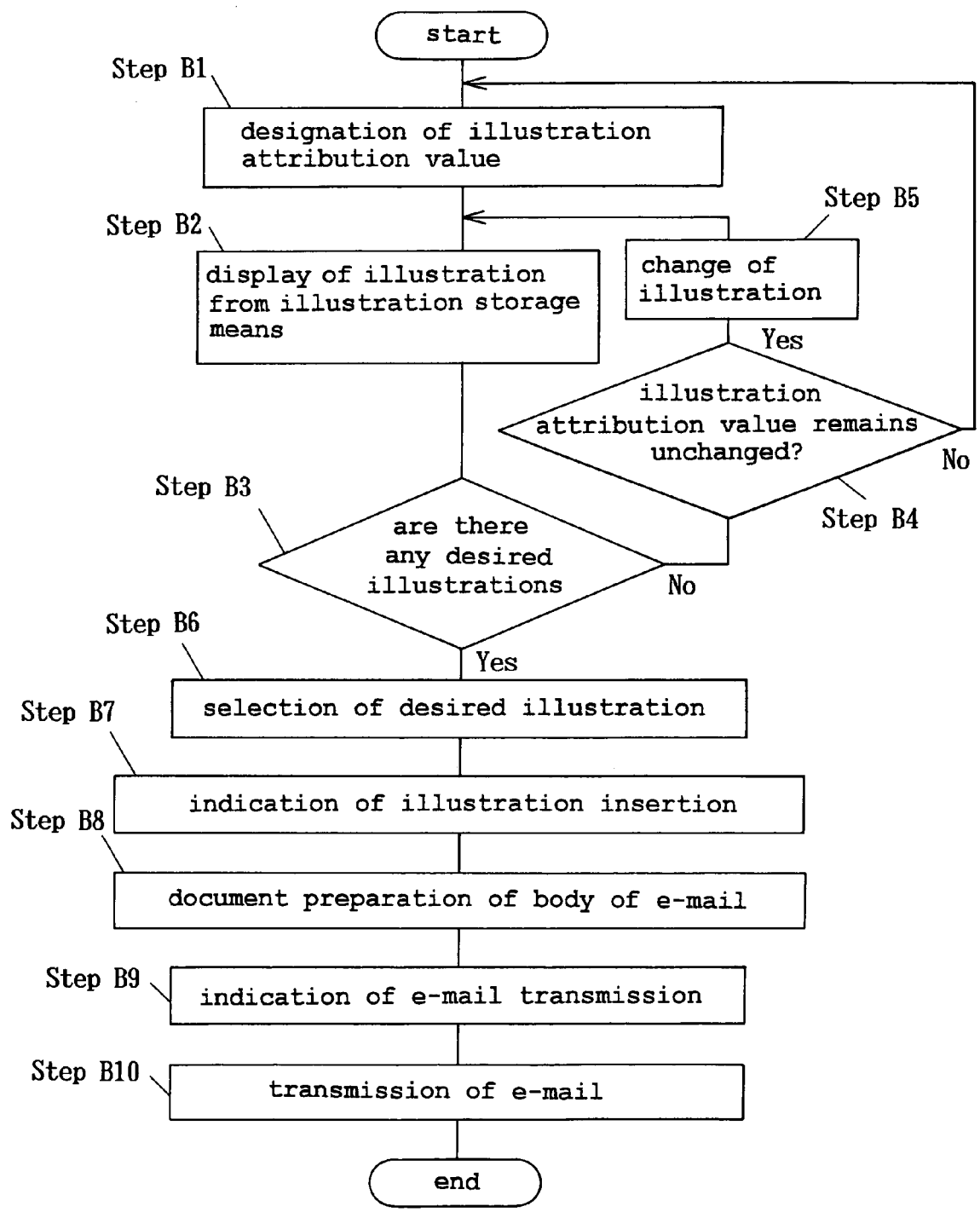
FIG. 37 is a flow chart showing the operation of the e-mail preparation device according to Embodiment 4 of the invention, which belongs to the second group of the present invention.

The operation of the e-mail preparation device according to the present Embodiment 4, which has the above described configuration, is described in reference to the flow chart of FIG. 37. Here, in the present embodiment, text data where a pattern is expressed by a combination of or through the arrangement of letter fonts are used as an illustration.

Firstly, in Step B1, the illustration attribution value designation means 310 designates the attribution of the illustration desired by the user based on the operation by the user. This attribution is designated from among the illustration attribution values stored in advance in the illustration storage means 303 together with illustrations. In FIG. 36, the attribution is designated as spring."

Next, in Step B2, the illustration search means 311 detects the illustrations corresponding to the attribution values designated by the illustration attribution value designation means 310 from among the illustrations stored in the illustration storage means 303 and, at the same time, the illustration presentation means 304 displays the illustrations detected by the illustration detection means 311 on the illustration candidate presentation screen 326 as illustration candidates.

In Step B3, the user judges whether or not there is any illustration candidate displayed on the illustration candidate presentation screen 326 that matches the desired illustration in the same manner as in Embodiment 1. In the case that no desired illustration is displayed, the procedure proceeds to Step B4.

In Step B4, the judgment of whether or not the illustration attribution value designated at that present time should remain unchanged is carried out. In the case of no change, the procedure proceeds to Step B5 while in the other case, the procedure returns to Step B1 so that the illustration attribution value designation means 310, again, sets a new illustration attribution value so as to repeat the steps up to this point.

In Step B5, through the inputting to the illustration display switching button 324, illustration candidates displayed on the illustration candidate presentation means 326 are switched. The operations in the Steps B6, B7, B8, B9 and 310 are the same, respectively, as the Steps A4, A5, A6, A7 and A8 of the present Embodiment 1 shown in FIG. 29, of which the descriptions are omitted.

As described above, according to the e-mail preparation device of the present Embodiment 4, in the configuration which comprises the illustration attribution value designation means 310 and the illustration search means 311, it becomes possible to selectively display and to select only the illustrations having the attribution value designated by the user from among many illustrations.

Here, by additionally providing a cursor position detection means 308, or an insertion position designating information detection means 309, are provided in the configuration of the present embodiment, the document preparation and editing means 302 may be made to directly insert an illustration at a predetermined position in the document being edited in the same manner as in the present Embodiments 2 or 3.

In addition, though in the present embodiment, an illustration inserted into the body of the e-mail is described as being formed of text data, the invention is not limited to this but, rather, still image data such as JPEG, dynamic image data such as MPEG or AVI, pseudo still image data such as motion-JPEG or GIF animation or data prepared in a vector format may be inserted as an illustration. In this case, the illustration insertion means 306 encodes the illustration in a file encode system, such as BASE64 or uuencode, used for an attached file of e-mail and, at the same time, the document preparation and editing means 302 prepares the document in an HTML format. The illustration becomes an attached file of the e-mail and the display position of the attached image is designated in the body of the document by HTML so that the receiver of the e-mail can see the document in the condition where the illustration is inserted at the position designated on the e-mail preparation screen 325. In the same manner as in the case that where the above described text data are used as an illustration, the document and the illustration on the e-mail preparation screen 325 are displayed on the same screen at both the sender and receiver ends.

Embodiment 5

Figure 38:
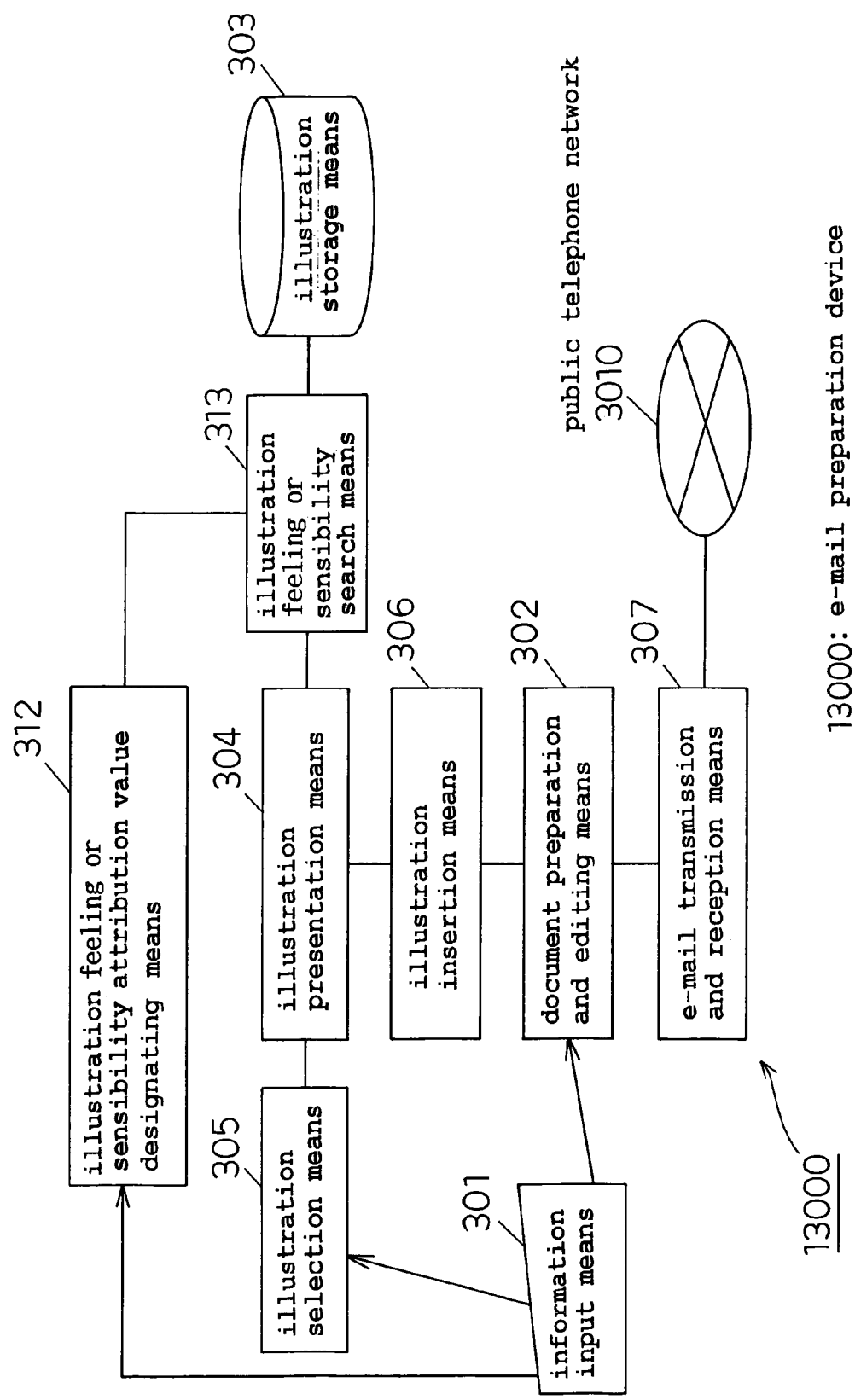
FIG. 38 is a diagram showing a configuration of an e-mail preparation device according to Embodiment 5 of the invention, which belongs to the second group of the present invention.

FIG. 38 is a diagram showing the configuration of an e-mail preparation device according to Embodiment 5 of the present invention. In the figure, the same parts and the same means are denoted by the same signs as in FIG. 26. In addition, an e-mail preparation device is denoted as 13000, an illustration feeling or sensibility attribution value designation means, of designating a feeling or sensibility attribution value which the user wishes to present with respect to the feeling or sensibility attribution of the illustration from among illustrations stored in the illustration storage means 303, is denoted as 312 and an illustration feeling or sensibility search means, of searching for the illustration which agrees with the illustration feeling or sensibility attribution value designated by the illustration feeling or sensibility attribution value designation means 312 from the illustration storage means 303, is denoted as 313. Here, in the present embodiment, the illustration storage means 303 stores, in addition to illustrations, predetermined feeling or sensibility attribution values with respect to the stored illustrations.

Figure 39:
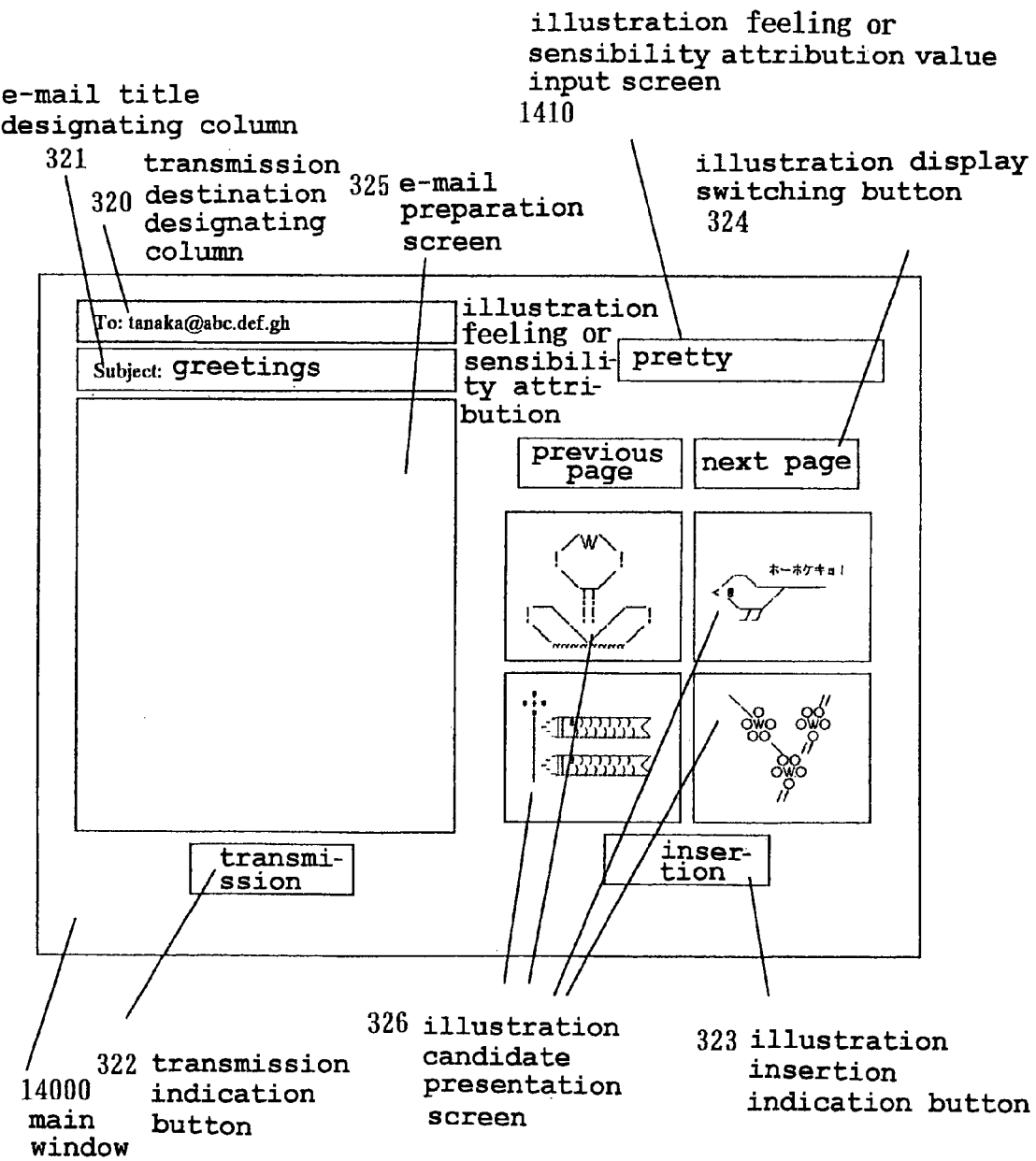
FIG. 39 is a diagram showing a GUI of the e-mail preparation device according to Embodiment 5 of the invention, which belongs to the second group of the present invention.

Next, FIG. 39 is a diagram showing the GUI of the e-mail preparation device 13000 according to the present Embodiment In FIG. 39, the same parts and the same means are denoted by the same signs as in FIG. 27. In addition, an illustration feeling or sensibility attribution value input screen is denoted as 3141. In addition, the configuration of the hardware is also the same as in the present Embodiment 1 shown in FIG. 28.

The operation of the e-mail preparation device according to the present Embodiment 6, which has the above described configuration, is described in reference to the flow chart of FIG. 37. Here, in the present embodiment, text data wherein a pattern is expressed by a combination of or through the arrangement of letter fonts are used as an illustration.

Firstly, in Step B1, the illustration feeling or sensibility attribution value designation means 312 designates the feeling or sensibility attribution of the illustration desired by the user based on the operation by the user. This feeling or sensibility attribution is designated from among the illustration feeling or sensibility attribution values stored, in advance, in the illustration storage means 303 together with the illustration. In FIG. 39, the attribution is designated as pretty."

Next, in Step B2, the illustration feeling or sensibility search means detects the illustrations which match the feeling or sensibility attribution value designated by the illustration feeling or sensibility attribution value designation means from among the illustrations stored in the illustration storage means 303 and, at the same time, the illustration presentation means 304 displays the illustrations detected by the illustration feeling or sensibility search means 311 on the illustration candidate presentation screen 326 as illustration candidates.

In Step B3, the user judges whether or not there are any illustration candidates displayed on the illustration candidate presentation screen 326 which match the desired illustration in the same manner as in Embodiment 1. In the case that no desired illustration is displayed, the procedure proceeds to Step B4.

In Step B4, judgment of whether or not the illustration feeling or sensibility attribution value at that present time should remain unchanged is carried out. In the case of no change, the procedure proceeds to Step B5, while in the other case the procedure returns to Step B1 so that the illustration feeling or sensibility attribution value designation means 310, again, sets a new illustration feeling or sensibility attribution value and the steps up to that point are repeated.

In Step B5, through the input to the illustration display switching button 324, illustration candidates displayed on the illustration candidate presentation screen 326 are switched.

The operations in Steps B6, B7, B8, B9 and 310 are the same, respectively, as the Steps A4, A5, A6, A7 and A8 of the present Embodiment 1 shown in FIG. 29, of which the descriptions are omitted.

As described above, according to the e-mail preparation device of the present Embodiment 5, in the configuration which comprises the illustration feeling or sensibility attribution value designation means 312 and the illustration feeling or sensibility search means 3013, it becomes possible to selectively display and to select only the illustrations of the feeling or sensibility attribution value designated by the user from among many illustrations.

Figure 40:
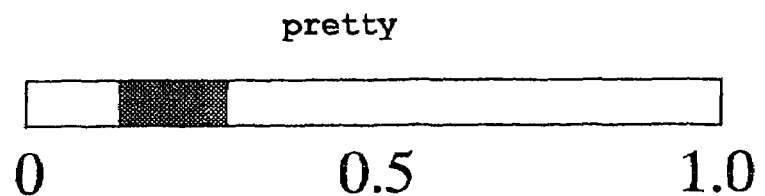
FIG. 40 is a diagram showing one example of an input screen for illustration feeling or sensibility attribution values in the e-mail preparation device according to Embodiment 1 of the invention, which belongs to the second group of the present invention.
Figure 40:
Figure 40:
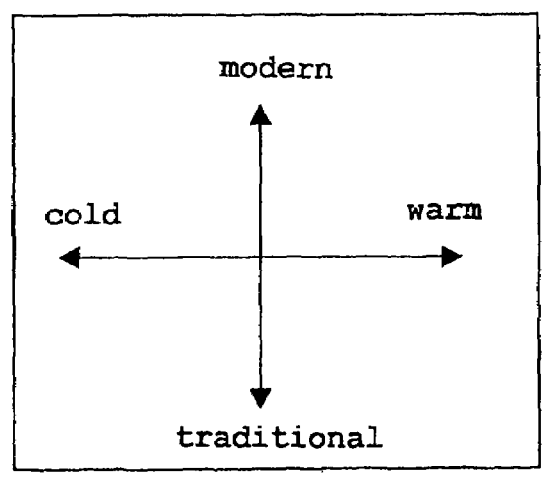

Here, though in the present embodiment, the illustration feeling or sensibility attribution value designation means 312 is described as receiving the input of the feeling or sensibility attribution value pretty from the illustration feeling or sensibility attribution value input screen 3141, in addition to this method, the illustration feeling or sensibility attribution value input screen 3141 may designate the feeling or sensibility attribution together with the numerical degree of match, such as pretty=0.5." In addition, as shown in FIG. 40(a), the illustration feeling or sensibility attribution value input screen 3141 may have the form of slide bar or, as shown in FIG. 40(b), may have the configuration wherein opposite feeling or sensibility words are arranged on each end of the slide bar. In addition, as shown in FIG. 40(c), it may designate a compound feeling or sensibility attribution value by using the two dimensional coordinate axis.

Here, by providing a cursor position detection means 308 or an insertion position designating information detection means 309 in the present embodiment, an illustration may be inserted into a predetermined position in the document being edited by the document preparation and editing means 302, as shown in the second embodiment or in the third embodiment.

In addition, though in the present embodiment, the illustration inserted into the body of the e-mail is described as being formed of text data, the present invention is not limited to this but, rather, still image data such as JPEG, dynamic image data such as MPEG or AVI, pseudo still image data such as motion-JPEG or GIF animation or data prepared in a vector format may be inserted as an illustration. In this case, the illustration insertion means 306 encodes the illustration in a file encode system, such as BASE64 or uuencode, used for an attached file of e-mail and, at the same time, the document preparation and editing means 302 prepares the document in an HTML format. The illustration becomes an attached file of the e-mail and the display position of the attached image is designated in the body of the document by HTML so that the receiver of the e-mail can see the document in the condition where the illustration is inserted at the position designated on the e-mail preparation screen 325. In the same manner as in the case where the above described text data are used as an illustration, the document and the illustration on the e-mail preparation screen 325 are displayed on the same screen at both the sender and receiver ends.

Embodiment 6

Figure 41:
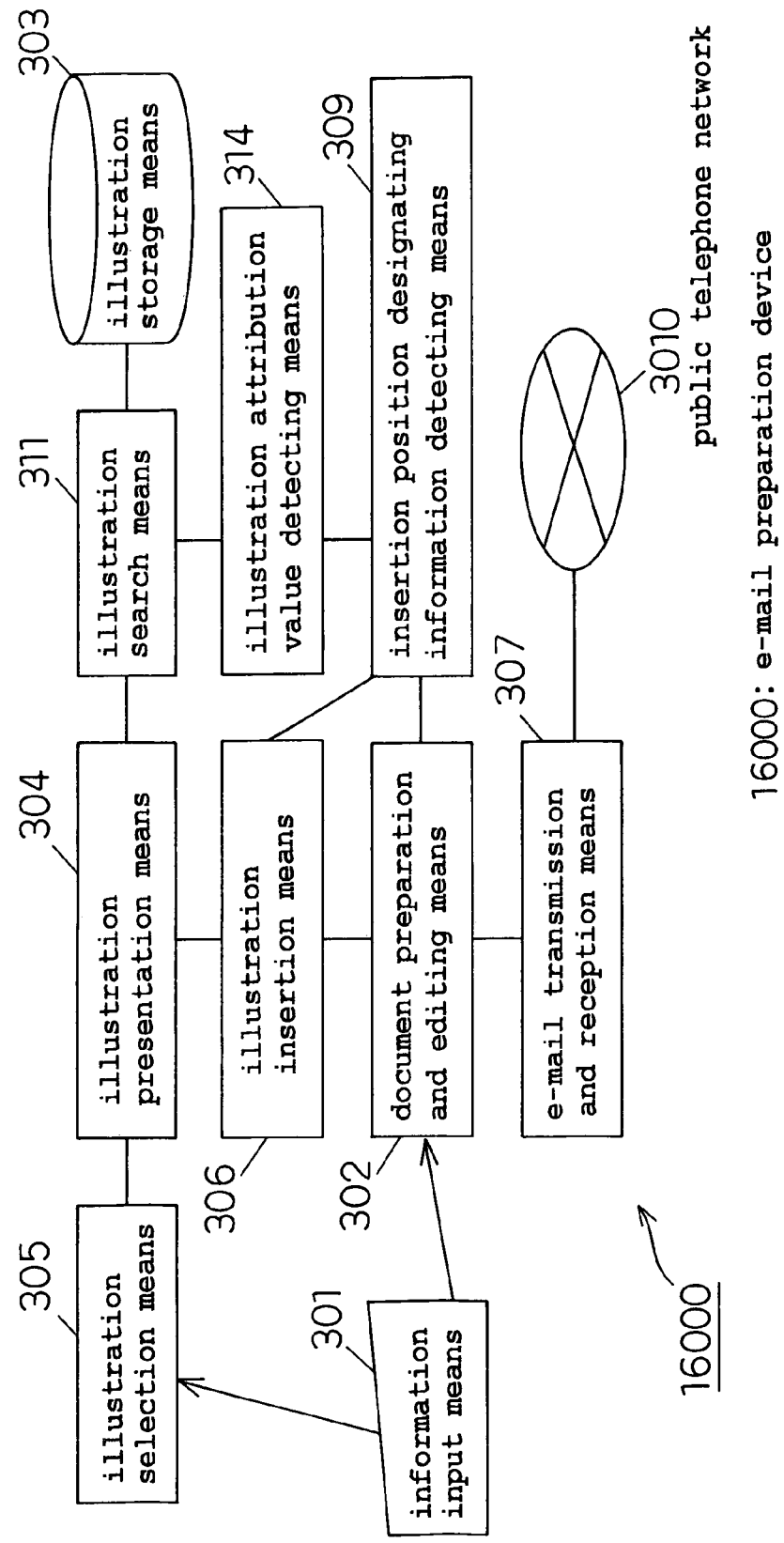
FIG. 41 is a diagram showing a configuration of an e-mail preparation device according to Embodiment 6 of the invention, which belongs to the second group of the present invention.

FIG. 41 is a diagram showing the configuration of an e-mail preparation device according to Embodiment 6 of the present invention. In the figure, the same parts and the same means are denoted by the same signs as in FIGS. 26, 34 and 35. In addition, an e-mail preparation device is denoted as 16000 and an illustration attribution value detection means of detecting the attribution value of the inserted illustration, which is included in the insertion position designating letter sequence detected by the insertion position designating information detection means 309, is denoted as 314.

Next, the GUI of the e-mail preparation device 16000 according to the present Embodiment 6 is the same as in the present Embodiment 4 shown in FIG. 36. In addition, the configuration of the hardware is the same as in the present Embodiment 1 shown in FIG. 28.

Figure 42:
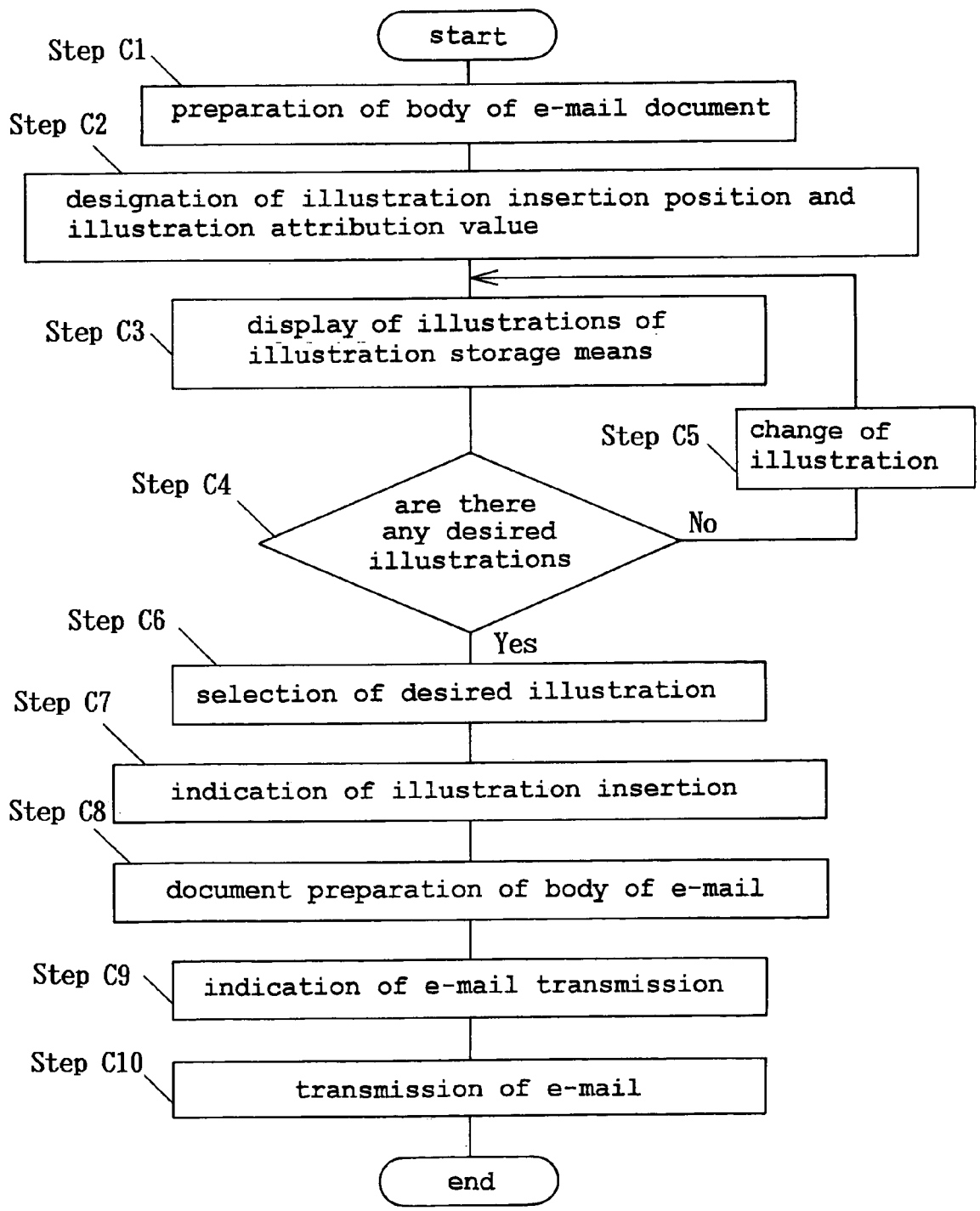
FIG. 42 is a flow chart showing the operation of the e-mail preparation device according to Embodiment 6 of the invention, which belongs to the second group of the present invention.

The operation of the e-mail preparation device according to the present Embodiment 6, which has the above described configuration, is described in reference to the flow chart of FIG. 42. Here, in the present embodiment, text data wherein a pattern is expressed by a combination of and through the arrangement of letter fonts are also used as an illustration.

Firstly, in Step C1, the document preparation and editing means 302 prepare the e-mail document on the e-mail preparation screen 325 based on the operation by the user.

Figure 43:
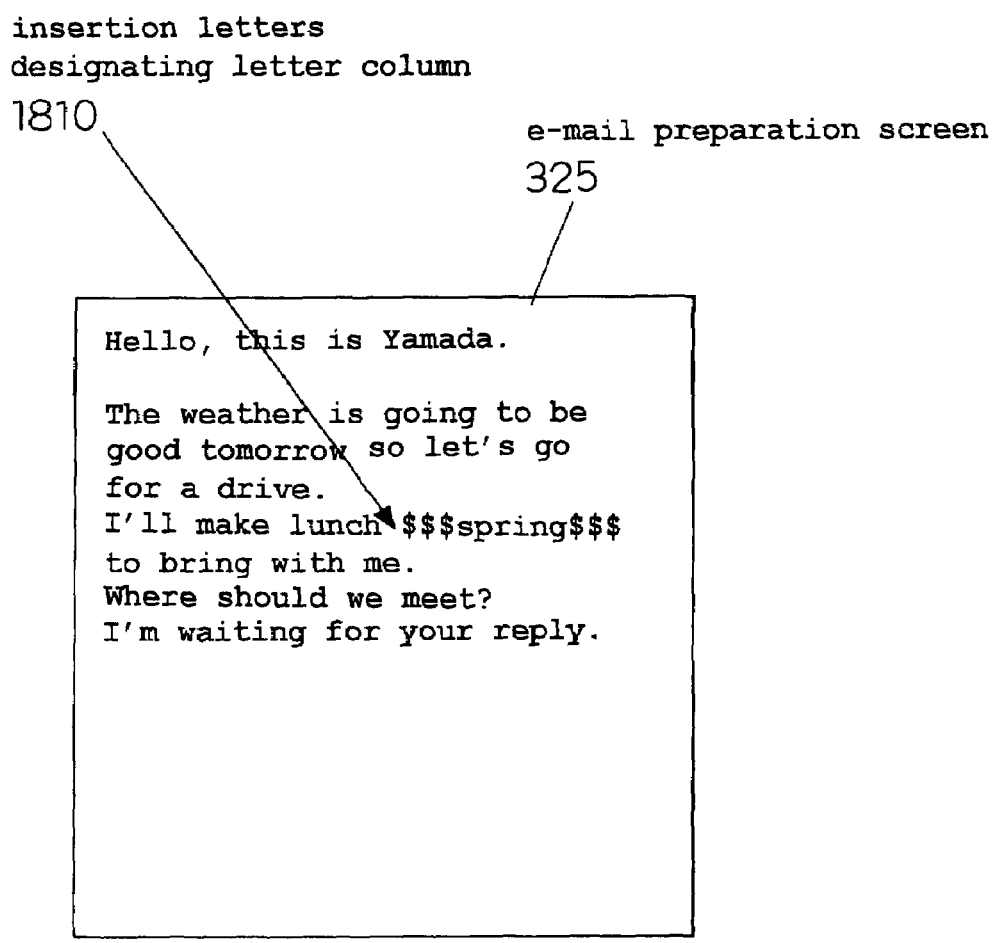
FIG. 43 is a diagram for describing the operation of illustration insertion by the e-mail preparation device according to Embodiment 6 of the invention, which belongs to the second group of the present invention.

Next, in Step C2, an insertion position designating letter sequence is added and written into the position to which an illustration is desired to be inserted in the document prepared by the document preparation and editing means 302 in Step C1. At this time, the attribution value of the illustration is designated and, at the same time, written in into the insertion position designating letter sequence. Here, FIG. 43 shows the condition of the procedure in Step C2 on the e-mail preparation screen 325. One sentence I'll make lunch $$$spring$$$ to bring with me" is written in into the document prepared by the document preparation and editing means 302. The description $$$spring$$$" in this sentence expresses the insertion position of the illustration and the attribution value. The attribution value of the illustration is defined by the word located between the two letter sequences $$$," and spring" corresponds to that in this example. Accordingly, in the following steps, a desired illustration is selected from among the illustration candidates which have the attribution value spring" and is inserted in between the descriptions I'll make lunch" and to bring with me."

Next, in Step C3, the insertion position designating information detection means 309 detects the insertion position designating letter column from among documents displayed on the e-mail preparation means 325 and, at the same time, the illustration attribution value designation means 314 detects the attribution value of the illustration candidates (spring" in the figure) from the above insertion position designating letter column. The illustration search means 311 extracts the corresponding illustration to the above described attribution value from among the illustrations stored in the illustration storage means 303 and, in addition, the illustration presentation means 304 displays the extracted illustrations on the illustration candidate presentation screen 326 as illustration candidates.

In Step C4, in the same manner as in Embodiment 1, it is judged that the illustration candidates displayed on the illustration candidate presentation screen 326 contain a desired illustration based on the operation by the user. In the case that no desired illustration is displayed, the procedure proceeds to Step C6 and in the case that a predetermined illustration is not shown, the procedure proceeds to Step C5.

In Step C5, the displayed illustration candidates are switched through the input to the illustration display switching button 324.

The operations in Steps C3 to C5 are repeated until when an illustration desired by the user is displayed.

Next, the Step C6 determines a desired illustration. The operation at this time is the same as in Step A4 of the present Embodiment 1 and, based on the operation by the user, the information input means 301 selects the desired illustration from among the illustration candidates displayed on the illustration candidate presentation screen 326.

Figure 44:
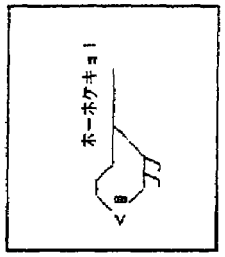
FIG. 44 is a diagram for describing the operation of illustration insertion by the e-mail preparation device according to Embodiment 6 of the invention, which belongs to the second group of the present invention.

In Step C7, the illustration determined in Step C6 is inserted into the document which has become the objective of the editing on the e-mail preparation screen 325. This operation is carried out in the same manner as in Step A5 of the present Embodiment 3. Here, FIG. 44 shows the condition where the illustration is inserted into the e-mail preparation screen 325.

Finally, Steps C8, C9 and C10 correspond, respectively, to Steps A6, A7 and A8 of the present Embodiment 1, of which the descriptions are omitted.

As described above, according to the e-mail preparation device of the present Embodiment 6, in the configuration which comprises the illustration attribution value detection means 314 and the illustration search means 311, it becomes possible to selectively display and to select only the illustrations of the attribution that the user has designated from among many illustrations.

Here, though in the present embodiment $$$" is used as the insertion position designating letter column, the invention is not limited to this but, rather, anything may be used as long as the insertion position designating detection means 309 is a letter column which is sufficiently identifiable without being confused with the letters in the body of the document.

Figure 45:
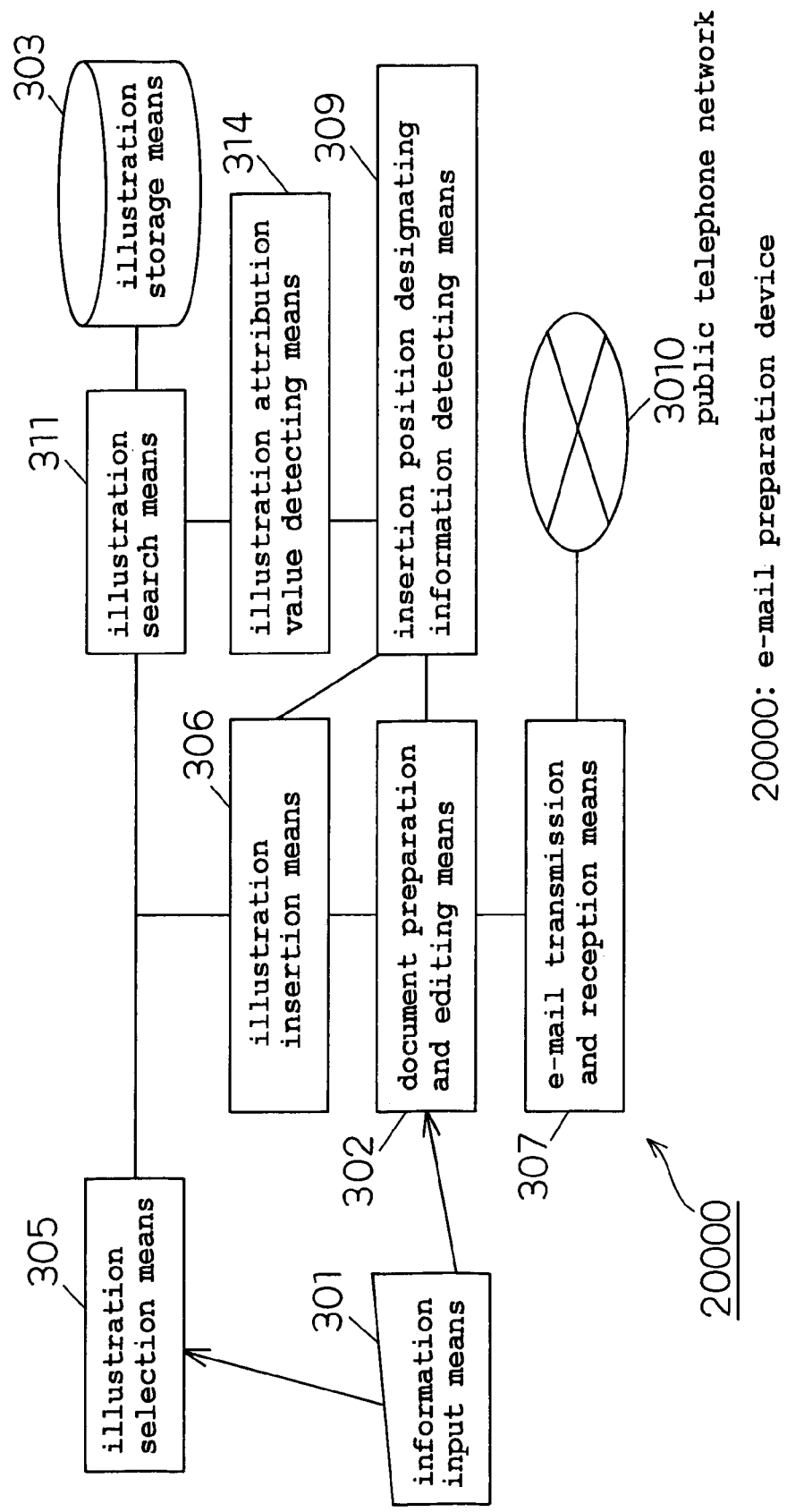
FIG. 45 is a diagram showing another configuration example of an e-mail preparation device according to Embodiment 6 of the invention, which belongs to the second group of the present invention.
Figure 46:
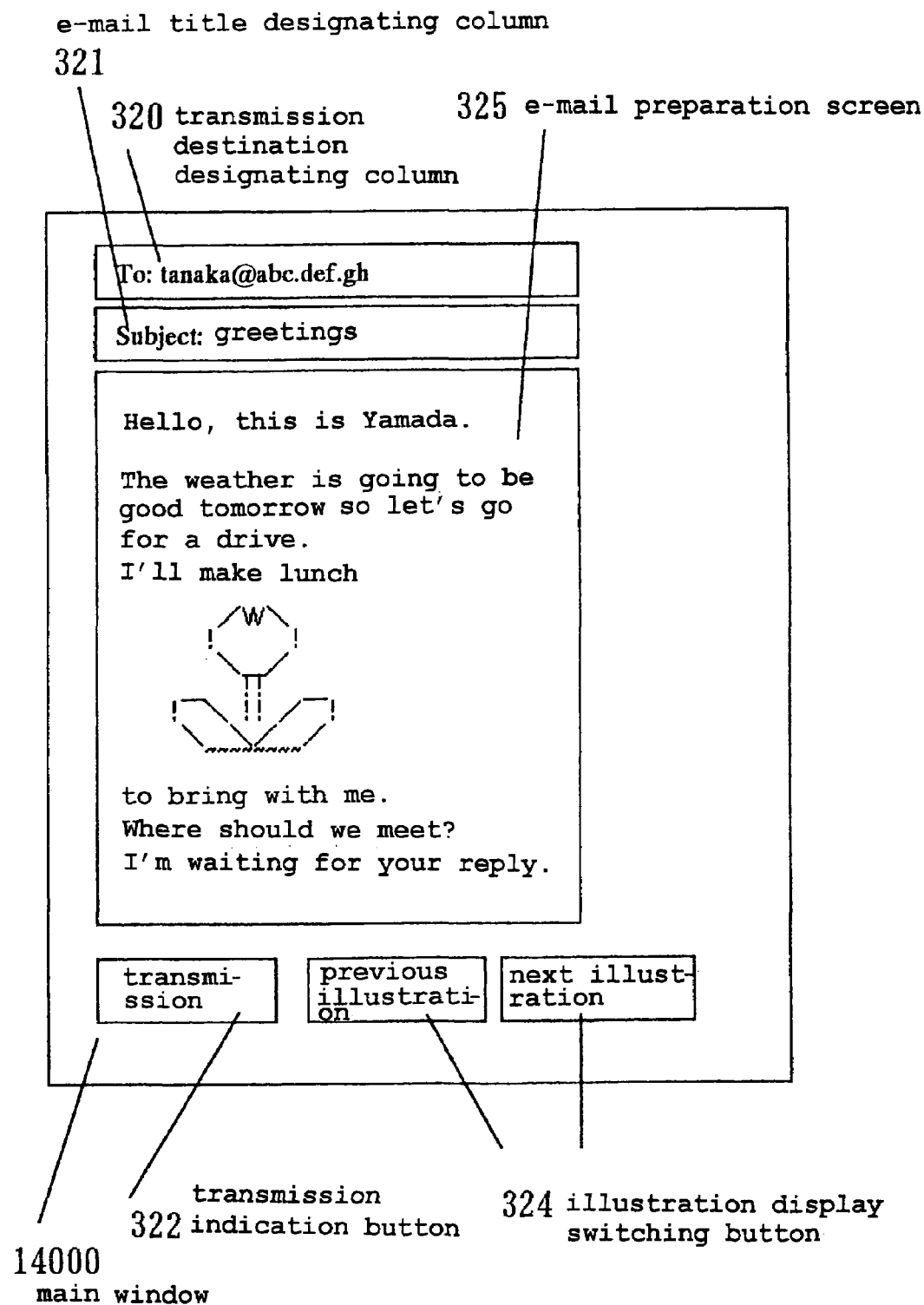
FIG. 46 is a diagram showing another GUI example of the e-mail preparation device according to Embodiment 6 of the invention, which belongs to the second group of the present invention.

In addition, though the configuration according to the present embodiment is shown in FIG. 41, the invention may have the configuration wherein the illustration presentation means 304 is omitted from the configuration of FIG. 41. In the case of the configuration of FIG. 45, the GUI becomes as in FIG. 46 and, in this case, an illustration is inserted into a position of the document detected by the insertion position designating information detection means 309 without entailing a process of user selection wherein the illustration inserted into the insertion position can be consecutively changed by the illustration display switching button 3204. Here, in this case, the illustration search means includes the function of consecutively changing the illustration and, in the case that the illustration presentation means includes the changing function, it is not necessary to omit the illustration presentation means 304.

Figure 47:
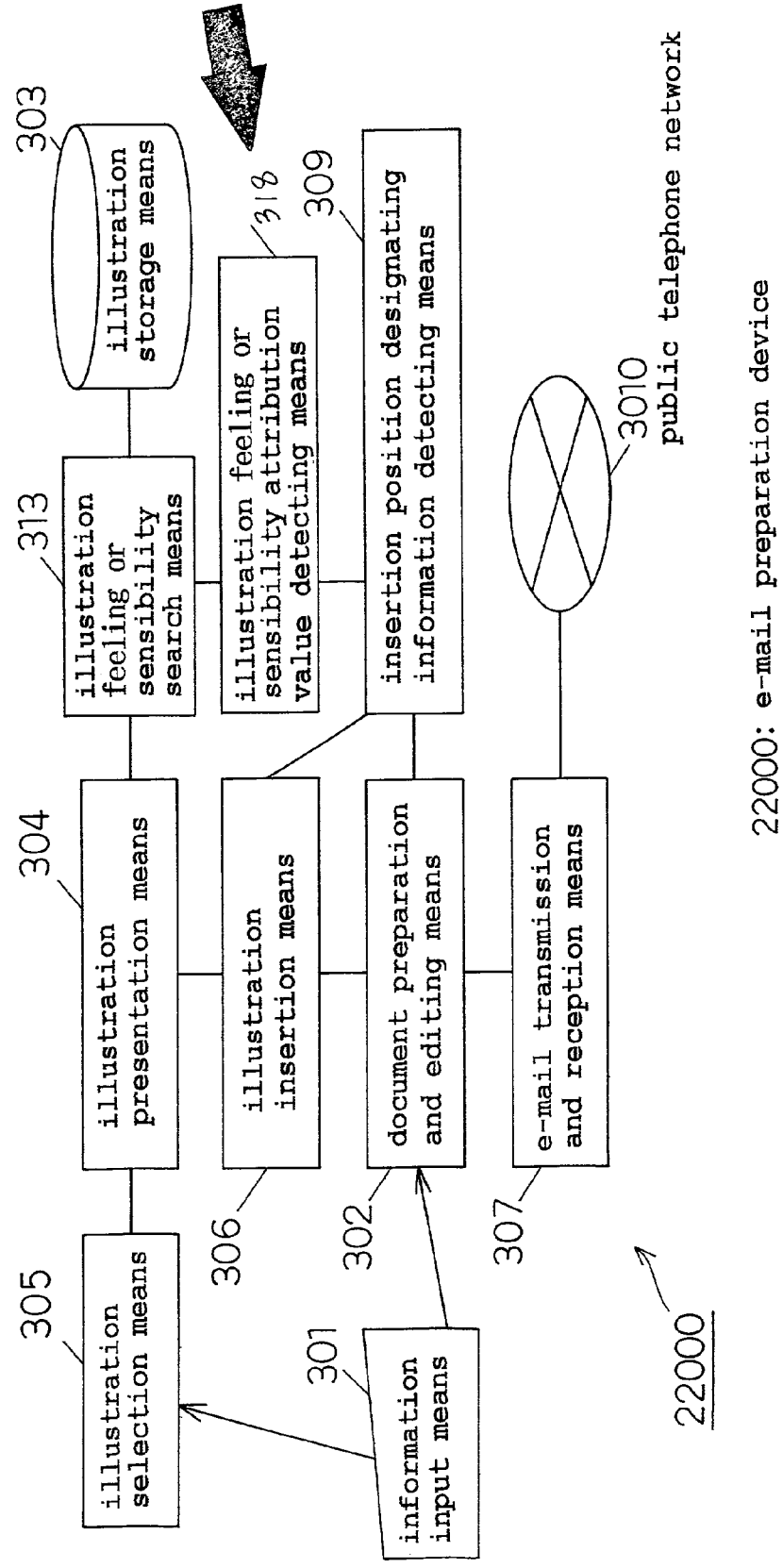
FIG. 47 is a diagram showing another configuration example of an e-mail preparation device according to Embodiment 6 of the invention, which belongs to the second group of the present invention.

In addition to the system configuration in the present embodiment is shown in FIG. 41, an illustration feeling or sensibility attribution value designation means 315, which detects the inserted illustration feeling or sensibility attribution value that is included in the insertion position designating letter column detected by the insertion position designating information detection means 309 may be provided in place of the illustration attribution value designation means 314 of the configuration shown in FIG. 41 and the illustration feeling or sensibility search means 313 may be provided in place of the illustration search means 311 and, moreover, the illustration storage means 303 may have the configuration shown in FIG. 47 wherein illustrations for insertion into, and use in, an e-mail are stored together with the feeling or sensibility words, such as adjectives for representing the impressions concerning the illustrations and the feeling or sensibility attribution of the degree thereof. In this case, in designating the illustration insertion position and the illustration attribution value in Step C2 of FIG. 42, the feeling or sensibility word can be designated, such as $$$pretty$$$," or the feeling or sensibility word can be designated together with the degree thereof, such as $$$pretty=0.5$$$."

In addition, though in the present embodiment, the illustration inserted into the body of the e-mail is described as an illustration formed of text data, the invention is not limited to this but, rather, still image data such as JPEG, dynamic image data such as MPEG or AVI, pseudo still image data such as motion-JPEG or GIF animation or data prepared in a vector format may be inserted as an illustration. In this case, the illustration insertion means 6 encodes the illustration in a file encode system, such as BASE64 or uuencode, used for an attached file of e-mail and, at the same time, the document preparation and editing means 302 prepares the document in an HTML format. The illustration becomes an attached file of the e-mail and the display position of the attached image is designated in the body of the document by HTML so that the receiver of the e-mail can see the document in the condition where the illustration is inserted at the position designated on the e-mail preparation screen 325. The documents and the illustrations are displayed on the same screen on both the sender's end as well as on the receiver's end on the e-mail preparation screen 325 in the same manner as in the case where the above described text data are used as an illustration.

Embodiment 7

Figure 48:
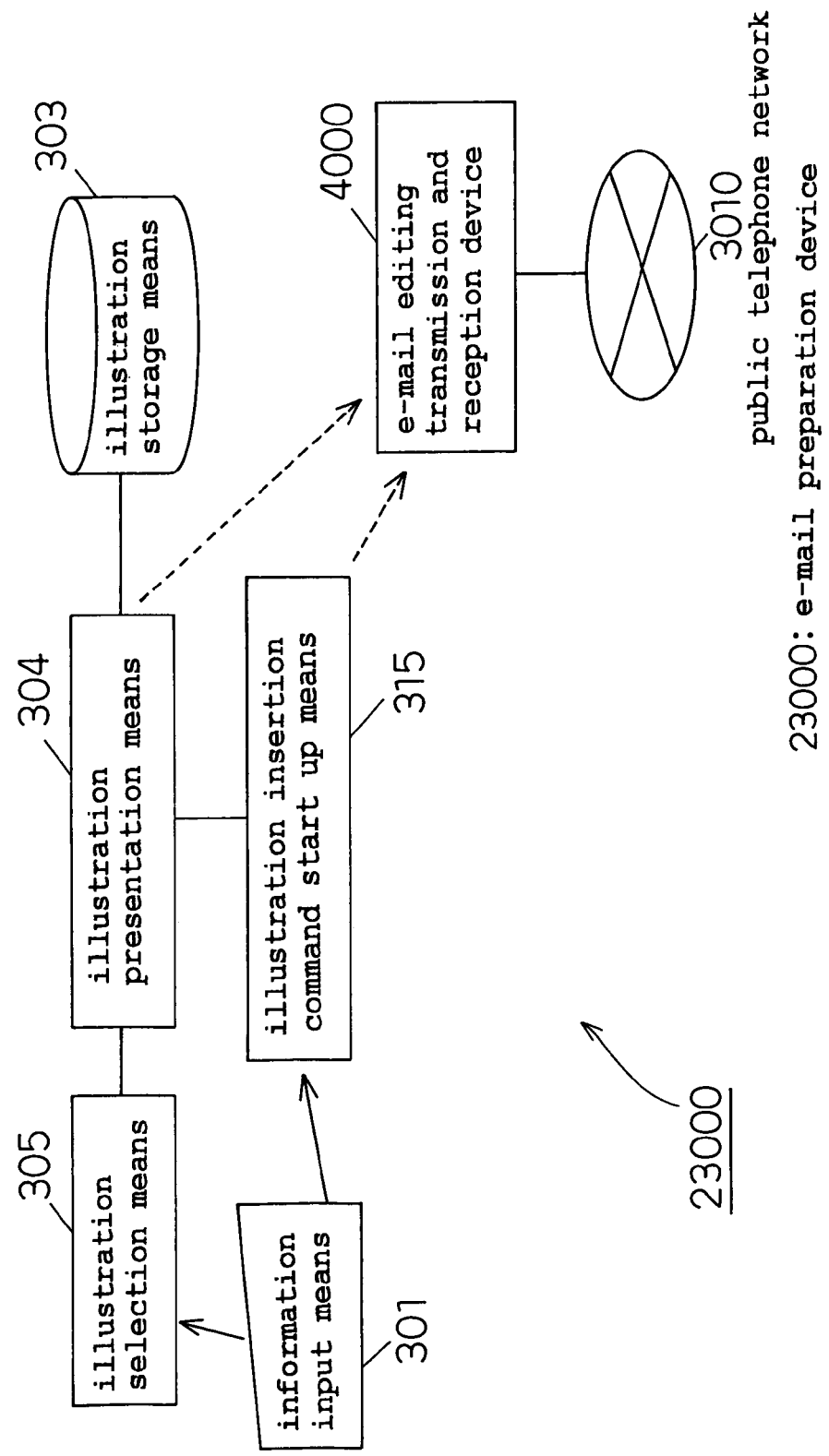
FIG. 48 is a diagram showing a configuration of an e-mail preparation device according to Embodiment 7 of the invention, which belongs to the second group of the present invention.

FIG. 48 is a diagram showing the configuration of an e-mail preparation device according to Embodiment 7 of the present invention. In the figures, the same parts and the same means are referred to by the same signs as in FIG. 26. In addition, an e-mail preparation device is denoted as 23000 and an illustration insertion command start means of starting the command for inputting an illustration selected by the illustration selection means 5 into the editing screen of the external e-mail editing and transmitting/receiving device is denoted as 315.

Figure 49:
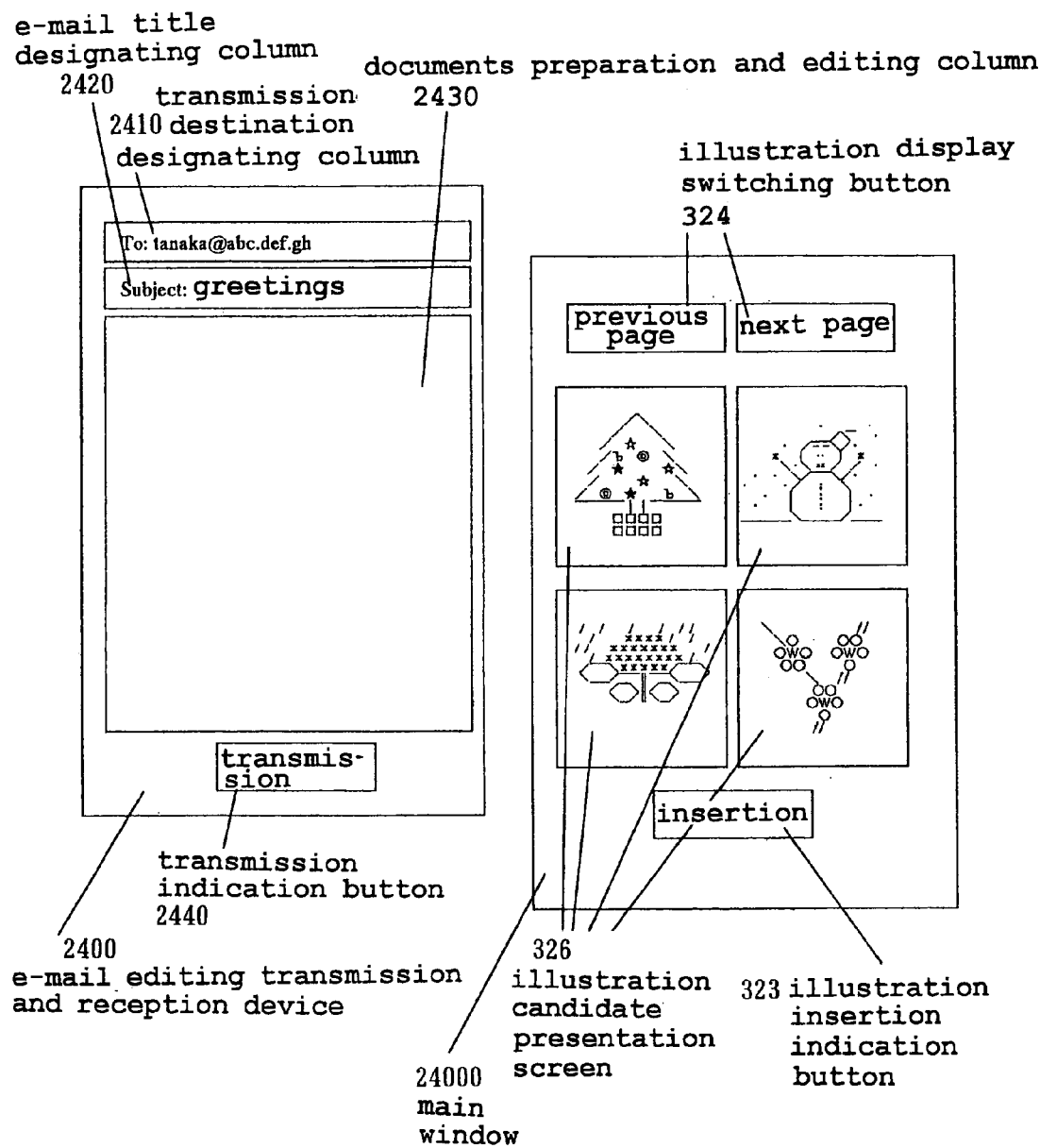
FIG. 49 is a diagram showing a GUI of the e-mail preparation device according to Embodiment 7 of the invention, which belongs to the second group of the present invention.

Next, FIG. 49 is a diagram showing the GUI of the e-mail preparation device 23000 according to the present Embodiment 7.

In the figure, the same parts and the same means are referred to by the same signs as in FIGS. 26 and 27. In addition, the main window of the external e-mail editing and transmitting/receiving device is denoted as 3240, which is formed of the transmission destination designating column 3241, the e-mail title designating column 3242, the transmission indication button 3244 and the document preparation and editing column 3243.

Figure 53:
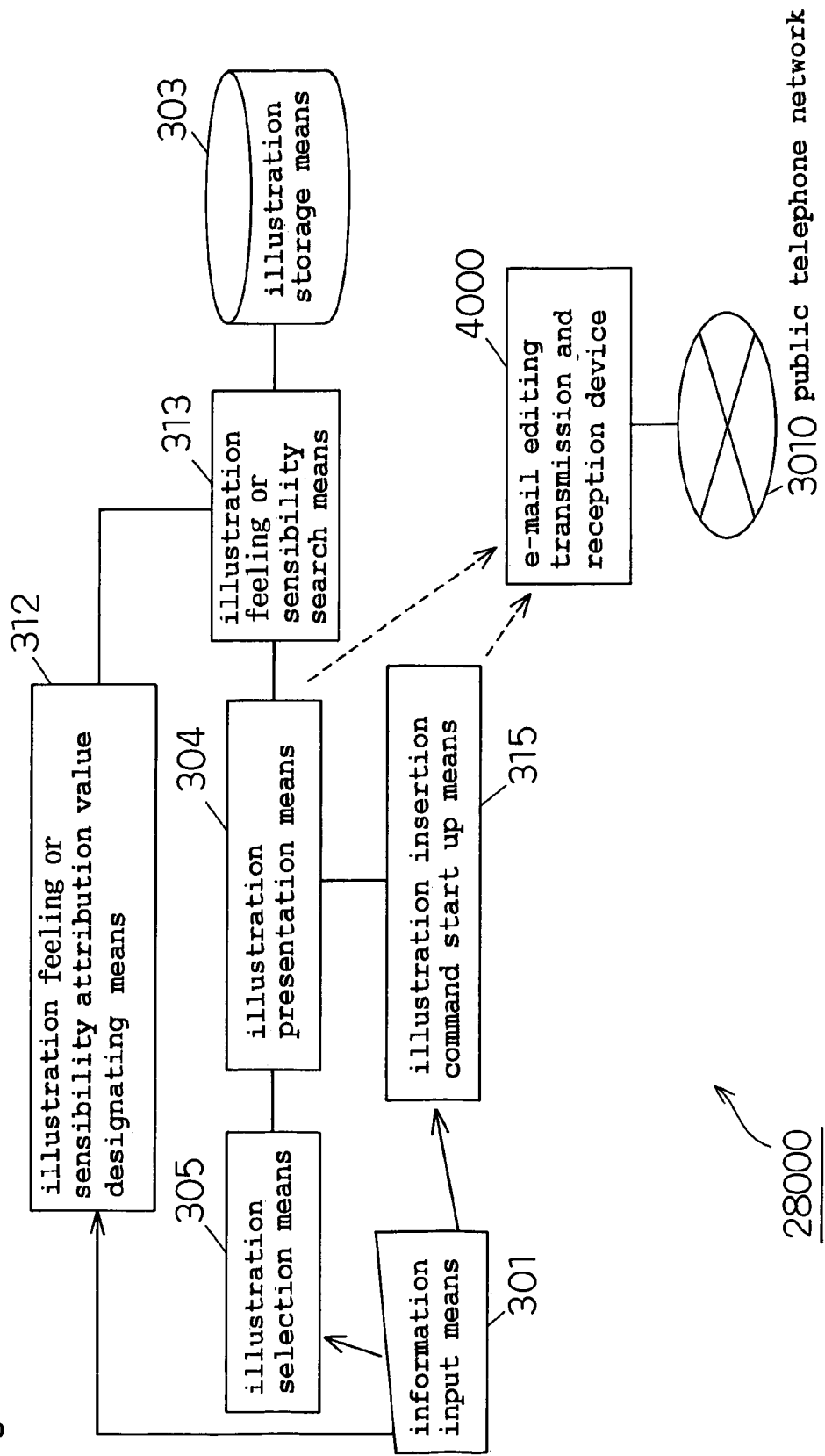
FIG. 53 is a diagram showing another configuration example of an e-mail preparation device according to Embodiment 7 of the invention, which belongs to the second group of the present invention.

Next, the hardware configuration which implements the e-mail preparation device 23000 of the present Embodiment 7 is the same as in the present Embodiment 1 shown in FIG. 53.

Figure 50:
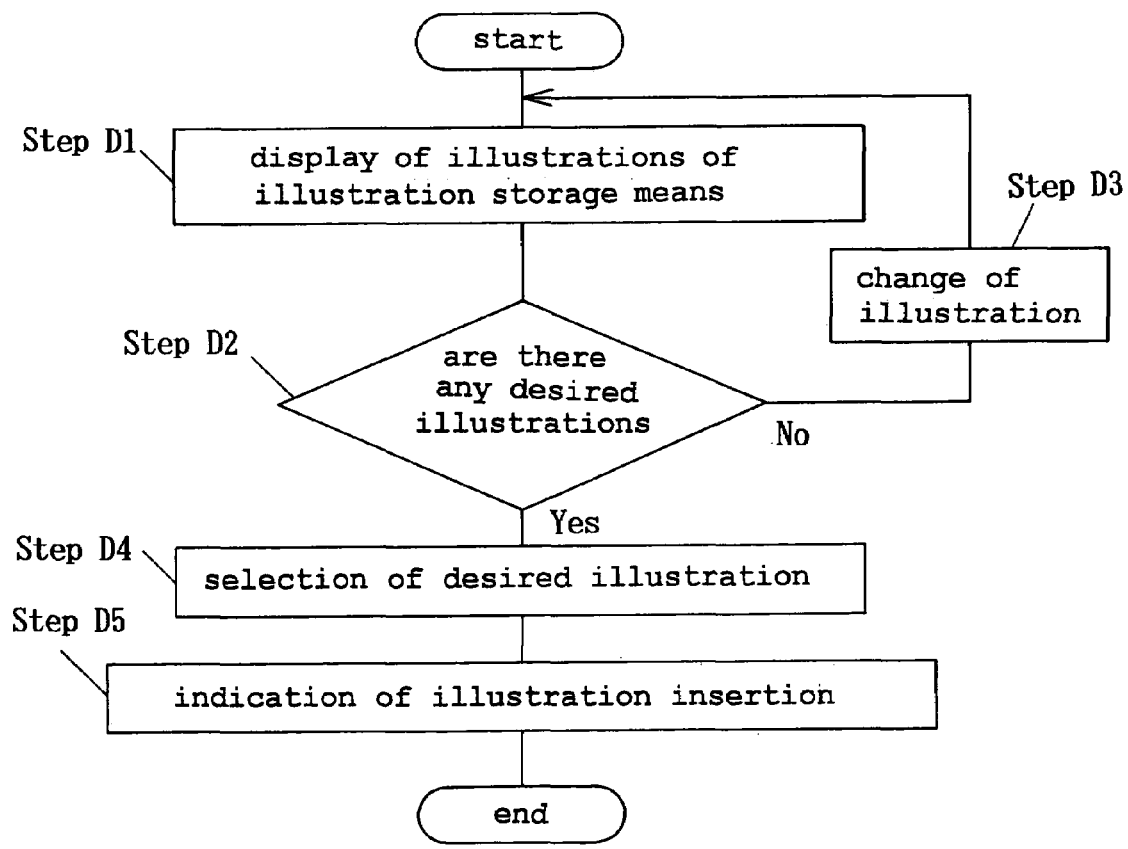
FIG. 50 is a flow chart showing the operation of the e-mail preparation device according to Embodiment 7 of the invention, which belongs to the second group of the present invention.

The operation of the e-mail preparation device, according to the present Embodiment 7, which has the above described configuration, is described in reference to the flow chart of FIG. 50. Here, in the present embodiment, the text data which express a pattern by a combination of, or through the arrangement of, letter fonts are used as an illustration.

Firstly, the operations of Steps D1, D2, D3 and D4 are carried out in the same manner as in the operations in Steps A1, A2, A3 and A4 of the present Embodiment 1, respectively, of which the descriptions are omitted.

Next, in Step D5, the illustration determined in Step D4 is inserted to the ready made external e-mail transmission and reception device 4000. Here, the indication is carried out by clicking the illustration insertion indication button 323 with a pointing device. When this indication is given, the illustration insertion command start means 315 inserts an illustration into the body of the e-mail together with the command for inserting an illustration into the ready made external e-mail transmission and reception device 4000. An interface, which is referred to as MAPI (messaging API), is provided in Windows 95/98 which are operating systems of the Microsoft Corporation in the United States and by giving a variety of commands to this MAPI, the above described operations, such as start up of the above described external e-mail transmission and reception device 4000 and the insertion into the body of the e-mail, become possible.

In addition, in the case that the MAPI is not utilized, the illustration insertion command start means 315 directly starts the external e-mail transmission and reception device 4000 and it is possible to implement the same operations as by MAPI by designating the illustration selected for the body of the e-mail as a start up option at the time of start up.

In the above, the operation of the e-mail preparation device 23000 is completed and, hereinafter, by further carrying out the editing and transmission operation of the e-mail in the external e-mail transmission and reception device 4000, a sequence of all of the operations are completed.

Figure 51:
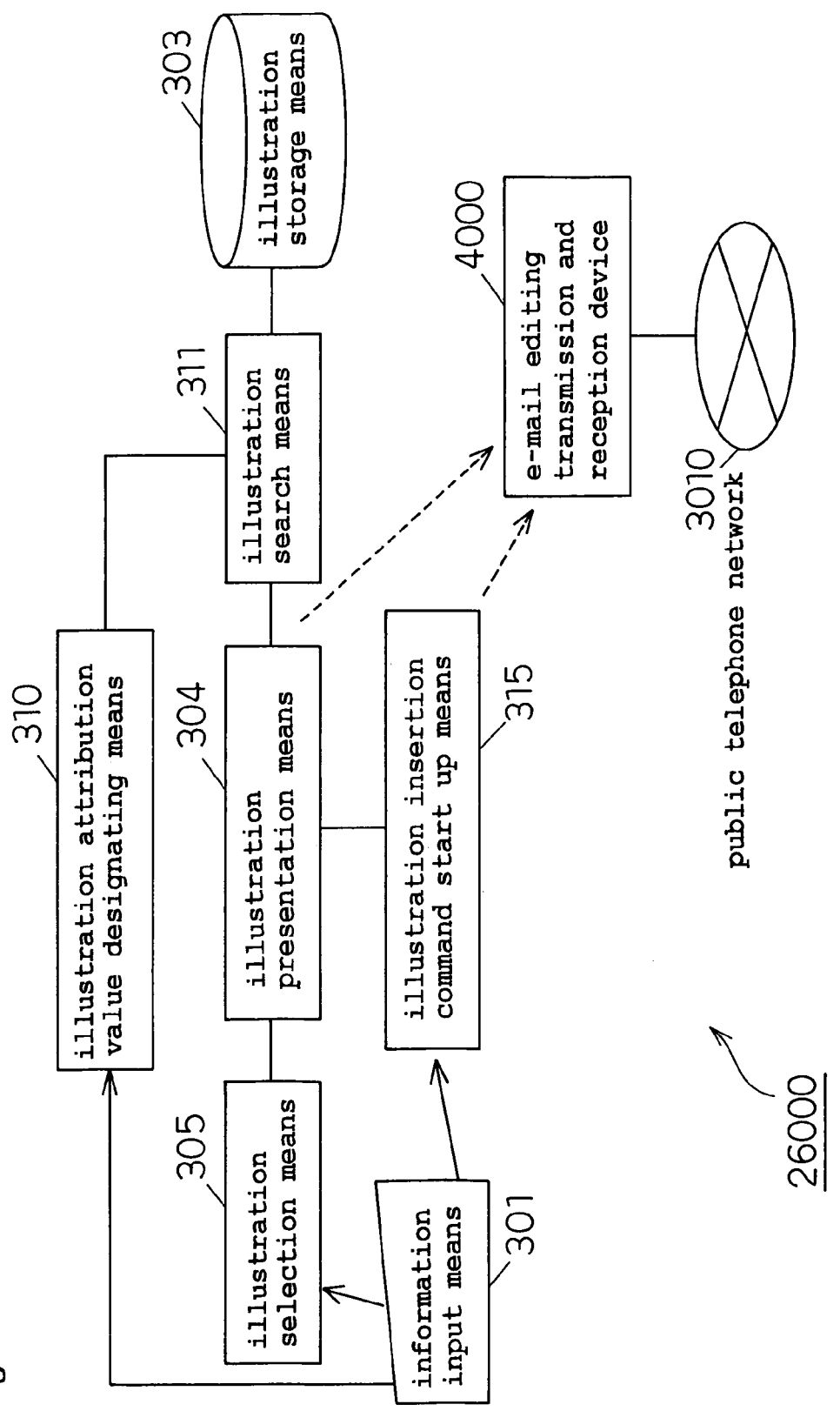
FIG. 51 is a diagram showing another configuration example of an e-mail preparation device according to Embodiment 7 of the invention, which belongs to the second group of the present invention.
Figure 52:
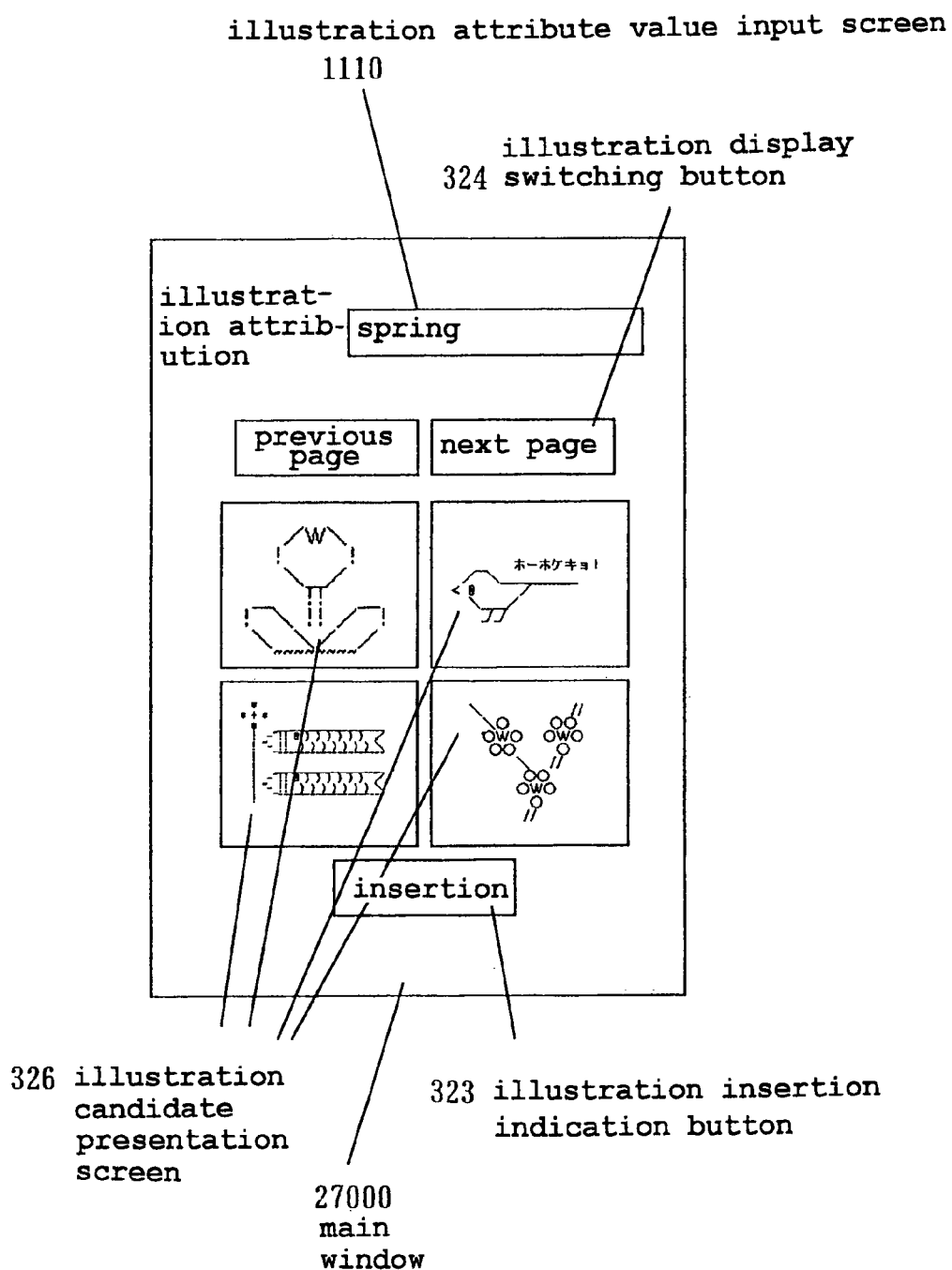
FIG. 52 is a diagram showing another GUI example of the e-mail preparation device according to Embodiment 7 of the invention, which belongs to the second group of the present invention.

Here, the configuration of the present embodiment is shown in FIG. 48 and, by further adding an illustration attribution value designation means 310 and an illustration search means 311 to this configuration, an e-mail preparation device 26000, wherein illustrations for insertion into, and for use in, an e-mail are stored in the illustration storage means 303 together with the attribution values, such as titles, classes, illustrators and time and date of preparation of the illustrations and which has the configuration as shown in FIG. 51 is gained and, thereby, it becomes possible to insert an illustration having the illustration attribution value designated by the user into the external e-mail transmission and reception device 4000. The GUI of this condition is shown in FIG. 52.

Figure 54:
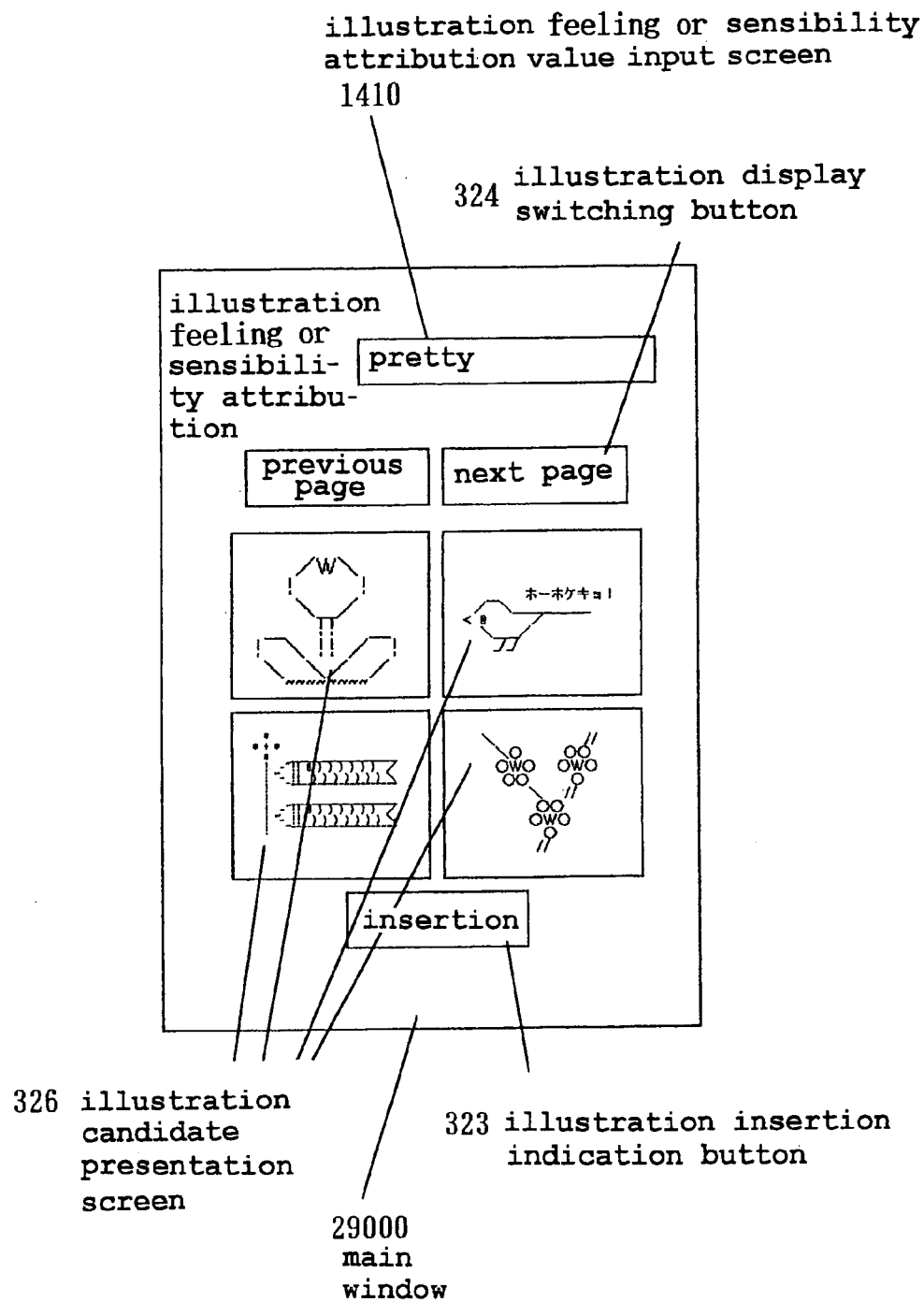
FIG. 54 is a diagram showing another GUI example of the e-mail preparation device according to Embodiment 7 of the invention, which belongs to the second group of the present invention.

In addition, by further adding an illustration feeling or sensibility attribution value designation means 312 and an illustration feeling or sensibility search means 313 to the system configuration of FIG. 48 in the same manner, an e-mail preparation device 28000, wherein the illustration storage means 303 stores illustrations for insertion into, and for use in, an e-mail together with the feeling or sensibility words, such as adjectives for expressing the impressions concerning the illustrations and the degree of the feeling or sensibility attribution thereof and which has the configuration shown in FIG. 53 is gained and, thereby, it becomes possible to insert an illustration having the illustration attribution value designated by the user into the external e-mail transmission and reception device 4000. The GUI of this condition is shown in FIG. 54.

In addition, though in the present embodiment the exterior e-mail transmission and reception device 4000 is described as being started by the MAPI, in the case that this device is used on another operating system (OS), this device is, of course, started by an API fore-mails operating on this OS.

In addition, though in the present embodiment the illustration inserted into the body of an e-mail is described as being formed of text data, the invention is not limited to this but, rather, still image data such as JPEG, dynamic image data such as MPEG or AVI, pseudo still image data such as motion-JPEG or GIF animation or data prepared in a vector format may be inserted as an illustration. In this case, the illustration insertion means 306 encodes the illustration in a file encode system, such as BASE64 or uuencode, used for an attached file of e-mail and, at the same time, the document preparation and editing means 302 prepares the document in an HTML format. The illustration becomes an attached file of the e-mail and the display position of the attached image is designated in the body of the document by HTML so that the receiver of the e-mail can see the document in the condition where the illustration is inserted at the position designated on the e-mail preparation screen 325. The documents and the illustrations are displayed on the same screen on both the sender's end as well as on the receiver's end on the e-mail preparation screen 325 in the same manner as in the case where the above described text data are used as an illustration.

Embodiment 8

Figure 55:
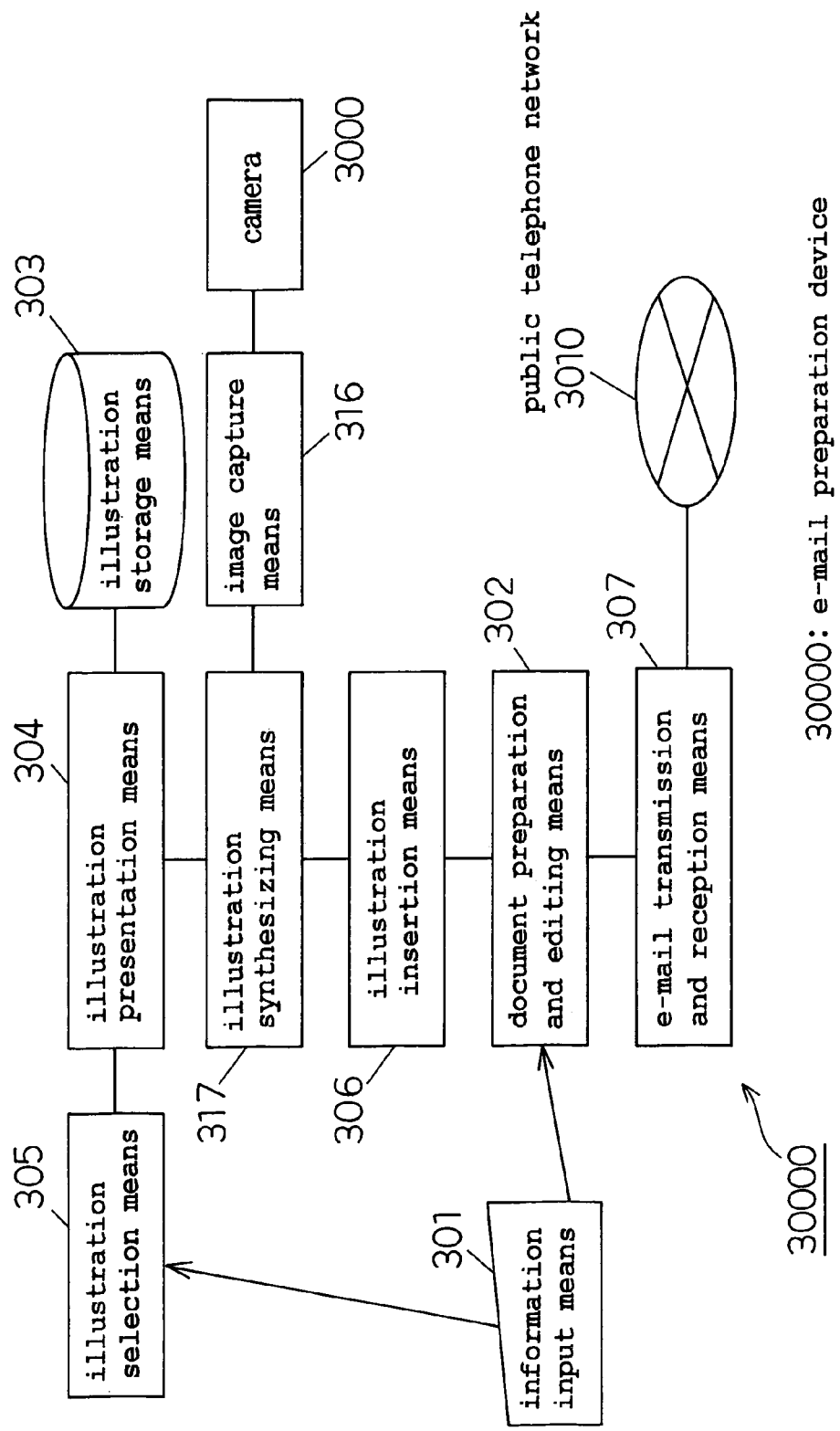
FIG. 55 is a diagram showing a configuration of an e-mail preparation device according to Embodiment 8 of the invention, which belongs to the second group of the present invention.

FIG. 55 is a diagram showing the configuration of an e-mail preparation device according to Embodiment 8 of the present invention. In the figure, the same parts and the same means are referred to by the same signs as in FIG. 26. In addition, an e-mail preparation device is denoted as 30000, an image capture means, which takes in an image from an exterior apparatus, is denoted as 316, an illustration synthesizing means 317, which synthesizes the image taken in by the image capture means 316 and the illustration selected by the illustration search means 305, is denoted as 317 and a camera, which is the exterior apparatus connected to the image capture means 316, is denoted as 320.

Figure 57:
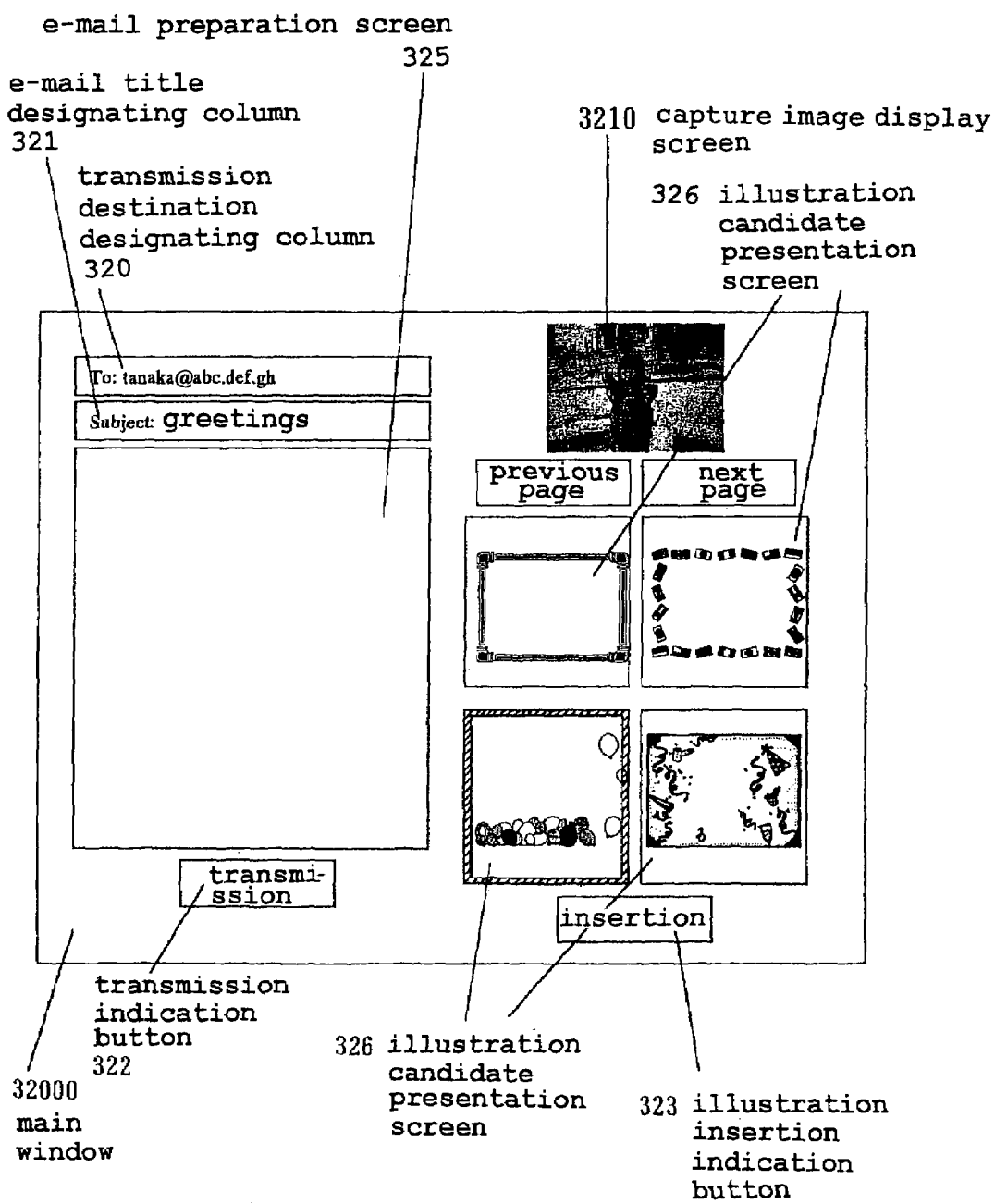
FIG. 57 is a diagram showing a GUI of the e-mail preparation device according to Embodiment 8 of the invention, which belongs to the second group of the present invention.

Next, FIG. 57 is a diagram showing the GUI of the e-mail preparation device 30000 according to the present Embodiment 8. In the figure, the same parts and the same means are referred to by the same signs as in FIG. 27 and a main window is denoted as 32000 and a capture image display screen, which displays the image taken in by the image capture means 316, is denoted as 3210.

Figure 56:
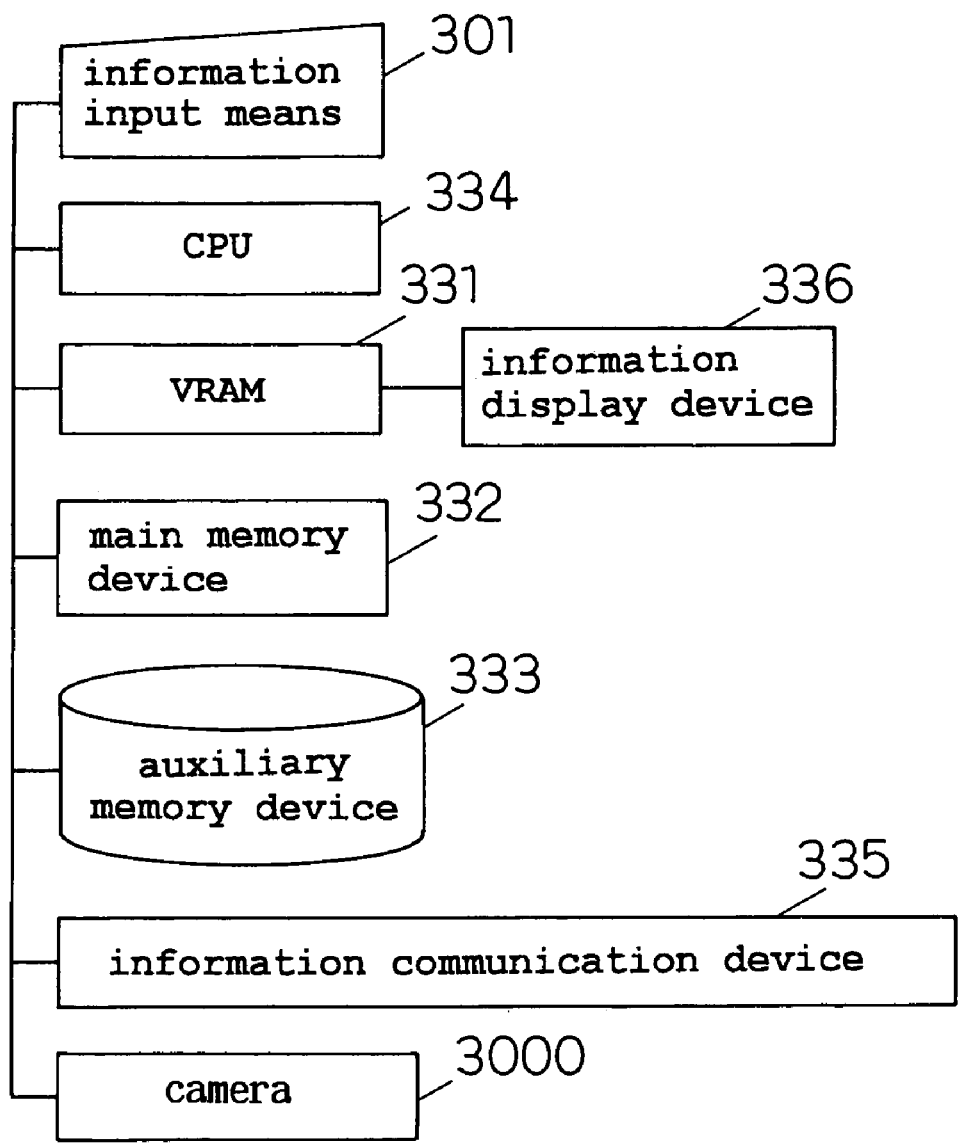
FIG. 56 is a diagram showing a configuration of the hardware which implements the e-mail preparation device according to Embodiment 8 of the invention, which belongs to the second group of the present invention.

Next, FIG. 56 is a diagram showing the hardware configuration which implements the e-mail preparation device 30000 according to the present Embodiment 8. In the figure, the same parts and the same means are referred to by the same signs as in FIGS. 28 and 56.

Though the operation of the e-mail preparation device according to the present Embodiment 8 which has the above described configuration is carried out in essentially the same manner as in the present Embodiment 1, a point of difference is that the illustration inserted into the e-mail preparation screen 325 has been synthesized from an illustration stored in the illustration storage means 303 and the image taken in by the image capture means 316. Here, in the present embodiment, generic image data are used as an illustration instead of text data. FIG. 57 is referred to in the following description.

Firstly, in the main window 32000, in the same manner as in the other embodiments of the present invention, the illustration presentation means 304 displays illustration candidates on the illustration candidate presentation screen 326 and, at the same time, the image capture means 316 displays an image on the capture image display screen 3210.

Next, based on the operation by the user, the synthesis of an illustration and a image is carried out. While referring to the image displayed on the capture image display screen, the illustration which is to be synthesized with this image is directly selected from the screen by using the pointing device. The screen where the illustration of the objective for the synthesis is displayed is, as shown in FIG. 57, surrounded by a frame so as to be identifiable from the screens which display other illustrations and, thereby, converts to the condition where the preparation for the synthesis of the image and the illustration, as well as for the insertion of the image gained by this synthesis into the e-mail preparation screen 325, which is the objective of the document preparation and editing means 302, is carried out.

Then, by clicking the illustration insertion indication button 323, the synthesis of the illustration and image is carried out and, then, the synthesized image is inserted into the e-mail preparation screen 325. The operation afterwards is carried out in the same manner as in Embodiments 1 to 7.

Figure 58:
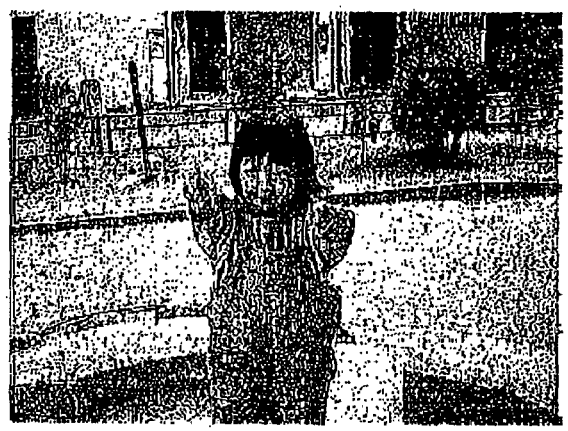
FIG. 58 is a diagram for describing the operation of the synthesizing of an illustration and an image by means of the e-mail preparation device according to Embodiment 8 of the invention, which belongs to the second group of the present invention.
Figure 58:
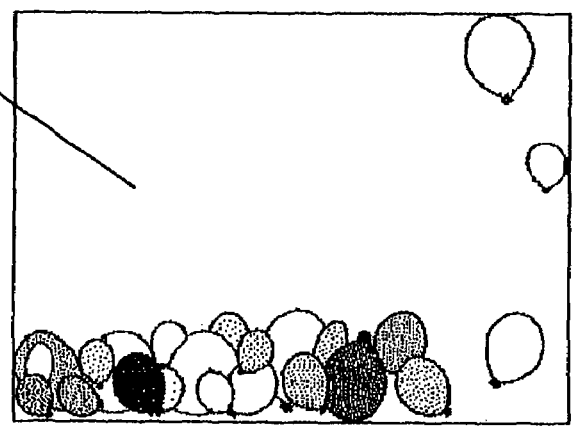
Figure 58:

Here, FIG. 58 is a diagram showing the appearance of the synthesis of the illustration and image wherein FIG. 58(*a*) shows an image displayed on the capture image display screen 3210 and FIG. 58(*b*) shows the illustration candidate selected by the user from among the illustrations presented on the illustration presentation means 304. FIG. 58(*c*) shows the image synthesized from the above described FIGS. 58(*a*) and 58(*b*) and this synthesized image, only, of 58(*c*) is, finally, displayed on the e-mail preparation screen 325. Here, at the time of this image insertion, this image is encoded in advance by means of BASE64, uuencode, or the like.

Here, in the case that the document preparation and editing means 302 has the function of the preparation of a document in an HTML format and of the positioning of an image in accordance with the HTML style sheet, the synthesis of the image shown in FIG. 58 is not necessarily carried out but, rather, by overlapping two images of FIGS. 58(*a*) and 58(*b*) in accordance with the style sheet, the illustration and the image can be displayed in a synthesized form on the e-mail preparation screen 325. Here, at this time, as for the illustration of FIG. 58(*b*), it is necessary to use data in a transparent GIF format wherein the background part is set in a translucent color.

Here, the document data preparation and editing means according to the claims corresponds to the document preparation means 302 in the present embodiment, the added data storage means according to the claims corresponds to the illustration storage means 303, the added data selection means according to the claims corresponds to the illustration search means 305, the illustration attribution value designation means 310, the illustration search means 311, the illustration feeling or sensibility attribution value designation means 312, the illustration feeling or sensibility search means 313, the illustration attribution value detection means 314 and the illustration feeling or sensibility attribution value detection means 318, the added data display means according to the claims corresponds to the illustration presentation means 304 according to the claims, the synthesizing means according to the claims corresponds to the illustration insertion means 306, the cursor position detection means 308, the insertion position designating information detection means 309, the illustration insertion command start means 315, the image capture means 316 and the illustration synthesizing means 317, respectively.

In addition, though the use of a pointing device is described as the method for input to the screen in all embodiments of the present invention which belong to the second group, the present invention is not limited to this but, rather, input means such as a keyboard or a touch panel may be as the information input means 301.

In addition, though the main window 2000 of the e-mail preparation device 1000 is described as being configured as one window, as shown in FIG. 27, in all embodiments of the present invention which belong to the second group, the present invention is not limited to this but, rather, the functions may be divided into a plurality of windows in so far as the device is controlled as one entity.

In addition, though the e-mail transmission and reception means 307 is described as being connected to the public telephone network 3010 in all embodiments of the present invention which belong to the second group, the present invention is not limited to this but, rather, a connection may be made to a global network such as the Internet or to a local area network such as an intranet in place of the public telephone network 3010.

In addition, though the e-mail preparation device of the present invention is described as the core in all embodiments of the present invention which belong to the second group, a recording medium for recording a program which allows a computer to carry out all of, or a part of, the functions of each means described in the above or all of, or a part of, each step may be used as a recording medium of the present invention.

In addition, the illustration storage means 303 may be placed on a home page server.

INDUSTRIAL APPLICABILITY

As is clear from the above description, the present invention which belongs to the first group, can provide a terminal device which can search for information from a data base so that the search result thereof is forwarded to a supply device connected through a connection cable without being changed so as to indicate the operation of an external device.

In addition, the present invention which belongs to the first group, can provide a terminal device which can search for information from a data base within an information server device which has a connection from the terminal device through a network so that the search result thereof is forwarded without change to a supply device by means of infrared rays so as to indicate the operation of the supply device.

In addition, according to a embodiment of an information forwarding device which is the third invention, the present invention which belongs to the first group can provide an information forwarding system and a terminal system which can search information from a data base within an information server device which has a connection from a search terminal device through a public telephone network so that the search result thereof can be forwarded without change to a supply device by means of radio waves.

In addition, the present invention which belongs to the first group can provide an information forwarding system and a terminal system which can search for information from a data base within an information server device which has a connection from a terminal device through a wireless communication system or through an infrared ray communication system so that the search result thereof can be forwarded without change to an external apparatus by means of a removable medium.

In addition, the present invention which belongs to the first group can provide an information forwarding system and a terminal system which can search for information, by using words such as adjectives, from a data base within an information server device which has a connection from a search terminal device through a public telephone network so that the search result thereof can be forwarded without change to a supply device by means of radio waves so as to indicate the operation of the supply device.

On the other hand, according to the present invention of the second group, an e-mail preparation device and a program recording medium can be gained wherein the user can prepare, as an e-mail, a document to the inside of which illustration data, formed of an image or of text, are inserted through a simple operation.

The invention claimed is:

1. A computer terminal device having a portable body, being operable to access an external database through the use of an external search unit and being operable to output content to an external supply device, the terminal device comprising:

an information input unit operable to input search conditions;

an information display unit operable to display search results which are provided by the external search unit in response to a search of the external database performed using the search conditions input by the information input unit:

a selecting unit operable to select at least one search result from among the search results displayed by the information display unit; and an information output terminal operable to record and hold designated content corresponding to the at least one search result selected by the selecting unit, and directly send the designated content to the external supply device so as to designate the operation of the external supply device.

2. A computer terminal device according to claim 1, further comprising one of an intranet connection, an internet connection, a wireless connection, an infrared ray connection, a radio wave connection, a public telephone network connection and a removable medium for use to perform communication between said computer terminal device and the external search unit.

3. A computer terminal device according to claim 1, further comprising one of a connection cable, an intranet connection, an internet connection, a wireless connection, an infrared ray connection, a radio wave connection, a public telephone network connection and a removable medium for use to perform communication between said computer terminal device and the external supply device.

4. A computer terminal device according to claim 1, wherein the search is a search based on a feeling or sensibility word, which is an adjective, and feeling or sensibility information, which shows the degree of the feeling or sensibility, while attribution values for carrying out a search based on the feeling or sensibility information are stored in the external data base.

5. A computer terminal device according to any claim 1, wherein the external supply device carries out an operation of supplying a tangible entity.

6. A computer-readable program recording medium storing a program for allowing a computer to implement all of, or a part of, the functions of each component of a computer terminal device according to claim 1.

7. A computer information forwarding system including a first device operable to access a database of a second device though the use of a search unit of the second device and being operable to output content to a third device, said computer information forwarding system comprising:

the first, second and third devices, each of the first, second, and third devices being separate from the other devices;

the first device including:

an information input unit operable to input search conditions by a user;

an information display unit operable to display search results;

a selecting unit operable to select at least one search result provided the second device; and an information output terminal operable to record and hold designated content corresponding to the at least one search result selected by the selecting unit, and directly send the designated content to the third device;

the second device including:

the database which contains data; and the search unit operable to search the database using the search conditions provided by the first device; and the third device including:

a receiving unit operable to receive, directly from the second device, the designated contents held by the first device.

8. A computer information forwarding system according to claim 7, wherein said third device carries out an operation of supplying tangible entity.

9. A computer-readable program recording medium storing a program for allowing a computer to implement all of, or part of, the functions of each component of a computer information forwarding system according to claim 7.

10. A computer information forwarding system according to claim 7, wherein said first device is a terminal device, said second device is a management device, and said third device is a supply device.

11. A computer information forwarding system according to claim 7, further comprising one of an intranet connection, an internet connection, a wireless connection, an infrared ray connection, a radio wave connection, a public telephone network connection and a removable medium for use to perform communication between said first device and said second device.

12. A computer information forwarding system according to claim 7, further comprising one of a connection cable, an intranet connection, an internet connection, a wireless connection, an infrared ray connection, a radio wave connection, a public telephone network connection and a removable medium for use to perform communication between said first device and said third device.

13. A computer information forwarding system according to claim 7, wherein:

said first device has a loading unit operable to load a freely attachable and detachable recording medium;

said first device stores the designated contents in the recording medium; and the designated contents recorded in said recording medium are read out by said third device, when the recording medium is loaded into said third device, so that the designated contents to be supplied are supplied from said third device.

14. A computer information forwarding system according to claim 7, wherein said information output terminal transmits the designated contents to said third device and said third device supplies the designated contents to be supplied when said first device closely approaches said third device.

15. A computer information forwarding system according to claim 7, wherein:

said first device is freely attachable to and detachable from said third device; and the designated contents recorded in said first device are read out by said third device, when said first device is mounted in said third device, so that the designated contents to be supplied are supplied from said third device.

16. A computer information forwarding system according to claim 7, wherein said search unit carries out a search based on a feeling or sensibility word, which is an adjective, as well as feeling or sensibility information, which shows the degree of the feeling or sensibility while attribution values for carrying out a search based on the feeling or sensibility information are stored in said data base.

* * * * *

UNITED STATES PATENT AND TRADEMARK OFFICE
CERTIFICATE OF CORRECTION

PATENT NO.         : 7,010,533 B1
APPLICATION NO.    : 09/913614
DATED              : March 7, 2006
INVENTOR(S)        : Hiroshi Kutsumi et al.

It is certified that error appears in the above-identified patent and that said Letters Patent is hereby corrected as shown below:

Title Page
Change Title To Read:
E-MAIL PREPARATION DEVICE, TERMINAL DEVICE, INFORMATION FORWARDING SYSTEM, METHOD AND PROGRAM RECORDING MEDIUM Page 2, Item (56) References Cited, OTHER PUBLICATIONS, Line 14
Change "2001-311974" to -- 2001-311794 --

Page 2, Item (56) References Cited, OTHER PUBLICATIONS, Line 18
Change "electronicd" to -- electronic --

Column 40
Line 48, delete "any"

Signed and Sealed this

Twenty-second Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 7,010,533 B1  Page 1 of 1
APPLICATION NO. : 09/913614
DATED : March 7, 2006
INVENTOR(S) : Hiroshi Kutsumi et al.

It is certified that error appears in the above-identified patent and that said Letters Patent is hereby corrected as shown below:

<u>Title Page, Item (75) Inventors</u>
Delete
"Shouichi Araki"
"Tadashi Ano"
"Chikado Tada"

Signed and Sealed this

Twelfth Day of June, 2007

JON W. DUDAS
*Director of the United States Patent and Trademark Office*